(12) United States Patent
Miyashita et al.

(10) Patent No.: US 7,359,645 B2
(45) Date of Patent: Apr. 15, 2008

(54) DISPERSION COMPENSATING METHOD, OPTICAL TRANSMISSION SYSTEM, AND OPTICAL TRANSMISSION APPARATUS

(75) Inventors: Takuya Miyashita, Kawasaki (JP); Motoyoshi Sekiya, Kawasaki (JP); Ryosuke Goto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 568 days.

(21) Appl. No.: 10/945,904

(22) Filed: Sep. 22, 2004

(65) Prior Publication Data
US 2005/0244164 A1 Nov. 3, 2005

(30) Foreign Application Priority Data
Apr. 30, 2004 (JP) ............................. 2004-136715

(51) Int. Cl.
*H04B 10/12* (2006.01)
*H04B 10/00* (2006.01)

(52) U.S. Cl. .................. 398/147; 398/158; 398/159
(58) Field of Classification Search ............... 398/147, 398/159, 148, 158; 359/337.5
See application file for complete search history.

(56) References Cited
U.S. PATENT DOCUMENTS 6,594,428 B1  7/2003  Tanaka et al. ............. 385/123
7,058,311 B1 * 6/2006 Islam et al. ................ 398/140
7,103,283 B2 * 9/2006 Mikami et al. ............. 398/159
2001/0008452 A1 7/2001 Sugihara et al. ............ 359/124

FOREIGN PATENT DOCUMENTS

| JP | 8-234255 | 9/1996 |
| JP | 2000-261377 | 9/2000 |
| JP | 2001-203637 | 7/2001 |

* cited by examiner

Primary Examiner—M. R. Sedighian
(74) Attorney, Agent, or Firm—Staas & Halsey LLP

(57) ABSTRACT

In an optical transmission system, each of optical transmission devices for transmitting wavelength-multiplexed light measures a real dispersion quantity. On the basis the real dispersion quantity measured in a measurement step and design dispersion quantities of respective transmission spans, a management control section computes compensation quantities of the respective transmission spans. The management control section notifies the compensation quantities computed in a computation step to the respective optical transmission devices. On the basis of the notified compensation quantities, the respective optical transmission devices compensate for the dispersion quantities. Thereby, optimal dispersion compensating values using a bypass design are acquired individually for optical paths included in WDM light. Dispersion is automatically, dynamically compensated, thereby inhibiting deterioration of a signal.

16 Claims, 27 Drawing Sheets

DESCRIPTION OF COEFFICIENT OF SELLEMEIER'S POLYNOMIAL (EXAMPLE) TRANSMISSION LINE DISPERSION DATABASE (HAVING FIVE SELLEMEIER'S COEFFICIENTS AS DISPERSION INFORMATION ABOUT TRANSMISSION LINES OF RESPECTIVE SPANS AS PROVIDED BELOW)

| Span # | A | B | C | D | E |
|---|---|---|---|---|---|
| Span 1 | 3.2418E-07 | -1.8897E+00 | 4.8683E+06 | -7.9846E+12 | 6.5213E+18 |
| Span 2 | 2.5117E-07 | -1.2288E+00 | 2.6720E+06 | -4.8346E+12 | 4.8993E+18 |
| Span 3 | 3.9402E-07 | -2.5385E+00 | 7.1731E+06 | -1.1721E+13 | 8.8634E+18 |
| Span 4 | 1.6277E-07 | -3.9308E-01 | -3.2813E+05 | -5.0519E+07 | 1.9554E+18 |
| Span 5 | -4.6834E-08 | 1.6591E+00 | -7.8288E+06 | 1.2121E+13 | -5.3457E+18 |
| Span 6 | -2.0720E-06 | 2.0908E+01 | -7.6424E+07 | 1.2079E+14 | -6.9930E+19 |
| Span 7 | 2.3582E-07 | -1.0368E+00 | 1.7801E+06 | -3.0251E+12 | 3.5479E+18 |
| Span 8 | 1.4671E-07 | -2.6553E-01 | -7.3809E+05 | 6.4916E+11 | 1.5282E+18 |
| Span 9 | 6.7070E-07 | -5.2149E+00 | 1.6781E+07 | -2.6902E+13 | 1.7773E+19 |
| Span 10 | 2.8766E-07 | -1.5284E+00 | 3.4728E+06 | -5.5085E+12 | 4.8356E+18 |

GROUP DELAY = $A*\lambda^4 + B*\lambda^2 + C + D*\lambda^{-2} + E*\lambda^{-4}$

DISPERSION VALUE = $4*A*\lambda^3 + 2*B*\lambda - 2*D*\lambda^{-3} - 4*E*\lambda^{-5}$

FIG. 11A (EXAMPLE) RESIDUAL DISPERSION TOLERANCE DATABASE

| NUMBER OF SPANS | RD tol max | RD tol min |
|---|---|---|
| 1 | -779 | 77 |
| 2 | -803 | 72 |
| 3 | -825 | 72 |
| 4 | -843 | 75 |
| 5 | -858 | 82 |
| 6 | -871 | 92 |
| 7 | -880 | 106 |
| 8 | -886 | 123 |
| 9 | -890 | 145 |
| 10 | -890 | 169 |

FIG. 11B

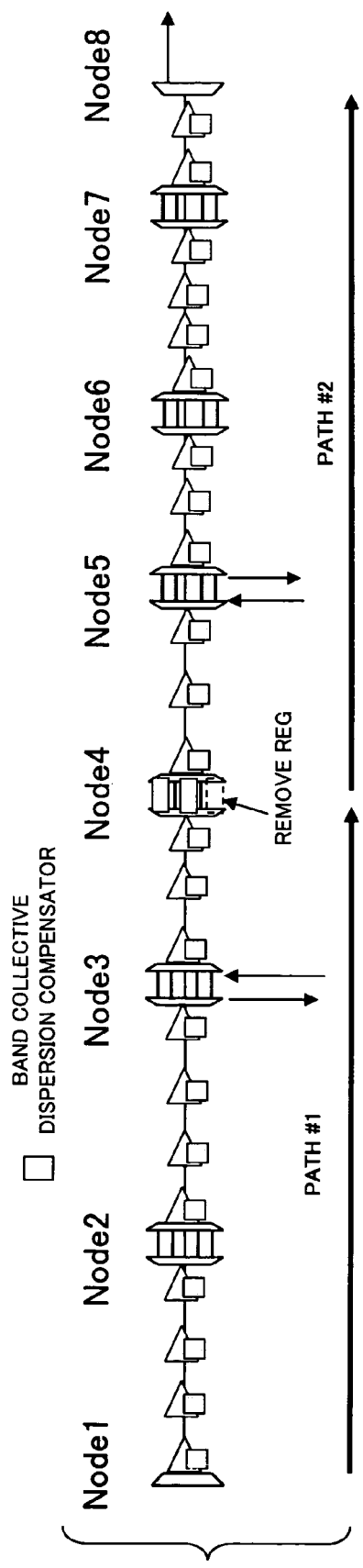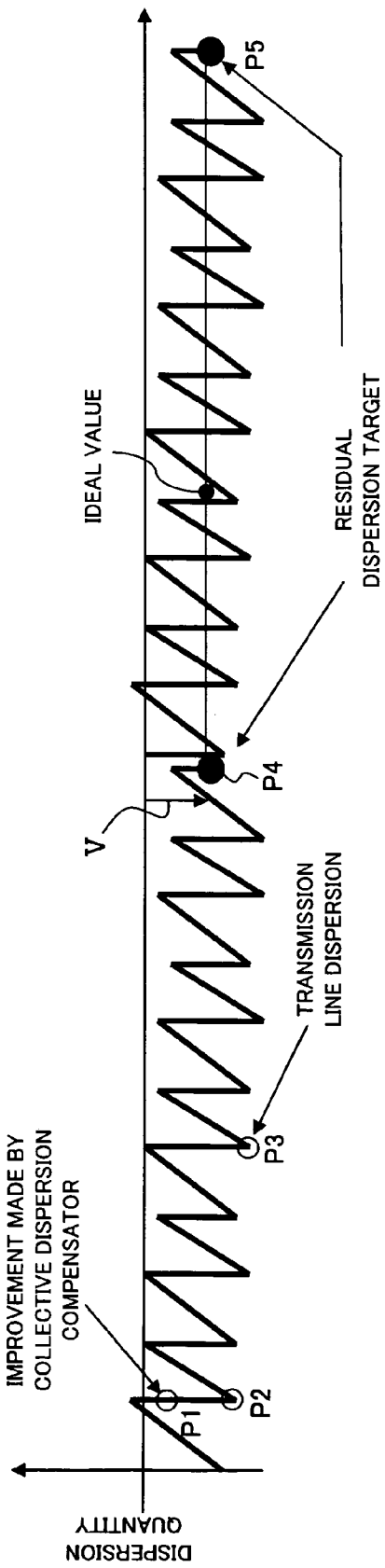
FIG. 15A
FIG. 15B

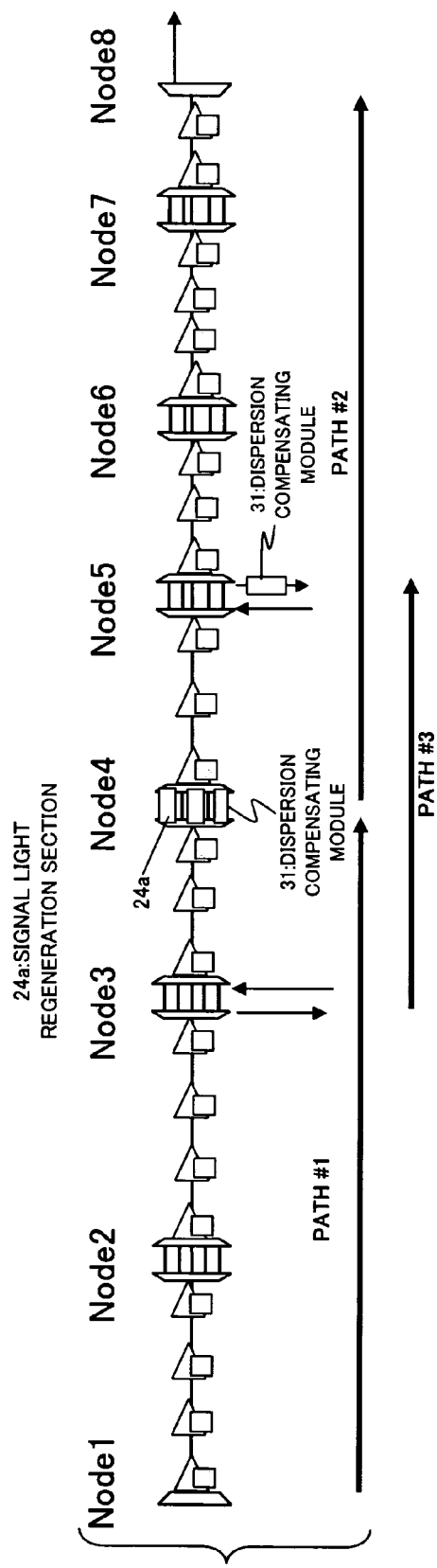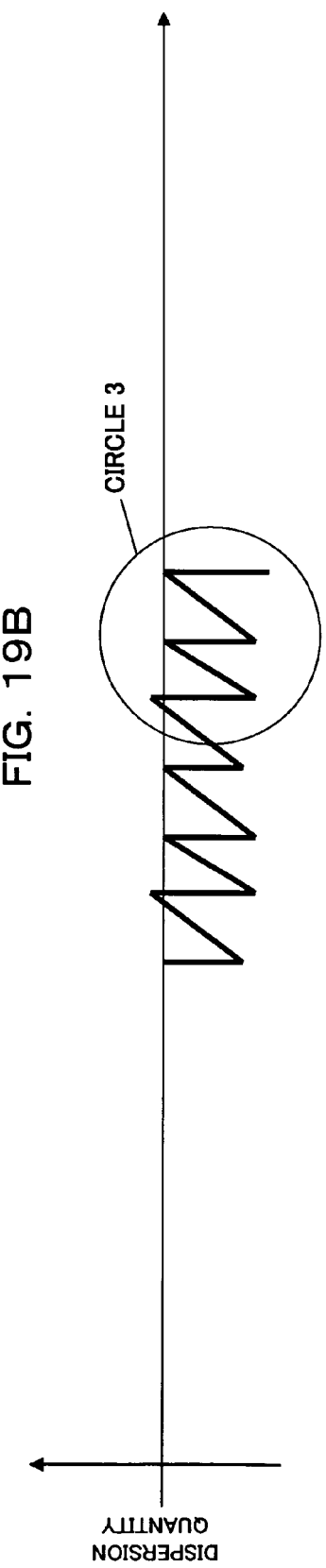

FIG. 22

| PATH NO. | STARTING POINT | END POINT | DISPERSION COMPENSATING OR NOT (VIA DCM) |
|---|---|---|---|
| #1 | NODE 1 | NODE 3 | NONE |
| #2 | NODE 1 | NODE 4 | NODES 2, 4 |
| #3 | NODE 3 | NODE 1 | NONE |
| #4 | NODE 3 | NODE 4 | NODES 2, 4 |
| #5 | NODE 4 | NODE 1 | NODE 2, NODE 1 |
| #6 | NODE 4 | NODE 3 | NODE 4, NODE 2, NODE 3 |

Q VALUE(=BER)

DISPERSION COMPENSATING METHOD, OPTICAL TRANSMISSION SYSTEM, AND OPTICAL TRANSMISSION APPARATUS

BACKGROUND OF THE INVENTION

Field of the Invention

The present invention relates to a dispersion compensating method, an optical transmission system, and an optical transmission apparatus, which are suitable for compensating for the amount of dispersion of a wavelength in transmission spans where a plurality of paths (optical paths or optical transmission paths) laid in, e.g., a WDM (Wavelength Division Multiplexing) transmission line, are superimposed on each other.

In association with rapid development of the Internet, communications demands are expanding in various countries, and a system (a WDM optical transmission system) that addresses these communications demands is currently being introduced. Research and development intended for further increasing transmission capacity has recently been pursued, with studies focused on a method for increasing the number of wavelengths by broadening the transmission band of WDM light and a method for increasing the number of wavelengths by making intervals between wavelengths smaller in the transmission band of WDM light. In addition to a demand for increasing transmission capacity, a demand has arisen for increasing the distance between a transmission terminal node (a transmitting end) and a receiving terminal node (a receiving end) (a Terminal-Terminal distance), and an attempt is made to reduce costs incurred by operation, maintenance, or management of an optical transmission line.

In WDM transmission, compensation for dispersion (wavelength dispersion) of the WDM light is important. The dispersion is ascribable to a difference between group velocities, within an optical fiber, of single wavelength light included in the WDM light, and is expressed by a time delay per unit length of the optical fiber.

FIG. 24A is a view showing an example of dispersion characteristics of the optical fiber. Dispersion quantities (primary dispersion quantities) Z1, Z2 shown in FIG. 24A increase with an increase in a wavelength λ. A dispersion slope (a secondary dispersion quantity) Z3 decreases with an increase in the wavelength λ. Here, the dispersion slope Z3 corresponds to a gradient (differential value) dτ/dλ of the dispersion quantity τ of a dispersion slope D and has wavelength dependency. The dispersion quantity τ and slopes of curves representing characteristics of the dispersion slope D vary according to the manufacturer of the optical fiber or the environment of the transmission line.

FIG. 24B is a view showing examples of a dispersion slope characteristic. All dispersion slope characteristics Z4 to Z7 shown in FIG. 24B increase substantially linearly with respect to the wavelength λ, and the curves Z4 to Z7 have different slopes. Increasing the transmission quality of the WDM transmission system requires compensation for the dispersion slopes, as well as dispersion compensating.

In order to ascertain where dispersion increases and the extent to which the dispersion increases, a relationship between a residual dispersion quantity (a residual dispersion value) and penalty is examined in the design for a system. The reason for this is that a resulting penalty value varies in accordance with a change in the residual dispersion quantity. Here, the penalty is a factor for deteriorating a bit rate (BER [Bit Error Rate]). In addition to including dispersion, the factor includes a nonlinear optical effect, polarization, crosstalk, or the like. The penalty and the resistance dispersion are factors for deteriorating a Q value. An example definition of the Q value is an index value for evaluating the influence of amplitude noise superimposed on the amplitude of signal light, and this index value is expressed by BER as in the case of the penalty. Accordingly, for example, even when any of the nodes have achieved a single SN ratio when receiving the signal light, the nodes differ in BER if the penalty values of the nodes differ.

Removal of the penalty incurs an excessive increase in the costs incurred by operating the system and also raises a risk of occurrence of a hindrance in smooth utilization of the system. For these reasons, system design allows a given amount of penalty. Specifications of the system specify the size of allowable penalty (a penalty level or a penalty line) such that a final penalty value of the system becomes equal to or smaller than the penalty level. A designer designs dispersion compensating such that the residual dispersion quantity falls within the range of this penalty level or less.

FIG. 25A is a view showing a relationship between the residual dispersion quantity (the horizontal axis) and the penalty value (the vertical axis). A penalty level PL (the size of the penalty or the penalty line) shown in FIG. 25A is set on the basis of the specifications of the system. A range defined between two points P1 and P2, the point P1 corresponding to one of two points of intersection of the penalty level and a penalty curve and the point P2 corresponding to the remaining point of intersection, shows an allowable residual dispersion quantity. Dispersion compensating is designed such that the final penalty value of the system becomes equal to or smaller than the penalty level and such that the residual dispersion quantity falls within a range such that it is smaller than or equal to the penalty level.

A curve shown in FIG. 25B shows an example penalty level; that is, a case where the penalty level is, e.g., O. Here, when the residual dispersion quantity resides within the range between the points P1 and P2 (e.g., −400 to 400), the penalty value is considered to fall within an allowable range. When all single wavelength light beams (hereinafter often simply called "single light or single light beam") in the WDM light stay within this allowable range, the system is considered satisfactory. In contrast, when any of the single light beams falls outside the allowable range, the system is considered to fail to compensate for dispersion.

Therefore, when in the course of designing the system a determination is made as to whether or not transmission is possible with a target transmission capacity, management and control of a dispersion quantity of the transmission path become important. Here, management and control signify settings of a dispersion quantity and a compensation quantity, settings of a change in compensation quantity and a residual dispersion (RD) quantity, and the like. Moreover, a location where a dispersion compensator is to be provided, the quantity of compensation, and the like are studied in advance through use of a transmission simulation. Specifically, there are performed studies on the position of the dispersion compensator, intervals between the locations (3R [Retiming, REGenerating, and Reshaping] spans or 3R spans), the quantity of dispersion compensating allocated to the respective dispersion compensators, the intensity of the light output from the dispersion compensator, or the like. The management and control operations are called dispersion compensating management.

The 3R spans will now be described in more detail.

FIG. 26 is a view for describing the 3R spans. The WDM light transmitted from a transmission terminal node 501 (Node 1) shown in FIG. 26 is amplified and relayed by a plurality of in-line amplifiers (ILA [In-Line Amplifiers]) 50*a* and once subjected to OE (Optical to Electrical) conversion in a signal light regeneration node (REGenerator) 504 by way of a relay node 502 and an OADM (Optical Add and Drop Multiplexer) 503. Here, in order to maintain timing adjustment of the WDM light and transmission quality of the same, the signal light regeneration node 504 performs regeneration of the WDM light, elimination of waveform distortions of the WDM light, or the like. The electrical signal is again subjected to EO (Electrical to Optical) conversion in the signal light regeneration node 504, and the WDM light is transmitted to a receiving terminal node 508 by way of an OADM node 505 and relay nodes 506, 507. Paths #1 to #3 shown in FIG. 26 represent transmission spans (3R spans) of the WDM light. The path #1 is a 3R span running from the transmission terminal node 501 to the signal light regeneration node 504; the path #2 is a 3R span running from the signal light regeneration node 504 to the receiving terminal node 508; and the path #3 is a 3R span running from the node 503 to the OADM node 505. Accordingly, the three types of paths #1 to #3 are transmitted over a single WDM transmission line in a superimposed manner.

The residual dispersion quantity is a quantitative difference between the total dispersion quantity of the optical fiber transmission line and the total compensation quantity of the dispersion compensators provided in the respective nodes. A target residual dispersion quantity (target value) must be set to assume values (residual dispersion tolerance values) falling within an allowable range centered on an optimal value.

FIG. 27 is a view showing an example of residual dispersion tolerance (a residual dispersion tolerance value). A residual dispersion target curve RD1 shown in FIG. 27 is set so as to fall within a range defined by a curve RD2 showing an upper limit of the residual dispersion tolerance and a curve RD3 showing a lower limit of the residual dispersion tolerance. Moreover, the residual dispersion target increases with an increase in the 3R distance (on the horizontal axis), and the respective 3R distances are different from each other in terms of residual dispersion target. Accordingly, in bypass-based design where dispersion compensating is designed individually for each path, the 3R distance changes from one path to another, and hence the residual dispersion target changes from one path to another.

The residual dispersion tolerance curve RD1 uses a dispersion map prepared on the basis of a given rule and varies in accordance with three types of elements; that is, a transmission chirp level (variations in the wavelength of signal light to be transmitted), a pre-compensation quantity of a transmission end, and a dispersion map.

The transmission characteristic of the fiber used as a transmission line has the foregoing secondary dispersion quantity (component). Hence, in order to manage and control the dispersion quantity of the entire WDM transmission band, management and control of secondary dispersion are also required. WDM transmission over a long distance entails a large deviation in accumulated dispersion compensating quantity. Hence, management and control of secondary dispersion are particularly important.

Moreover, in accordance with an expansion of the demands for WDM transmission, a network configuration adopting WDM transmission spreads from a simple configuration for interconnecting transceiving terminal nodes (Term-Term) to complicated configurations, such as a hub-type configuration and a ring-type configuration.

Various types of methods have hitherto been put forward as methods for inhibiting occurrence of a deviation in the accumulated dispersion compensating quantity; that is, a method for utilizing a dispersion compensator enabling highly an accurate compensation, a method for dividing a WDM transmission band into a plurality of bands and compensating for the thus-divided bands with compensators having different compensation quantities, and a method utilizing a slope compensator (e.g., see Patent Document 1).

A WDM optical transmission system described in Patent Document 1 compensates for PMD (Polarization Mode Dispersion) of a wavelength-multiplexed optical signal at high speed with high accuracy and is made compact and lightweight.

An optical dispersion compensating circuit described in Patent Document 2 compensates for deterioration of an optical signal, which would otherwise be caused by high-order dispersion, such as second-order dispersion corresponding to the slope of a group speed dispersion quantity, third-order dispersion corresponding to a differential value derived from a wavelength of second-order dispersion, or the like. A dispersion quantity is compensated on a per-wavelength basis such that a desired total dispersion quantity is achieved on each of the divided wavelengths, thereby merging optical signals of respective wavelengths into a single optical signal. As a result, a total dispersion quantity due to a difference between group speeds of the optical fiber can be compensated for, and hence deterioration of a signal due to high-order dispersion can be inhibited.

A dispersion compensating optical transmission path and system described in Patent Document 3 performs compensation while taking a dispersion compensating quantity for each span, up to five spans among six spans, as the product of a slope "Dlocal" and a transmission distance and taking a dispersion quantity of the sixth span as the product of "Davg" and the transmission distance. Thereby, a transmission characteristic of WDM transmission over a long distance is improved.

Patent Document 1
 Japanese Patent Application Laid-Open No. 2001-203637

Patent Document 2
 Japanese Patent Application Laid-Open No. HEI8-234255

Patent Document 3
 Japanese Patent Application Laid-Open No. 2000-261377

The conventional compensation quantity is set for each 3R span, and therefore a single compensation quantity is allocated to a path having a long transmission distance and to another path having a short transmission distance. The path #1 having a long transmission distance and the path #3 having a short transmission distance are compensated to the same quantity between the OADM node 503 and the signal light regeneration node 504, both nodes being shown in FIG. 26. The paths #1, #2 are compensated to the same quantity between the signal light regeneration node 504 and the OADM node 505.

The compensation quantity must be adjusted to an adequate quantity for each wavelength, and the paths #1 and #3 must be compensated to a quantity appropriate for both paths. In addition, in order to improve transmission quality, the dispersion slope of the wavelength dependency must be compensated for, for all the single light beams. In spite of this, the same compensation quantity is used for respective wavelengths. Accordingly, such a method for effecting compensation in the same compensation quantity encounters a problem of inefficiency and the inability to effect appropriate compensation.

In the hub-type network and the ring-type network, a transmission distance changes from one path to another. Therefore, appropriate compensation cannot be effected for each path despite the compensation quantity differing from one path to another.

In a span where a plurality of paths are superimposed one on another, the plurality of paths are subjected to the same dispersion compensating quantity, and hence an optimal compensation quantity can be set for all of the paths. Consequently, when dispersion compensating cannot be performed in path-based design, the compensation quantities of all the paths become equal to the compensation quantity of the path under the worst transmission path conditions in the respective transmission spans. Therefore, when the signal light of the path under poor conditions is regenerated, signal light beams of the other paths are also regenerated, thereby making it difficult to set the signal light beams within the range of residual dispersion tolerance. Hence, the number of signal light beams to be regenerated is increased. Naturally, limitations are imposed on the dispersion compensating method for placing highly accurate dispersion compensators in a network.

SUMMARY OF THE INVENTION

The present invention has been conceived in light of these problems and aims at providing a dispersion compensating method, an optical transmission system, and an optical transmission device, which enable acquisition of individual optimal dispersion compensating values by means of a path-based design for paths included in WDM light, dynamic and automatic compensation for dispersion, and inhibition of signal deterioration.

To this end, a dispersion compensating method of the present invention is characterized by a dispersion compensating method for use in an optical transmission system which compensates for a real dispersion quantity attributable to wavelength-multiplexed light and transmits the wavelength-multiplexed light, the method comprising: a measurement step, in one or a plurality of optical transmission devices which are provided in the optical transmission system and transmit the wavelength-multiplexed light, for measuring real dispersion quantities; a computation step, in a control section provided in the optical transmission system, for computing compensation quantities of respective transmission spans on the basis of the real dispersion quantities measured in the measurement step and design dispersion quantities of the respective dispersion spans; a compensation quantity notification step, in the control section, for notifying the compensation quantities computed in the computation step to the one or plurality of optical transmission devices; and a compensation quantity setting step, in the one or plurality of optical transmission devices, for compensating for the dispersion quantity on the basis of the compensation quantities notified in the compensation quantity notification step.

Therefore, such a configuration enables path-based designing of a WDM transmission system. An optical path having a short transmission distance does not need to be subjected to regeneration processing performed by the optical transmission device (e.g., a signal light regeneration node). Hence, an attempt can be made to curtail costs incurred for system development and operation, by means of a decrease in the number of signal light regeneration nodes.

A dispersion compensating method of the present invention is characterized by comprising: a priority span determination step for determining one or more priority spans for a plurality of optical paths, on the basis of transmission distances of the plurality of optical paths in a transmission span where the plurality of optical paths are superimposed on each other, the transmission span including an optical transmission device for transmitting the wavelength-multiplexed light; a real dispersion map preparation step for preparing a real dispersion map showing variation characteristics of a dispersion quantity of input light and variation characteristics of a dispersion quantity of output light of a plurality of optical transmission devices for the one or more priority spans determined in the priority span determination step; a virtual dispersion map preparation step for preparing a virtual dispersion map showing variation characteristics of a dispersion quantity and variation characteristics of a dispersion quantity of output light for the non-priority span determined in the priority span determination step; a compensation quantity determination step for determining a compensation quantity of a desired optical transmission device of the plurality of optical transmission devices on the basis of information about a difference between the real dispersion map prepared in the real dispersion map preparation step and the virtual dispersion map prepared in the virtual dispersion map preparation step, as well as on the basis of respective residual dispersion tolerance values; and a non-priority span compensation step for compensating for a dispersion quantity of the non-priority span with a compensation quantity determined in the compensation quantity determination step.

Accordingly, such a configuration enables combination of, e.g., a link-based design with a path-based design in response to a demand for installation of an optical transmission device; e.g., an add-and-drop node. Hence, a flexible design becomes possible, thereby enabling realization of more efficient network design.

An optical transmission system of the present invention is characterized by comprising a separation function for separating one or a plurality of first single-wavelength light beams from the wavelength-multiplexed light, and a multiplexing function for multiplexing one or a plurality of second single-wavelength light beams into the wavelength-multiplexed light; one or a plurality of dispersion compensators for compensating for at least one dispersion quantity among a first dispersion quantity of the first single-wavelength light separated by the respective optical transmission devices and a second dispersion quantity of the second single-wavelength light multiplexed by the respective optical transmission devices; and a management control section for setting dispersion quantities of respective dispersion compensators on the basis of a real dispersion quantity of a transmission span where a plurality of optical paths having different transmission distances are superimposed on each other from among the transmission spans among the plurality of optical transmission devices and dispersion management data pertaining to the transmission spans.

Accordingly, by means of this configuration, accurate wavelength dispersion compensating of all wavelength bands utilized in long-distance optical communication can be realized without depending on the types of optical fibers of respective lines or a line distance, by means of designing dispersion compensating functions of respective types of optical fibers for each wavelength dispersion slope and arbitrarily setting dispersion compensating in accordance with a line distance.

An optical transmission device is characterized by comprising: a separation section for separating one or a plurality of first single-wavelength light beams from the wavelength-multiplexed light; a dispersion compensator for compensating for a dispersion quantity of the first single wavelength light beam separated by the separation section; and a management control section for setting a real dispersion quantity of a transmission span where a plurality of optical paths having different transmission distances are superimposed on each other from among transmission spans between a plurality of optical transmission devices, and compensation quantities of respective dispersion compensators on the basis of dispersion management data pertaining to transmission spans.

Accordingly, deterioration of a signal attributable to high-order dispersion and deterioration of a signal attributable to a difference in paths can be prevented by means of this configuration, thereby enabling an attempt to increase a transmission distance.

An optical transmission device is characterized by comprising: a multiplexing section for multiplexing one or a plurality of single-wavelength light beams into the wavelength-multiplexed light; a dispersion compensator for compensating for a dispersion quantity in connection with the single-wavelength light multiplexed by the multiplexing section; and a management control section for setting compensation quantities of respective dispersion compensators on the basis of a real dispersion quantity of a transmission span where a plurality of optical paths having different transmission distances are superimposed on each other among transmission spans between a plurality of optical transmission devices, and dispersion management data pertaining to the transmission spans.

Accordingly, at the time of construction of a long-distance optical communication system requiring elaborate dispersion compensating, this configuration enables efficient dispersion compensating management with regard to operations, such as facilitation of a dispersion compensating design in a circuit design, procurement of a dispersion compensator, reduction of inventories, installation at the time of introduction of a system, and setting operation to be performed when a line route is changed.

Processing pertaining to the compensation quantity setting steps of the dispersion compensating method can be performed as shown in (i) to (iii) provided below.

(i) One or a plurality of optical transmission devices specify a target dispersion quantity and an optical path where a deviation arises, and a receiving-side optical transmission device of the one or plurality of optical transmission devices compensates for the dispersion quantity of the optical path specified in the specifying step.

(ii) In a specification step, in the one or plurality of optical transmission devices, for specifying an optical path in which a deviation from a target dispersion quantity arises, a transmission-side optical transmission device of the one or plurality of optical transmission devices changes a pre-dispersion compensating quantity of the optical path specified in the specification step.

(iii) There are performed processing pertaining to a specification step, in the one or plurality of optical transmission devices, for specifying an optical path in which a deviation from a target dispersion quantity arises; processing pertaining to a chirp processing step, in a transmission-side optical transmission device of the one or plurality of optical transmission devices, for adjusting a value pertaining to a chirp of a transmission section of the optical transmission device; and processing pertaining to a compensation step, in the one or plurality of optical transmission devices, compensating for a dispersion quantity of output light with a wavelength which is caused to fluctuate on the basis of a value pertaining to the chirp adjusted in the chirp processing step.

Moreover, the compensation quantity determination step of the dispersion compensating method may be configured such that a residual dispersion quantity based on a real dispersion map prepared in the real dispersion map preparation step falls within the allowable range of the residual dispersion tolerance.

By means of this configuration, dispersion compensating is effected in accordance with the types of optical fibers of respective lines and a line distance, whereby design efficiency is improved significantly. In relation to a design technique, according to the dispersion compensating method of the present invention, the positions and compensation quantities of dispersion compensators are determined on the basis of a link connecting connections among the nodes. A path-based design technique is added to this design technique, and therefore more appropriate dispersion compensating becomes possible.

In the optical transmission system, each of the plurality of optical transmission devices may be provided with a measurement section for measuring the real dispersion quantities and may be configured to comprise a summation section for summating a plurality of real dispersion quantities measured by the plurality of optical transmission devices; a database for retaining the dispersion quantity allocated to the transmission span; and a computing section for computing compensation quantities of the plurality of dispersion compensators for the respective optical paths having different transmission distances, in connection with a single transmission span, on the basis of the plurality of real dispersion quantities summated by the summation section and the dispersion quantities retained by the database. Such a configuration enables efficient management of dispersion compensating.

The one or plurality of dispersion compensators may be configured so as to assume a hub-type network configuration, a ring-type network configuration, or an add-and-drop-type network configuration. By means of this configuration, accurate wavelength dispersion compensating of all wavelength bands utilized for long distance transmission can be provided without depending on the configuration of an optical transmission network, the type of an optical fiber, and a line distance.

Moreover, one or a plurality of dispersion compensators may be configured to control a dispersion quantity on a per-optical-path basis by means of an individual channel dispersion compensator, a band dispersion compensator, or a variable dispersion compensator. By means of this configuration, apart of the total dispersion quantity is compensated for, whereby dispersion compensating of the entire optical transmission network is realized.

The management control section can be configured to perform the following operations (iv) to (vii).

(iv) A dispersion quantity of bifurcated light or inserted light is compensated as a result of dispersion compensators provided in the respective optical transmission devices compensating for dispersion in connection with an optical path having a dispersion quantity falling outside the range of target dispersion quantity among a plurality of optical paths.

(v) The management control section is configured so as to compensate for a dispersion quantity of bifurcated light or inserted light by means of an optical transmission device provided at a starting point of the optical path changing a pre-dispersion compensating quantity in connection with an optical path having a dispersion quantity falling outside the range of target dispersion quantity among a plurality of optical paths.

(vi) The management control section is configured to compensate for a dispersion quantity of bifurcated light or inserted light by means of an optical transmission device provided at a starting point of the optical path changing a chirping quantity in connection with an optical path having a dispersion quantity falling outside the range of target dispersion quantity among a plurality of optical paths.

(vii) The management control section is configured to determine priorities of a plurality of optical paths in connection with a transmission span where a plurality of optical paths are superimposed on each other.

Accordingly, by means of this configuration, a determination is made as to whether or not the residual dispersion tolerance value retained in the database falls within an allowable range of the measured residual dispersion tolerance value. Hence, deterioration of a signal attributable to high-order dispersion and deterioration of a signal attributable to a difference between different paths are prevented, whereby an attempt is made to increase a transmission distance.

According to the dispersion compensating method of the present invention, a link base and a path base, for example, can be combined together in response to a request for installing an optical transmission apparatus (e.g., an add-and-drop node). As a result, flexible design becomes possible, and more efficient network design becomes feasible.

Accordingly, by means of this configuration, deterioration of a signal attributable to a difference between paths rather than deterioration of a signal attributable to high-order dispersion can be prevented.

BRIEF DESCRIPTION OF THE DRAWINGS

FIG. 11A is a view showing an example of a transmission line dispersion database according to the first embodiment of the present invention;

FIG. 11B is a view showing an example of a residual dispersion tolerance database according to the first embodiment of the present invention;

FIG. 15A is a view for describing a priority span according to the first embodiment of the present invention;

FIG. 15B is a view for showing an example dispersion map using a band collective dispersion compensator according to the first embodiment of the present invention;

FIG. 19A is a view showing an example position of a dispersion compensating module according to the first embodiment of the present invention;

FIG. 19B is a view showing an example dispersion quantity variation waveform which has been subjected to dispersion adjustment using the dispersion compensating module according to the first embodiment of the present invention;

FIG. 22 is a view showing an attribute of a path according to the second embodiment of the present invention;

DESCRIPTION OF THE PREFERRED EMBODIMENTS

Embodiments of the present invention will be described hereinbelow by reference to the drawings.

(A) Description of a First Embodiment of the Present Invention

Figure 1:
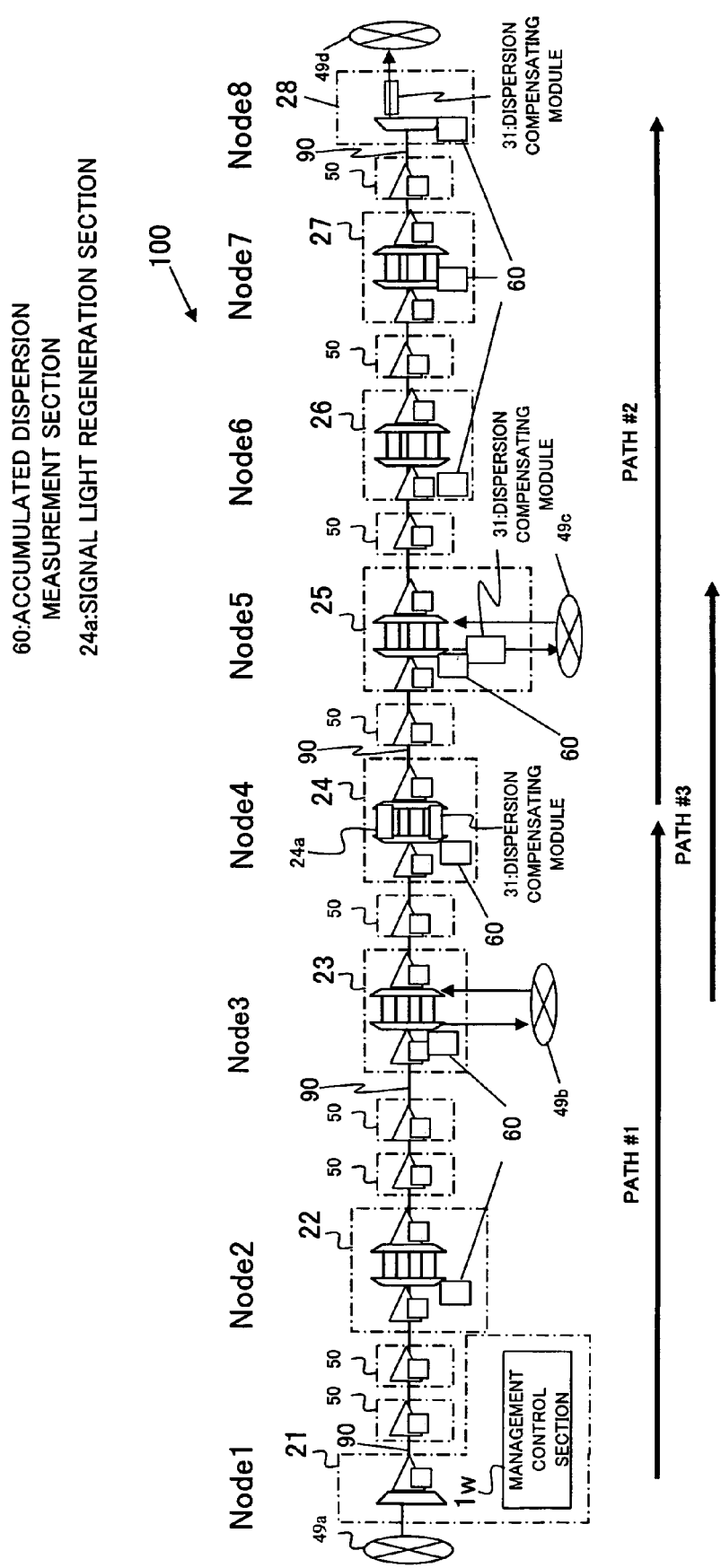
FIG. 1 is a block diagram of a WDM transmission system according to a first embodiment of the present invention.

FIG. 1 is a block diagram of a WDM transmission system (system) according to a first embodiment of the present invention. An optical transmission system 100 shown in FIG. 1 is for transmitting WDM light into which single-waveform light beams of "n" waves ("n" denotes a natural number) are multiplexed and is provided for connecting regions which are spaced a long distance away from each other. Here, networks 49a to 49d connected to the system 100 are provided in, e.g., a metropolis or a district, and correspond to an optical access network for transmitting to the system 100 signal light into which an electrical signal is converted, such as a packet; an IP (Internet Protocol) network, a SONET/SDH (Synchronous Optical Network/Synchronous Digital Hierarchy) network, or the like.

(1) Configuration of the System 100

The system 100 comprises a transmission terminal node 21; a receiving terminal node 28; in-line amplifiers (inline amplifying devices) 50; relay nodes (relays or relay amplifiers) 22, 26, and 27; OADM (Optical Add-and-Drop Multiplexer) nodes (optical add-and-drop devices) 23 and 25; a REG node (a reg node, a 3R node, or a signal light regeneration node) 24; and a transmission line (an optical fiber) 90. The OADM nodes 23 and 25 and the REG node 24 have the function of an optical transmission device which outputs bifurcated light including a single-wavelength light beam of one or more wavelengths among received WDM light and multiplexes into WDM light an inserted light beam including single-wavelength light of one or more wavelengths.

In the following descriptions, the transmission terminal node 21, the relay nodes 22, the OADM node 23, the REG node 24, the OADM node 25, the relay node 26, the relay node 27, and the receiving terminal node 28 are hereinafter referred to as nodes 1 through 8, respectively. The nodes 1 through 8 have functions which will be described later; that is, a function for transceiving signal light, a function for converting light into electricity and vice versa, a function for amplifying the signal light, a function for transmitting the signal light and an electrical signal, and a function for dispersing and compensating for WDM light.

(1-1) Path-Based Dispersion Compensating Method

The system 100 is for computing a path-based dispersion compensating quantity. The path-based dispersion compensating signifies that the dispersion compensating quantity of single-wavelength light beams of "n" waves included in the WDM light is adjusted on a per wavelength basis. The dispersion compensating quantity is adjusted for every, e.g., three paths having different transmission distances, for a single transmission span.

Because of such an adjustment, a dispersion compensating module 31 having a dispersion adjustment function is provided for each of the nodes 4, 5, and 8 shown in FIG. 1.

(1-2) Transmission Direction and Path

A direction in which the WDM light serving as main signal light is transmitted is from the transmission terminal node 21 to the receiving terminal node 28. The direction may be defined in a direction opposite to this direction. Moreover, the number of wavelengths to be multiplexed is taken as "n," and WDM light into which signal light beams (single wavelength) having wavelengths $\lambda_1$ to $\lambda_n$ of "n" mutually-different waves are multiplexed is transmitted. Each of "m" paths #1 to #m ("m" means a natural number) represents a route between a starting point node where information data are to be added to a single light beam, and an end point node where the signal light beam is subjected to OE conversion. Details of the route will be described later. The same also applies to the descriptions provided below.

(1-3) Interface

An input-side interface of the system 100 is light. Here, the network 49a can be configured to transfer, e.g., an electrical signal such as a packet. In this case, the signal light having undergone EO conversion in an optical access device (omitted from the drawings) is input to the system 100. The network 49a can also be configured as an optical network, such as a SONET/SDH. In this case, a transponder (omitted from the drawing) having the function of adjusting a transmission speed of signal light is provided on an input side of the system 100. The network 49d is analogous to the network 49a, and hence repeated explanations thereof are omitted.

Like the network 49a, the network 49b connected to an input side of the OADM node 23 and the network 49c connected to an input side of the OADM node 25 can each be configured as a packet transfer network equipped with an optical access device, or as a signal light transmission network equipped with an optical network transmission device for optically switching signal light whose wavelength and time slot have been changed.

(1-4) Transmission Line 90 and a Transmission Span

The transmission line 90 is an optical fiber for interconnecting the nodes 1 to 8 and the in-line amplifier 50, or the like, and transmits the WDM light and OSC (Optical Service Channel) light serving as sub-signal light required for transmission control. The transmission line 90 is provided in a number of one or more in respective transfer directions. For instance, there can be adopted either a case where the main signal light and the OSC light are transmitted through, e.g., two transmission lines 90, or a case where the transmission bands of the main signal light and the OSC light are separately assigned to a single transmission line 90. In consideration of the environment of the transmission span, a distance, secular changes, and a compensation quantity, a transmission line having appropriate dispersion characteristics (primary and secondary dispersion characteristics) is selected as the transmission line 90.

The transmission span represents a space between the starting point node where a single light beam including information data is added (ADD or inserted) to the WDM light and the end point node where the thus-added WDM light is dropped (DROP or bifurcated), thereby subjecting the single light to OE conversion.

(1-5) Transmission Terminal Node 21

Figure 2:
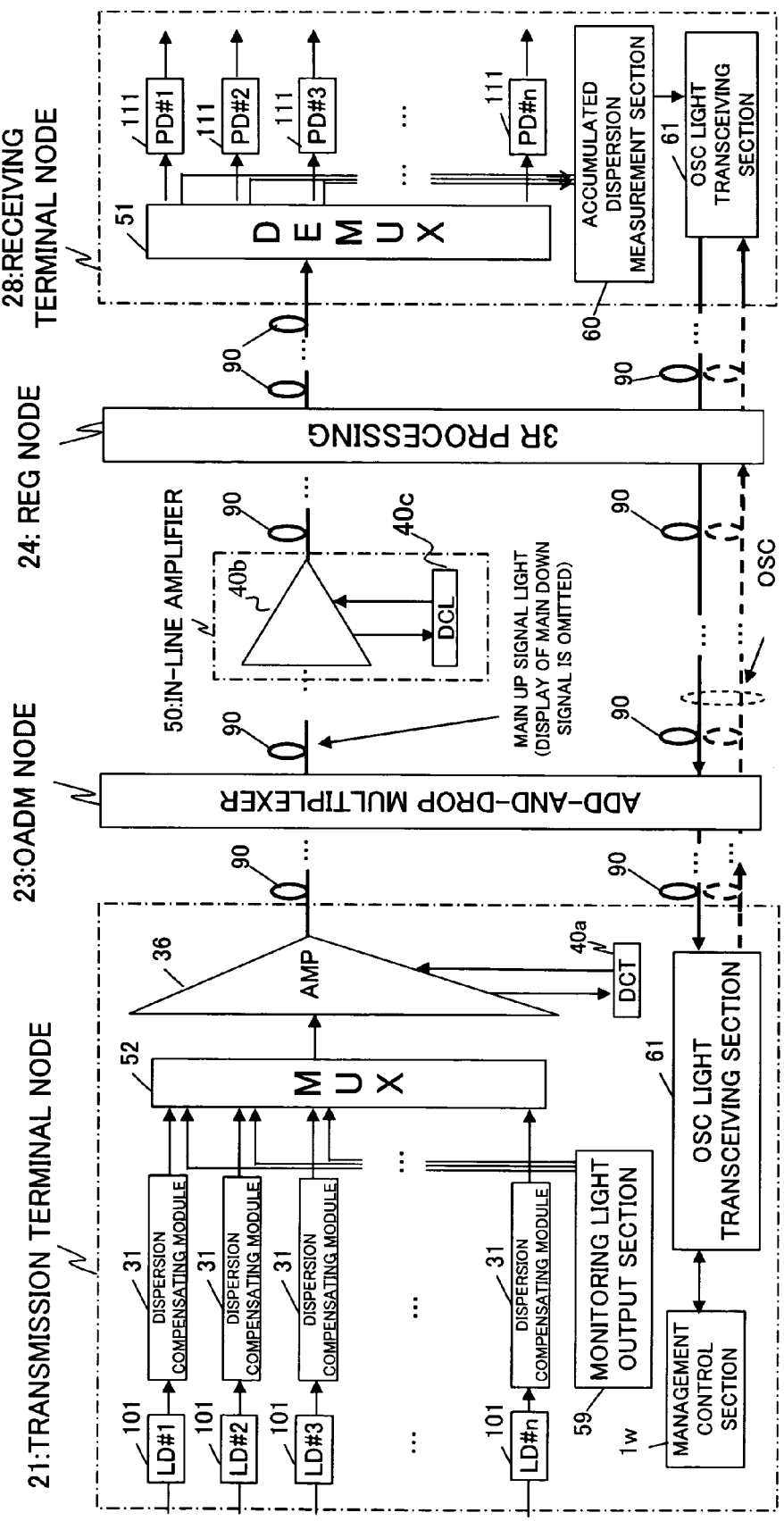
FIG. 2 is a schematic block diagram showing a transmission terminal node and a receiving terminal node, both pertaining to the first embodiment of the present invention.

FIG. 2 is a schematic block diagram of the transmission terminal node 21 and the receiving terminal node 28 according to a first embodiment of the present invention. The transmission terminal node 21 shown in FIG. 2 transmits the WDM light into which the single light having "n" waves output from the network 49a are wavelength-multiplexed. The transmission terminal node 21 comprises "n" laser diodes (LDs) 101; "n" dispersion compensating modules ([DCMs], dispersion compenators or dispersion regulators) 31; a multiplexing (MUX) section 52; an amplifier (AMP) 36; a dispersion compensator for transmission (DCT) 40a (hereinafter often called a "transmission dispersion compensator"); a monitor light output section 59; an OSC light transceiving section 61; and a management control section 1w.

(i) Here, all of the "n" laser diodes 101 are pumping light sources. The laser diodes output single-wave pumping light having one of any of a plurality of wavelengths prescribed by specifications; e.g., specifications called ITU (International Telecommunication Union). The pumping light output from the "n" laser diodes 101 is driven (or modulated) by an electrical signal having the information data, whereupon single light of "n" waves is output. Here, provided that the "n" laser diodes 101 are distinctively represented as laser diodes #1 to #n, the wavelengths of the pumping light output from the respective laser diodes #1 to #n are assigned in advance so as to differ from the wavelengths of the pumping light output from other laser diodes #1 to #n. Tunable laser diode modules capable of outputting pumping light having a plurality of different wavelengths through use of, e.g., temperature control, can also be used as the laser diodes #1 to #n.

(ii) The dispersion compensating module 31 is a variable dispersion compensator capable of changing a dispersion quantity and compensates for dispersion of the WDM light output from the network 49a with a previously-designed compensation quantity (a dispersion compensating function). The compensating quantity of the dispersion compensating module 31 can be changed (i.e., the module is imparted with a compensation quantity variation function) by control means (e.g., the management control section 1w) disposed outside the dispersion compensating module 31. Specifically, the dispersion compensation function is a negative-type dispersion compensation having a negative wavelength dispersion characteristic. Accumulated positive dispersion can be compensated for by means of this negative dispersion compensation.

In order to realize the compensation quantity variation function, the dispersion compensating module 31 has, for example, a compensation-quantity-tunable-type dispersion compensating device (not shown) capable of changing or adjusting a desired compensation quantity, and a compensation quantity setting section (not shown) which sets an appropriate compensation quantity output from the management control section 1w to the dispersion compensation device. The dispersion compensating device has an FBG (Fiber Bragg Grating: a plane optical waveguide) capable of changing a compensation quantity in accordance with a temperature change. An example of the FBG is a device using a substrate made of quartz, or the like, wherein an optical waveguide having a different refractive index is fabricated in the substrate. For example, the variable dispersion compensating function can also be realized by use of an etalon-type variable dispersion compensator using an etalon-type filter, or a variable dispersion compensating function using a wavelength dispersion element whose thin surfaces are coated with reflection films and a small VIPA (Virtually-Imaged Phased Array) having a reflection mirror.

Accordingly, the function of the dispersion compensating module 31 can be realized by, e.g., a compact, inexpensive device intended for compensating for a dispersion slope. As a result, the compensation quantity can be adjusted automatically and dynamically.

(iii) The laser diode 101 and the dispersion compensating module 31 operate synergistically, to thus function as transmission sections (31, 101). The transmission sections (31, 101) subject the information data output from the network 49a to format processing, or the like, and compensate for the signal light driven through use of the formatted electrical signal.

As will be described later, the transmission sections (31, 101) can be provided with a chirp adjustment function.

(iv) The dispersion compensator for transmission (DCT) 40a compensates for dispersion of the WDM light collectively amplified by the amplifier 36. Here, the compensation quantity is a compensation quantity determined in advance during the course of design or a compensation quantity set by the transmission dispersion compensator 40a on the basis of compensation quantity information (compensation quantity data) output from the management control section 1w. As a result, the system 100 can automatically, dynamically, and appropriately perform compensation either before startup or after startup. The function of the transmission dispersion compensatory 40a is implemented by a negative DCF possessing negative wavelength dispersion, or the like. A variable dispersion compensator like the dispersion compensating module 31 can also be used as the transmission dispersion compensator 40a.

(v) The multiplexing section 52 multiplexes single light beams having "n" wavelengths output from the respective dispersion compensating modules 31, thereby outputting the WDM light. For instance, a wavelength multiplexing filter (a band variable filter) is used for the multiplexing section 52. The optical coupler (not shown) is for merging the WDM light output from the multiplexing section 52 and the monitoring light output from the monitoring light output section 59. An EDFA (Erbium-Doped Optical Fiber Amplifier) which collectively amplifies the WDM light output from the multiplexing section 52, or the like, is used for the amplifier 36.

(vi) On the basis of the real dispersion quantities of transmission spans—which are different in transfer distance from each other and where three paths, e.g., #1 to #3, are superimposed on each other, among, e.g., eight nodes 1 through 8—and the dispersion management data pertaining to the transmission spans, the management control section 1w sets the compensation quantities of the respective dispersion compensation means (the dispersion compensating module 31, the transmission dispersion compensator 40a, the transmission line dispersion compensator 40c, and the like). The management control section 1w can be provided at a position other than the transmission terminal node 21.

(vii) The monitoring light output section 59 outputs monitoring light to be used for measuring accumulated dispersion (accumulated residual dispersion) of the nodes 2 to 8; details of the monitoring light output section 59 will be described later. The OSC light transceiving section 61 receives and demodulates the OSC light and modulates and transmits the OSC light.

(viii) In the transmission terminal node 21, the respective laser diodes #1 to #n are driven by a signal input by way of the network 49a. The driven single light having "n" waves is multiplexed by the multiplexing section 52, and the thus-multiplexed WDM light is amplified by the amplifier 36. The amplified WDM light passes through the transmission dispersion compensator 40a, where the dispersion quantity is compensated for. The thus-compensated WDM light returns to the amplifier 36 and is output to the transmission line 90.

(1-6) In-Line Amplifier 50

The in-line amplifier 50 amplifies the WDM light and performs dispersion compensation. The in-line amplifier 50 has an in-line amplifier (ILA) 40b and a dispersion compensator for lines 40c (hereinafter often called a "line dispersion compensator") 40c. Here, the in-line amplifier 40b amplifies the WDM light. The line dispersion compensator 40c collectively subjects all of the wavelength bands of the WDM light to dispersion compensation. This function can also be realized by a fixed dispersion compensator, such as a DCF, for compensating for the compensation quantity of the WDM light.

(1-7) Receiving Terminal Node 28

The receiving terminal node 28 separates the received WDM light into the signal light beams of "n" waves; subjects the separated single light beams of "n" waves to an OE conversion; switches the electrical signal or the separated single wavelength light by way of the optical access device or the like; and transfers the thus-switched electrical signal or signal light to the network 49d (FIG. 1) by way of a transponder (omitted from the drawings). The receiving terminal node 28 is constituted of a separating section (DEMUX) 51, "n" photodiodes 111, an accumulated dispersion measurement section 60, and the OSC light transceiving section 61.

Here, the separating section 51 separates the received WDM light, to thus output single light of "n" waves. The photodiode 111 converts the single light output from the separating section 51 into an electrical signal. The accumulated dispersion measurement section 60 measures the accumulated real dispersion quantity and measures an accumulated dispersion quantity of the monitoring light output from the monitoring light output section 59 of the transmission terminal node 21. Details of the accumulated dispersion measurement section 60 will be described later.

(1-8) OADM Nodes (Optical Add-and-Drop Devices) 23, 25

Figure 3:
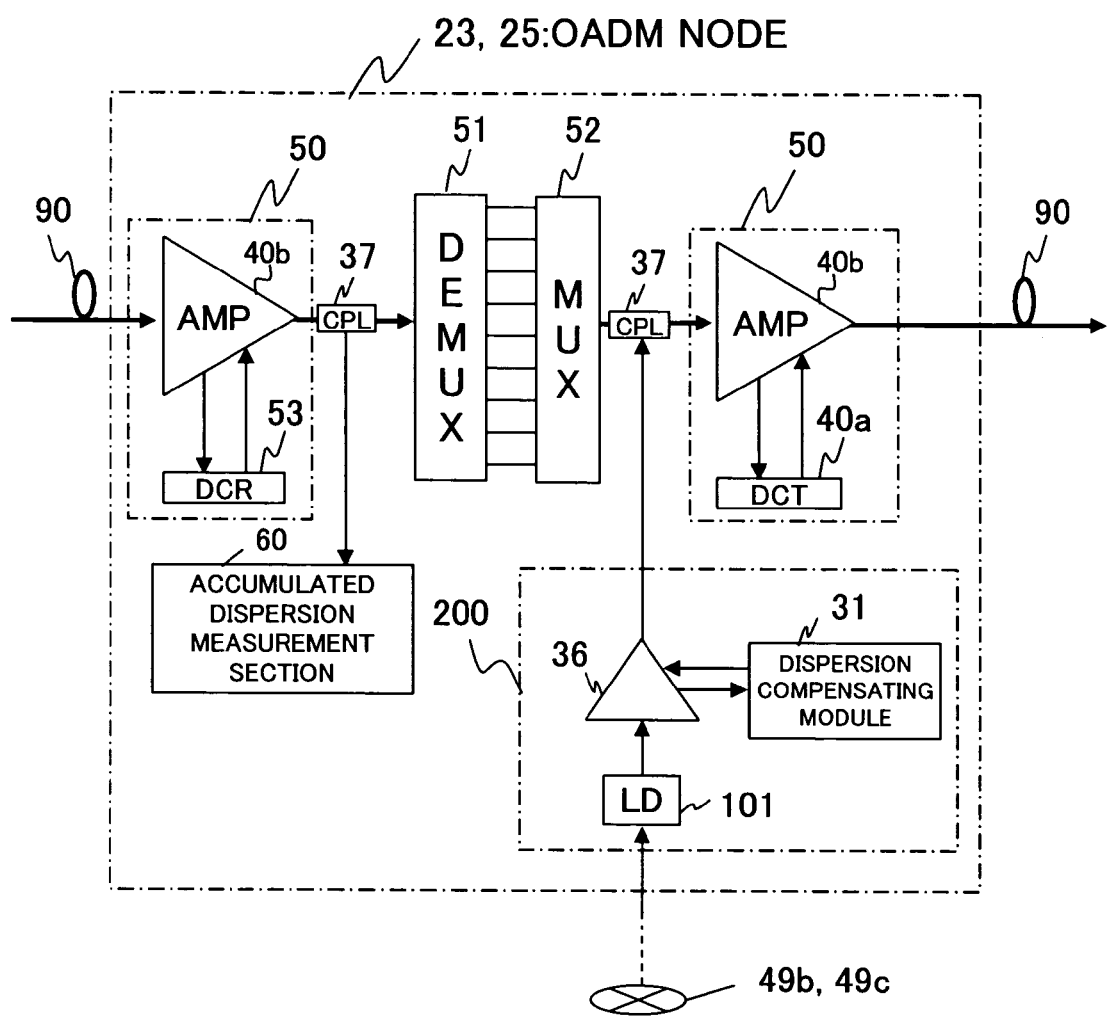
FIG. 3 is a schematic block diagram of an optical add-and-drop node according to the first embodiment of the present invention.

FIG. 3 is a schematic block diagram of the OADM nodes 23, 25 according to the first embodiment of the present invention. The OADM nodes 23, 25 shown in FIG. 3 add or drop the single light beams output from the networks 49b, 49c to and from the single light beams output from the networks 49b, 49c, and control transmission capacity through add-and-drop operations.

Specifically, when destination nodes of the single light beams are the OADM nodes 23, 25, the OADM nodes 23, 25 drop desired single light beams included in the WDM light. In contrast, when the destination nodes are not the OADM nodes 23, 25, the OADM nodes 23, 25 allow the single light beams to pass in the form of the WDM light and add, to the WDM light, the light signals output from the networks 49b, 49c connected to the OADM nodes 23, 25. Each of the OADM nodes 23, 25 comprises a transmission processing section 200, the in-line amplifier 50, the separating section 51, the multiplexing section 52, an optical coupler (CPL) 37, and the accumulated dispersion measurement section 60.

The optical coupler 37 merges the signal light beams together. The transmission processing section 200 comprises the dispersion compensating module 31 for subjecting the signal light output from the network 49b (the network 49c of the OADM node 25) to dispersion compensation; the laser diode 101; and the amplifier 36 for amplifying the signal light beam. The thus-amplified light is merged with the light output from the multiplexing section 52, by way of the optical coupler 37. As will be described by reference to FIG. 13B to be described later, the transmission processing section 200 can also be provided with a chirp adjustment function.

(1-9) Relay Nodes 22, 26, and 27

Each of the relay nodes 22, 26, and 27 shown in FIG. 1 amplifies received light, subjects the received light to dispersion compensation with a designed compensation quantity, and measures accumulated dispersion of the received light. Like the OADM nodes 23 and 25, each of the relay nodes 22, 26, and 27 comprises the in-line amplifier 50, the separating section 51, the multiplexing section 52, and the accumulated dispersion measurement section 60.

(1-10) REG Node 24

Figure 4:
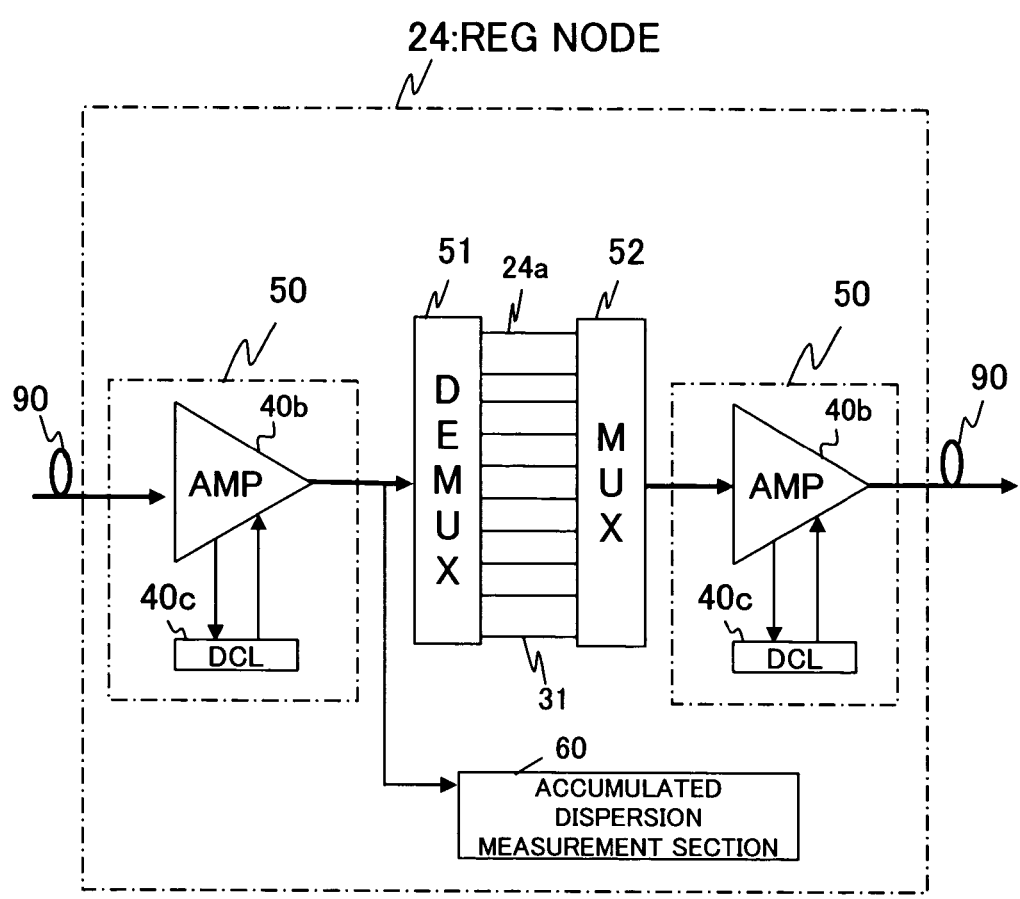
FIG. 4 is a schematic block diagram of an REG node according to the first embodiment of the present invention.

FIG. 4 is a schematic block diagram of the REG node 24 according to the first embodiment of the present invention. The REG node 24 shown in FIG. 4 has three types of processing functions (hereinafter called "3R processing"); namely, a function for effecting timing control of the single light separated from the WDM light, a function for regenerating the single light having a specific wavelength among the single light beams included in the WDM light, and a function for removing waveform distortions in the WDM light. This REG node 24 terminates the 3R span by means of subjecting the received light to the 3R processing.

The REG node 24 has a signal light regeneration section 24a and the separation compensating module 31, which temporarily convert received light into an electrical signal, subject the electrical signal to the 3R processing to thereby regenerate the signal light, and output the regenerated signal light. In order to compensate for dispersion of bifurcated light beams output from the respective nodes 1 to 8 and dispersion of the light inserted by way of the OADM nodes 23, 25, the REG node 24 can also be provided with the plurality of dispersion compensating modules 31 or the dispersion compensator (e.g., the DCF).

Thereby, the REG node 24 subjects the single light separated from the WDM light to OE conversion and subjects the electrical signal to the 3R processing; that is, the timing control, regeneration of the single light, and removal of waveform distortions. Thus, the WDM light—which has been generated by again subjecting the processed electrical signal to EO conversion and subjecting the thus-converted light to wavelength multiplexing—is transmitted.

(1-11) 3R Span

The 3R span is a span between a node (a terminal node or a relay node) which subjects a packet including broadband data to EO conversion, subjects the signal light of "n" wavelengths (or "n" wavelengths or less) to wavelength multiplexing, and outputs the multiplexed signal light, and a node (a terminal node or a relay node) which separates single light beams from the WDM light and subjects the single light beams to OE conversion to thereby generate a packet.

(1-12) Function for Measuring Accumulated Dispersion Quantity

The accumulated dispersion quantity is measured by the management control section 1w for preparing a dispersion map of the real transmission line 90. The function for measuring an accumulated dispersion quantity is realized as a result of synergistic operation of the monitoring light output section 59 and the accumulated dispersion measurement section 60.

Figure 5:
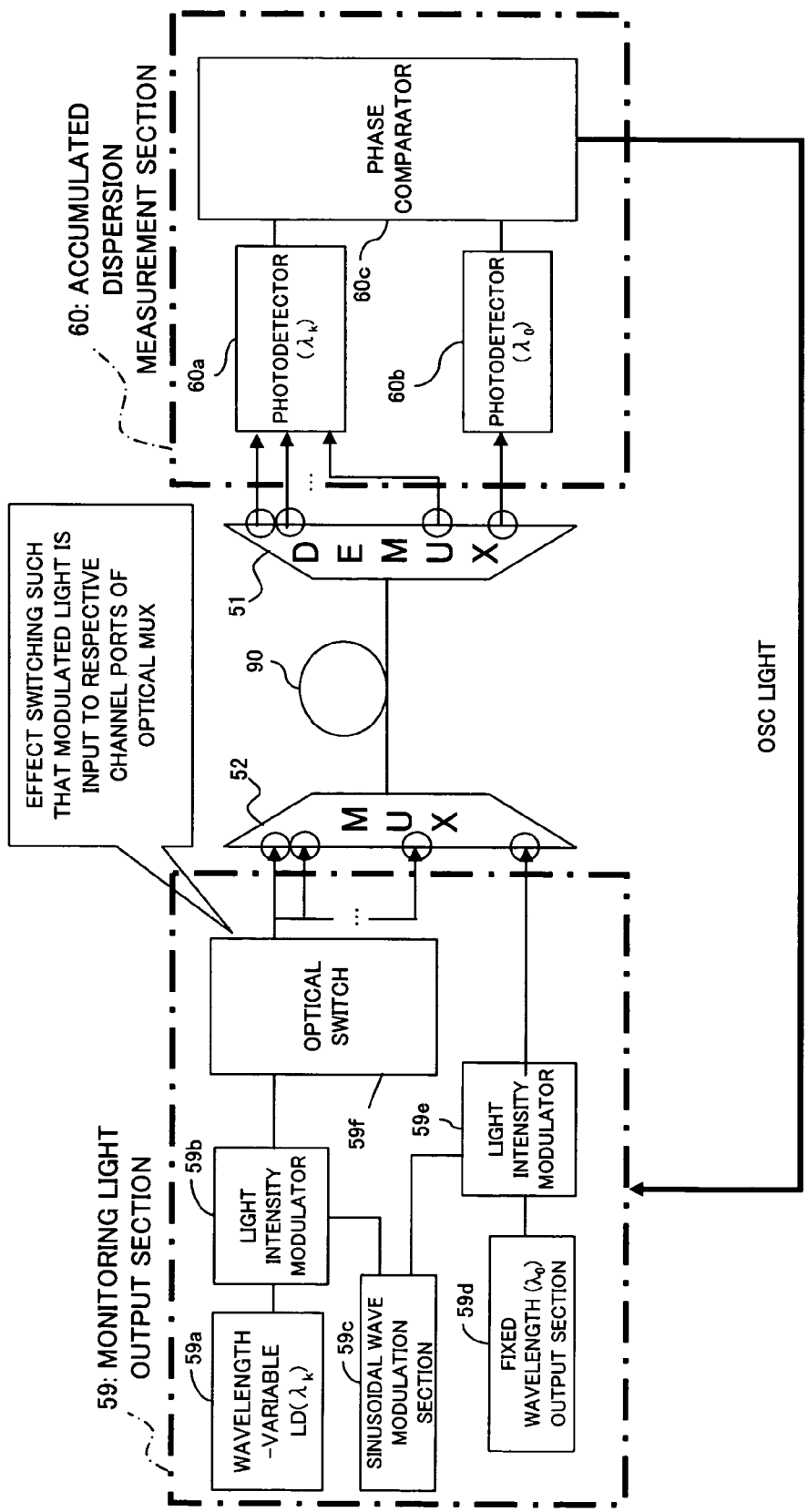
FIG. 5 is a view for describing a method for measuring an accumulated dispersion quantity according to the first embodiment of the present invention.

FIG. 5 is a view for describing a method for measuring an accumulated dispersion quantity according to the first embodiment of the present invention. The monitoring light output section 59 shown in FIG. 5 comprises a wavelength-variable laser diode 59a for outputting single-wave pumping light—which has a desired wavelength $\lambda_k$—among wavelengths $\lambda_1$ to $\lambda_n$ of the "n" waves; a sinusoidal wave modulation section 59c for outputting a sinusoidal wave signal having a desired frequency for monitoring purpose; a fixed wavelength output section 59d for outputting pumping light having a wavelength $\lambda_0$; a light intensity modulator 59b for outputting light modulated as a result of the pumping light of a wavelength $\lambda_k$ output from the wavelength-variable laser diode 59a being modulated with a sinusoidal wave signal output from the sinusoidal wave modulating section 59c; a light intensity modulator 59e for outputting light modulated as a result of the pumping light of the wavelength $\lambda_0$ output from the fixed wavelength output section 59d being modulated with a sinusoidal wave signal output from the sinusoidal wave modulating section 59c; and an optical switch 59f for switching the modulated light output from the light intensity modulator 59b so as to input the modulated light output from the light intensity modulator 59b to a desired channel port of the multiplexing section 52.

The accumulated dispersion measurement section 60 is provided in the respective nodes 2 to 8 and measures an inter-node dispersion quantity $MD_j$ ("j" denotes a natural number from 2 to 8) in connection with a path of the modulated light output from the monitoring light output section 59 by way of the separating section (DEMUX) 51. The accumulated dispersion measurement section 60 comprises a photodiode (photodetector) 60a for detecting the modulated light having a wavelength $\lambda_k$; a photodiode (photodetector) 60b for detecting the modulated light having a wavelength $\lambda_0$; and a phase comparator 60c which compares phases of electrical signals detected by the photodiodes 60a, 60b, to thus output the accumulated dispersion quantity $MD_j$ (group delay data). Here, the accumulated dispersion quantity $MD_j$ shows a dispersion quantity accumulated between the transmission terminal node 21 and the other nodes 2 to 8. The starting point for the accumulated dispersion quantity $MD_j$ can also be any of the nodes 2 to 8 rather than the transmission terminal node 21.

The phase comparator 60c retains a group delay quantity (group delay quantity data) arising in the optical switch 59f in advance and outputs a result determined by subtracting the group delay quantity from the accumulated dispersion quantity as the accumulated residual dispersion quantity $MD_j$. Accumulated dispersion quantities $MD_3$ to $MD_5$ measured by the accumulated dispersion measurement sections 60 provided in the nodes 2 to 7 are gathered by the management control section 1w by way of, e.g., the OSC light.

The respective nodes 1 to 8 transmit light in the transmission direction of the main signal light and in an opposite direction, and therefore the monitoring light output section 59 may be provided in the receiving terminal node 28.

Accordingly, the present dispersion compensating method is a dispersion compensating method for use with the system 100 (FIG. 1), wherein a real dispersion quantity attributable to the WDM light is compensated for and then the WDM light is transmitted. The transmission terminal node 21 (node 1) measures a real dispersion quantity (a measurement step), and the management control section 1w provided in the transmission terminal node 21 computes compensation quantities of respective transmission spans on the basis of the real dispersion quantity measured in the measurement step and designed dispersion quantities of the respective transmission spans (a computation step). Further, the management control section 1w notifies the compensation quantities computed in the computation step to the nodes 2 to 8 (a compensation quantity notification step), and the thus-notified nodes 2 to 8 set the compensation quantities of the respective nodes on the basis of the thus-notified compensation quantities (a compensation quantity setting step).

Accordingly, the measured data are subjected to feedback control, whereby dispersion compensation can be carried out automatically and dynamically.

(2) Path-Based Dispersion Compensating Method of the Present Invention

Under the dispersion compensating method of the present invention, the management control section 1w controls four types of parameters (a transmission chirp level, a dispersion pre-compensation quantity of the transmitting end, a characteristic of a dispersion map, and a residual dispersion quantity), thereby computing a path-based dispersion compensation quantity. In other words, the system 100 adjusts dispersion compensation quantities of single-wavelength light beams of "n" wavelengths included in the WDM light, on a per wavelength basis, and the dispersion compensation quantity is adjusted for the respective paths #1 to #3. In order to adjust the dispersion compensation quantity, the management control section 1w transmits and receives data pertaining to dispersion compensation of the nodes 1 to 8 by means of the OSC light, thereby determining and notifying the compensation quantity.

Figure 6:
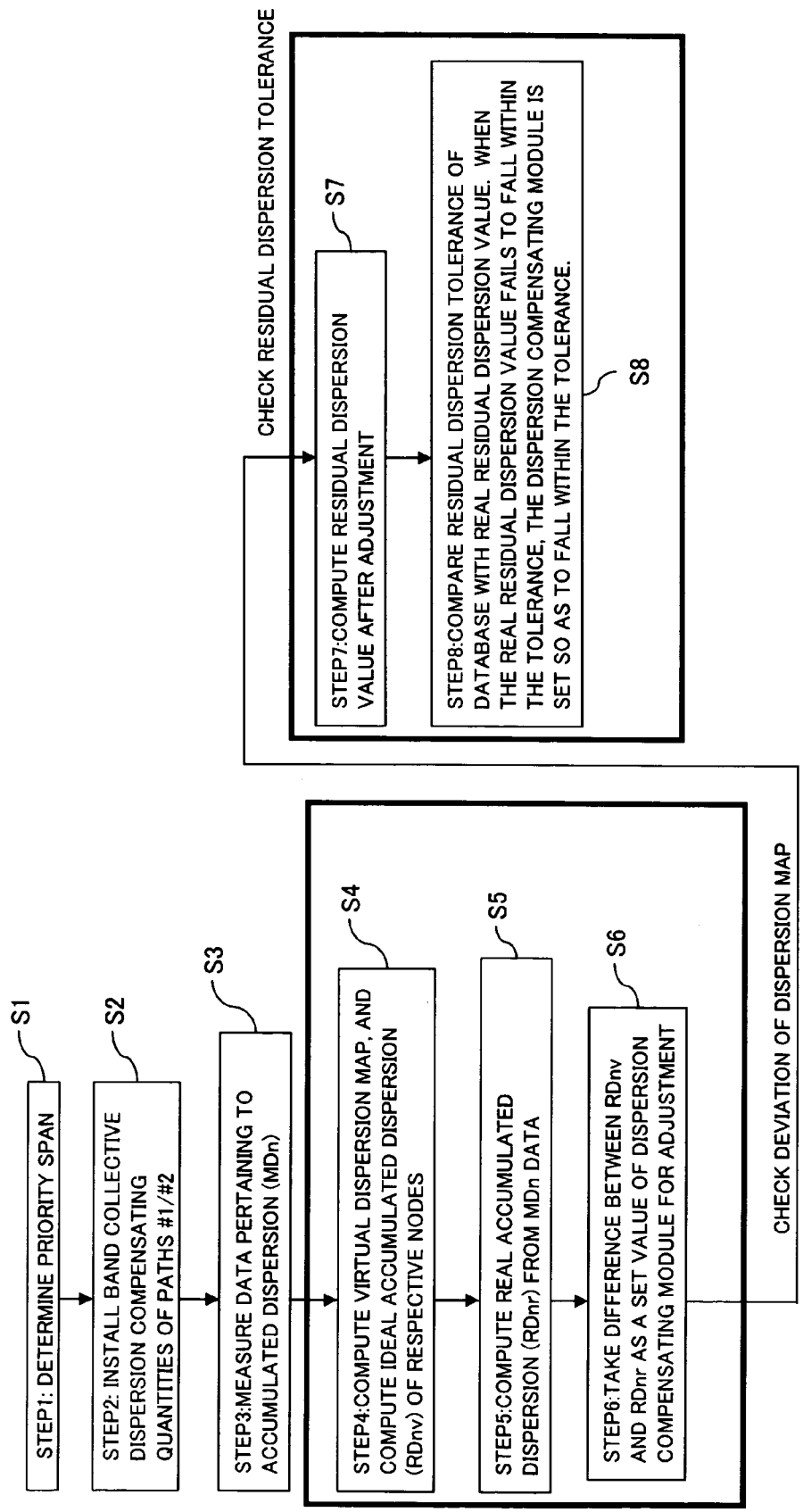
FIG. 6 is a flowchart for describing a dispersion compensating method according to the first embodiment of the present invention.

FIG. 6 is a flowchart for describing the dispersion compensating method according to the first embodiment of the present invention. The dispersion compensating method of the present invention is a method for use with the system 100 which transmits the WDM light having the single-wavelength light beams of "n" waves multiplexed thereinto.

First, the management control section 1w determines priority paths #1, #2 among the three paths #1 to #3, on the basis of, e.g., the transmission distances of the respective three paths (step S1). Here, the management control section 1w determines a non-priority path #3, as well. An administrator or the management control section 1w installs the compensation quantities of the paths #1, #2 pertaining to collective dispersion amplification (step S2), and the nodes 1 to 8 measure the accumulated dispersion quantities (MD) (step S3). The accumulated dispersion quantities $MD_3$ to $MD_5$ (denoted as MDn) measured by, e.g., the nodes 3 to 5, are transmitted to the node 1 by way of the OSC light, and the management control section 1w collects the accumulated dispersion quantities $MD_3$ to $MD_5$.

The management control section 1w determines the band collective compensation quantities of the priority paths #1, #2, thereby preparing a virtual dispersion map and computing ideal accumulated dispersion quantities of the respective nodes 1 to 8 (RDnvirtual) (step S4). These ideal accumulated dispersion quantities are determined on the basis of, e.g., the positions of the dispersion compensators, intervals between the dispersion compensators, the dispersion compensation quantities allocated to the respective dispersion compensators, and the light intensity output from the dispersion compensator. The ideal accumulated dispersion quantities are determined in accordance with environmental requirements of the location where the transmission line 90 is provided. For instance, when the transmission line 90 is laid on the sea floor, intervals between the relay nodes 26 (FIG. 1) can be made substantially equal to each other. However, when the transmission line 90 is laid on land, in practice, considerably difficulty is encountered in making intervals between the relay nodes equal, because of characteristic differences between regions, such as an urban area and a suburb, or cost. Accordingly, the dispersion quantities of the respective relay spans (i.e., relay spans) are not constant. In addition, there is a necessity for quickly setting dispersion compensation quantities in a geographical manner, and the relays are desired to be compatible with types of transmission lines 90 using existing and future optical fibers. Therefore, the environmental requirements, or the like, are processed in the form of data, and the transmission line 90 is appropriately designed beforehand through transmission simulation. Thereby, ideal accumulated dispersion quantities are computed.

On the basis of the accumulated dispersion quantities MD3 to MD5 acquired in step S3, the real accumulated dispersion quantity (RDnreal) in the real transmission line 90 is computed (step S5). A difference between the ideal accumulated dispersion quantity (RDnvirtual) and the real accumulated dispersion quantity (RDnreal) is computed. A value derived from this difference is set on the dispersion compensating modules 31 having a variation function or other dispersion compensators (step S6). As a result, two types of dispersion maps are acquired, whereby a deviation of the real dispersion map from the ideal dispersion map is detected.

Subsequently, the management control section 1w computes a residual dispersion quantity after adjustment (step S7) and compares the residual dispersion tolerance value retained in the database (a residual dispersion tolerance database 1e to be described later) with a real residual dispersion quantity (an actually-measured residual dispersion quantity). On the basis of the comparison result, the management control section 1w determines whether or not the real residual dispersion quantity falls within an allowable range of the residual dispersion tolerance value. When the real residual tolerance quantity does not fall within the allowable range, the dispersion quantities of the respective dispersion compensating modules 31 are set such that the real residual dispersion quantity falls within the allowable range of the residual dispersion tolerance (step S8).

Accordingly, the respective nodes 1 to 8 of the present invention prevent deterioration of a signal, which differs from deterioration of a signal attributable to high-order dispersion and which would otherwise be caused by a difference in paths, and hence an attempt to increase a distance can be enabled.

The path #3 subjected to OEO conversion performed by the REG node 24 is also described as a span for transmitting the WDM light. The number of paths may be two, or more than four. The dispersion compensating method of the present invention can be applied to the case of one path. Moreover, desired nodes can be selected as the nodes 1 to 8 of the add-side of the path and the nodes 1 to 8 of the drop-side of the path.

Here, the management control section 1w is provided, by way of example, on the transmission terminal node 21. The management control section 1w may be provided on any node of the receiving terminal node 28, the REG node 24, a hub node, and a ring node, which will be described later in connection with second and third embodiments. Alternatively, it may be the case that only the management control section 1w is provided independently in the transmission line 90.

(3) Element for Determining the Waveform of WDM Light

Four types of parameters are requirements for determining the waveform of the WDM light transmitted through the 3R span.

(i) Transmission Chirp Level

A chirp (chirping) is a shift (fluctuations or changes in a wavelength) developing in leading and trailing edges of an optical pulse when the intensity of the laser diode 101 is modulated at high speed. A chirp level signifies the value of a fluctuation in the optical wavelength (a wavelength fluctuation level or a wavelength variation level) imparted by the transmitting end. Specifically, a transmission chirp represented by Equation (7) which will be described below is used.

(ii) Dispersion Pre-Compensation Quantity of Transmitting End

The dispersion pre-compensation means that any of the nodes 1 to 7 exclusive of the receiving terminal 28 subject single light, which has not yet been subjected to wavelength multiplexing, to dispersion compensation. By means of the dispersion pre-compensation, an increase in the accumulated dispersion quantity of the WDM light is suppressed.

(iii) Dispersion Map

Figure 24A:
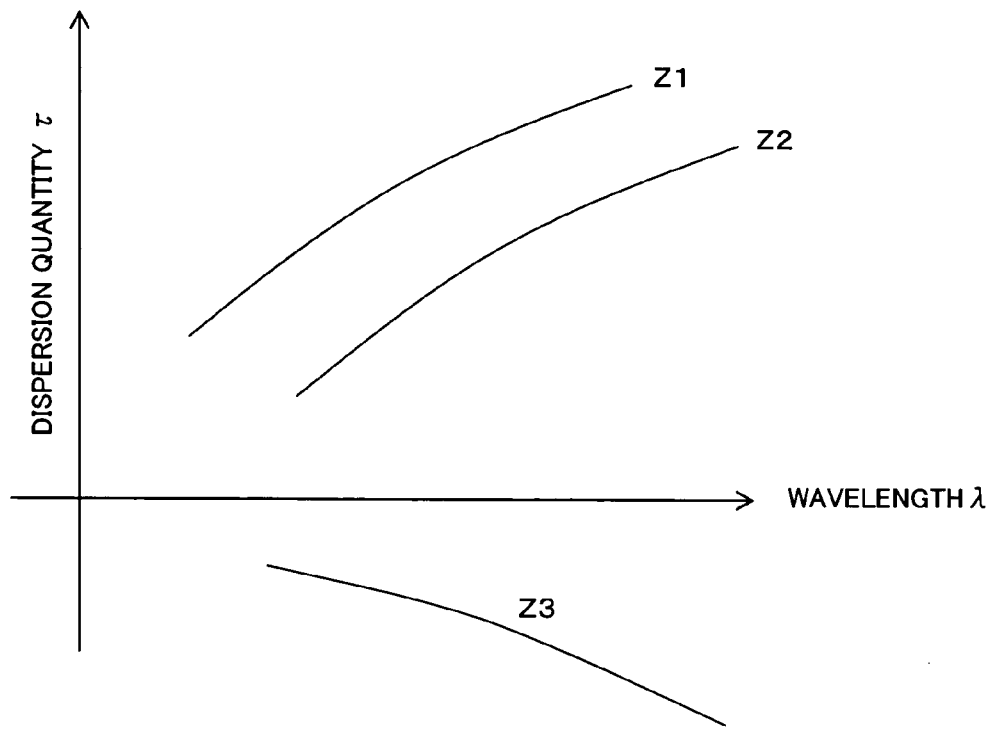
FIG. 24A is a view showing an example dispersion characteristic of an optical fiber.
Figure 24B:
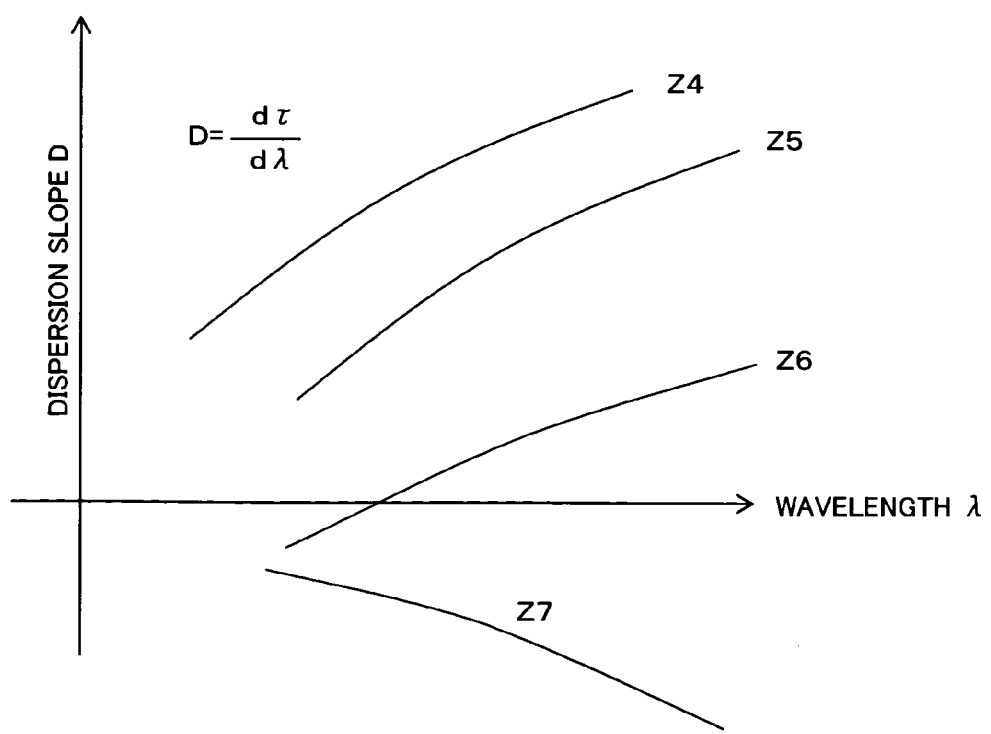
FIG. 24B is a view showing an example dispersion slope characteristic of an optical fiber.
Figure 25A:
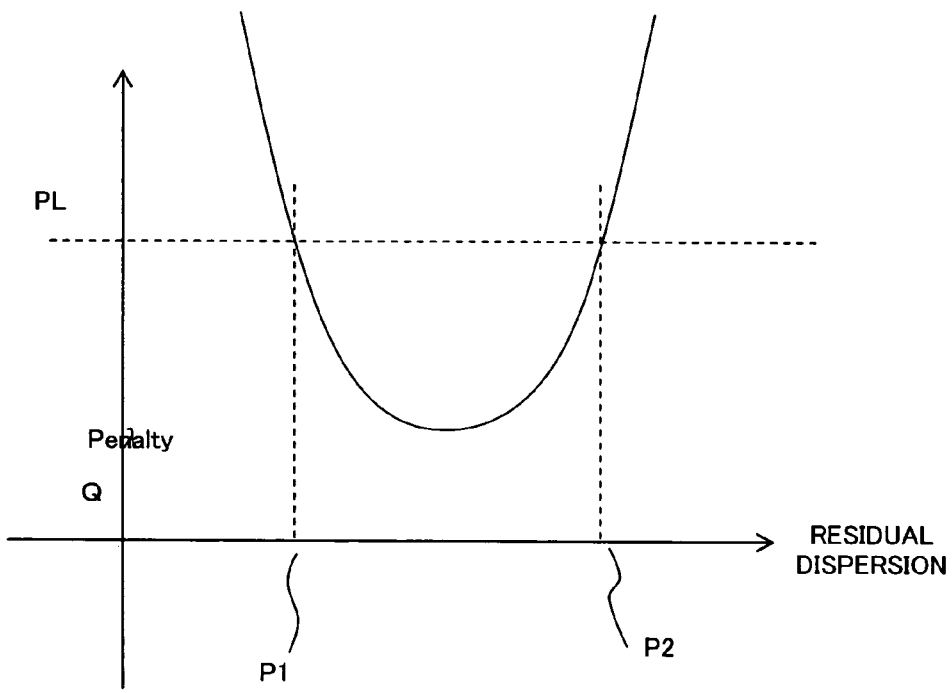
FIGS. 25A and 25B are views showing a relationship between a residual dispersion quantity and a penalty value.
Figure 25B:
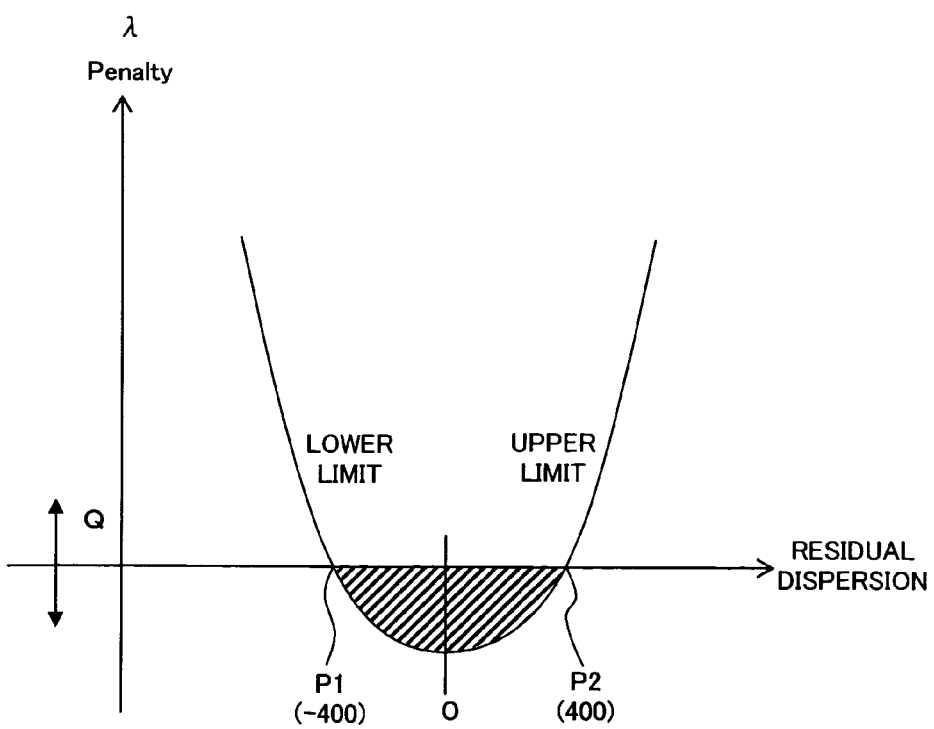
Figure 26:
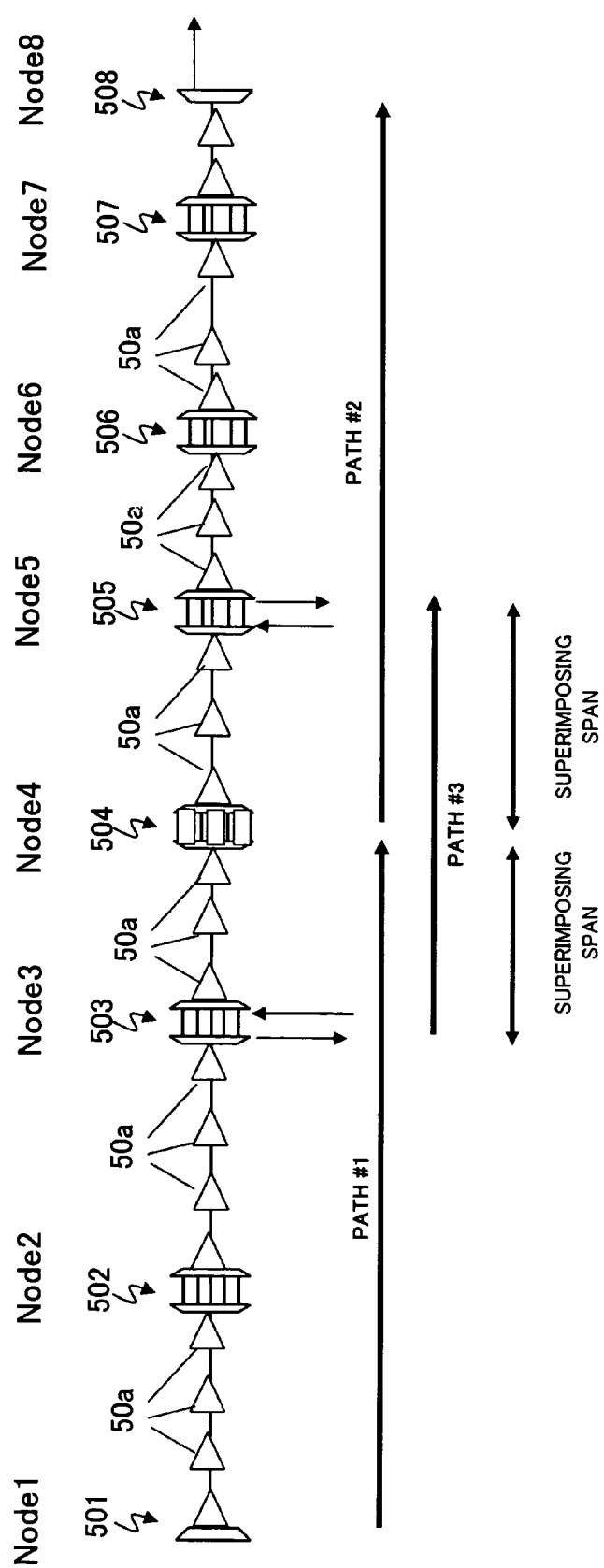
FIG. 26 is a view for describing a 3R span.
Figure 27:
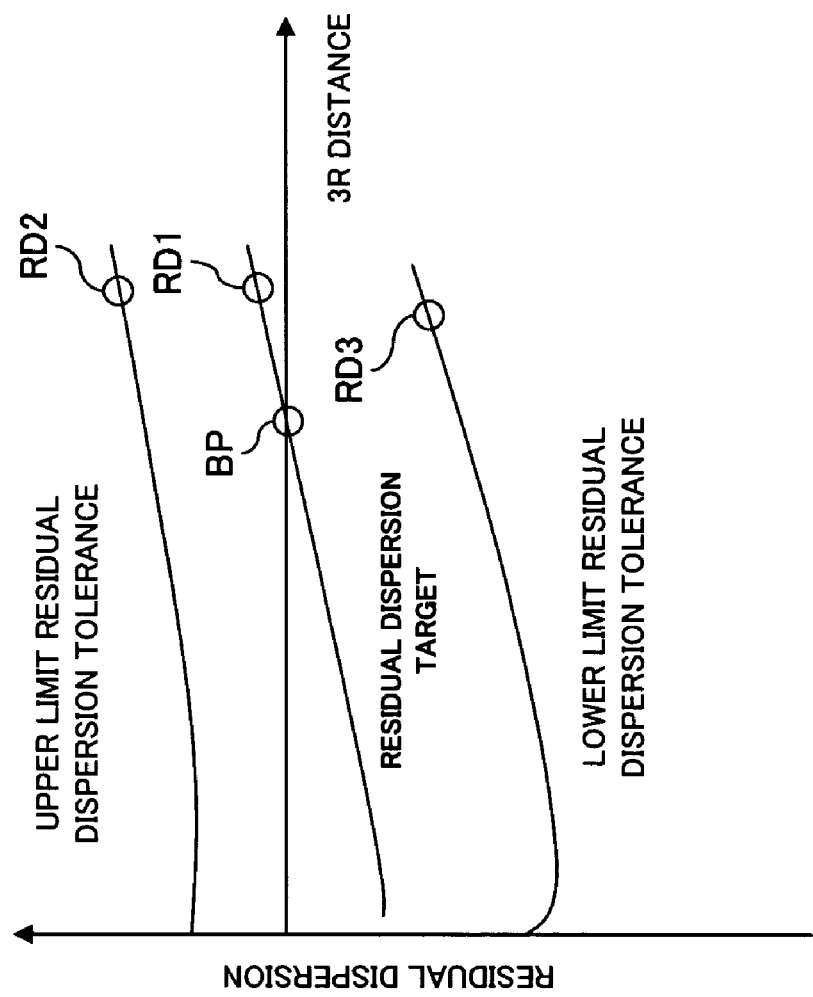
FIG. 27 is a view showing an example residual dispersion tolerance.

As shown in, e.g., FIG. 24A, the dispersion map represents variations in the dispersion quantities of the input light acquired at the respective relay nodes 22, 26, and 27 and variations in the dispersion quantities of the output light acquired at the respective relay nodes 22, 26, and 27. When a plurality of the transmission lines 90 are used, the dispersion maps are prepared individually for the respective transmission lines 90. Dispersion compensators (fixed dispersion compensators or variable dispersion compensators, which will be described later) provided in the respective nodes 1 to 8 compensate for some of the total compensation quantities, thereby realizing the dispersion quantity of the entire system 100. By means of a difference in the characteristics of the dispersion maps, a difference arises in the way dispersion arises in the transmission line 90 and in the way a nonlinear optical effect or the like arises. Specifically, the residual dispersion tolerance varies in accordance with the characteristic of the dispersion map.

(iv) Residual Dispersion Quantity

When the residual dispersion quantity falls within the allowable range of allowable residual dispersion tolerance determined the foregoing parameters, high-quality transmission of the WDM light becomes possible.

(4) Characteristics of a Dispersion Map, and a Dispersion Compensating Method Using the Residual Dispersion Quantity The management control section 1w sets the real dispersion quantity of the transmission span where a plurality of paths—which have different transmission distances-among transmission spans between, eight nodes 1 to 8, and compensation quantities of the respective dispersion compensation means on the basis of the dispersion management data pertaining to the transmission spans. In order to set the compensation quantity, the management control section 1w prepares the dispersion map.

(4-1) Dispersion Compensating Method of the Management Control Section 1w

The dispersion compensating method of this management control section 12 is set such that the management control section 1w performs the following operations. Namely, the management control section 1w summates real dispersion quantities of the respective transmission spans measured by the accumulated dispersion measurement sections 60 provided in the transmission terminal node 21, the receiving terminal node 28, the inline amplifier 50, the relay nodes 22, 26, and 27, the OADM nodes 23, 25, and the REG node 24 (a summation step). The management control section 1w loads dispersion management data pertaining to the dispersion quantities, transmission distances, compensation quantities, or the like, retained in the database 1c which holds the dispersion quantities or the like about the respective transmission spans used at the time of designing of the system 100 (a loading step).

On the basis of the loaded dispersion management data, the compensation quantities to be compensated by the respective nodes 1 to 8 are computed (a computation step), and the compensation quantities acquired through computation are notified to the respective nodes 1 to 8 (a compensation quantity notification step). The respective nodes 1 to 8 are arranged to set the compensation quantities of the respective nodes 1 to 8 by means of the thus-notified compensation quantities (a compensation quantity setting step). Thereby, dispersion compensation of the system 100 is performed automatically, dynamically.

(4-2) Configuration of the Management Control Section 1w

Figure 7:
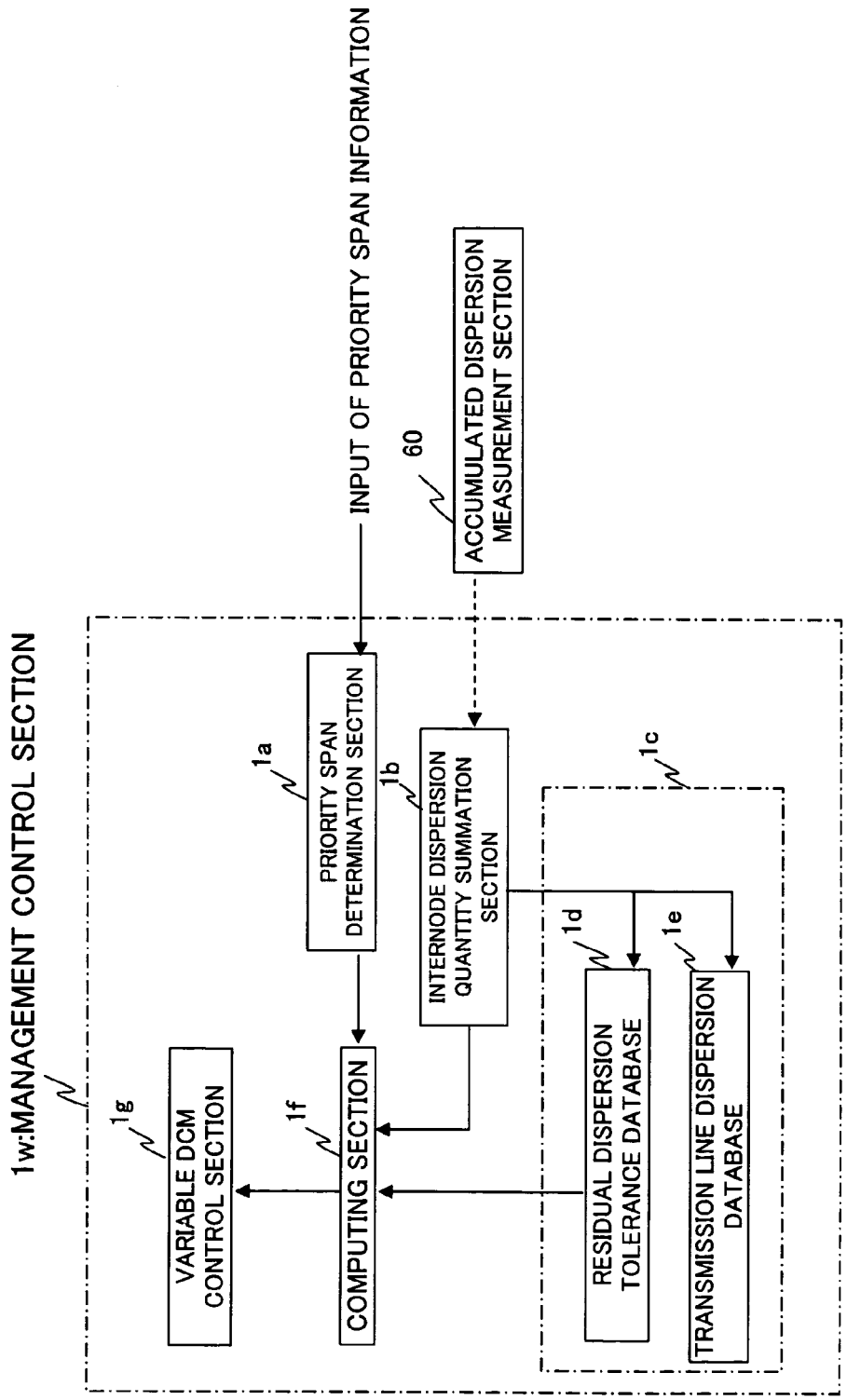
FIG. 7 is a block diagram of a management control section according to the first embodiment of the present invention.

FIG. 7 is a block diagram of the management control section 1w according to the first embodiment of the present invention. The management control section 1w shown in FIG. 7 comprises a priority span determination section 1a; an inter-node dispersion quantity summation section 1b; a database 1c; a computing section 1f; and a variable DCM control section 1g.

(4-3) Priority Span Determination Section 1a

The priority span determination section 1a determines priorities of the paths #1 to #3 in connection with the transmission spans where, e.g., three paths #1 to #3, are superimposed on each other.

Figure 8:
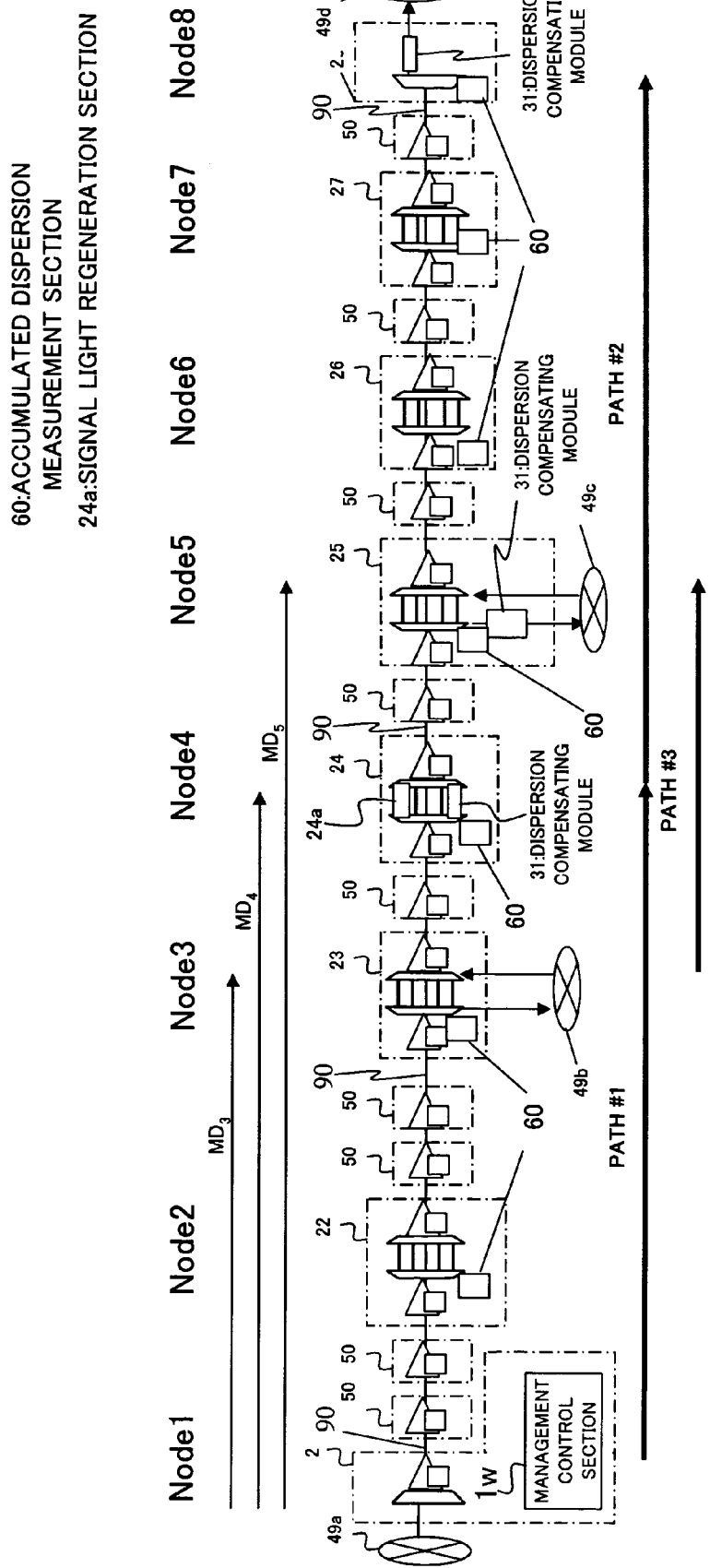
FIG. 8 is a view for describing a priority span according to the first embodiment of the present invention.

FIG. 8 is a view for describing a priority span according to the first embodiment of the present invention. The paths #1 to #3 shown in FIG. 8 represent intervals between the starting point node where the single light including information data is added to the WDM light and the end point node where the thus-added WDM light is dropped and the single light is subjected to OE conversion. The path #1 represents a span from the transmission terminal node 21 to the REG node 24; the path #2 represents a span from the REG node 24 to the receiving terminal 28, and the path #3 represents a span from the OADM node 23 to the OADM node 25. Here, the paths #1 and #3 are superimposed on each other in the nodes 3 and 4, and the paths #2 and #3 are superimposed on each other in the nodes 4 and 5.

Under the dispersion compensating method of the present invention, the dispersion quantity is managed and controlled on a per path basis in connection with these superimposing spans. The priority span determination section 1a determines the band collective dispersion compensation quantity (band DCM) of the WDM light for the paths #1, #2 which are priority spans.

Further, the distances between the nodes 1 to 8 are retained in, e.g., the database 1c. The priority span determination section 1a determines paths—which have the longest transmission distance (e.g., the paths #1, #2)—among the paths #1 to #3, on the basis of the data pertaining to the transmission span retained in the database 1c. The system can also be made to enable the administrator to manually input the data.

Namely, in the transmission span where the paths #1 to #3 are superimposed on each other, the management control section 1w imparts the priorities based on the transmission distances to the respective paths #1 to #3.

Figure 9:
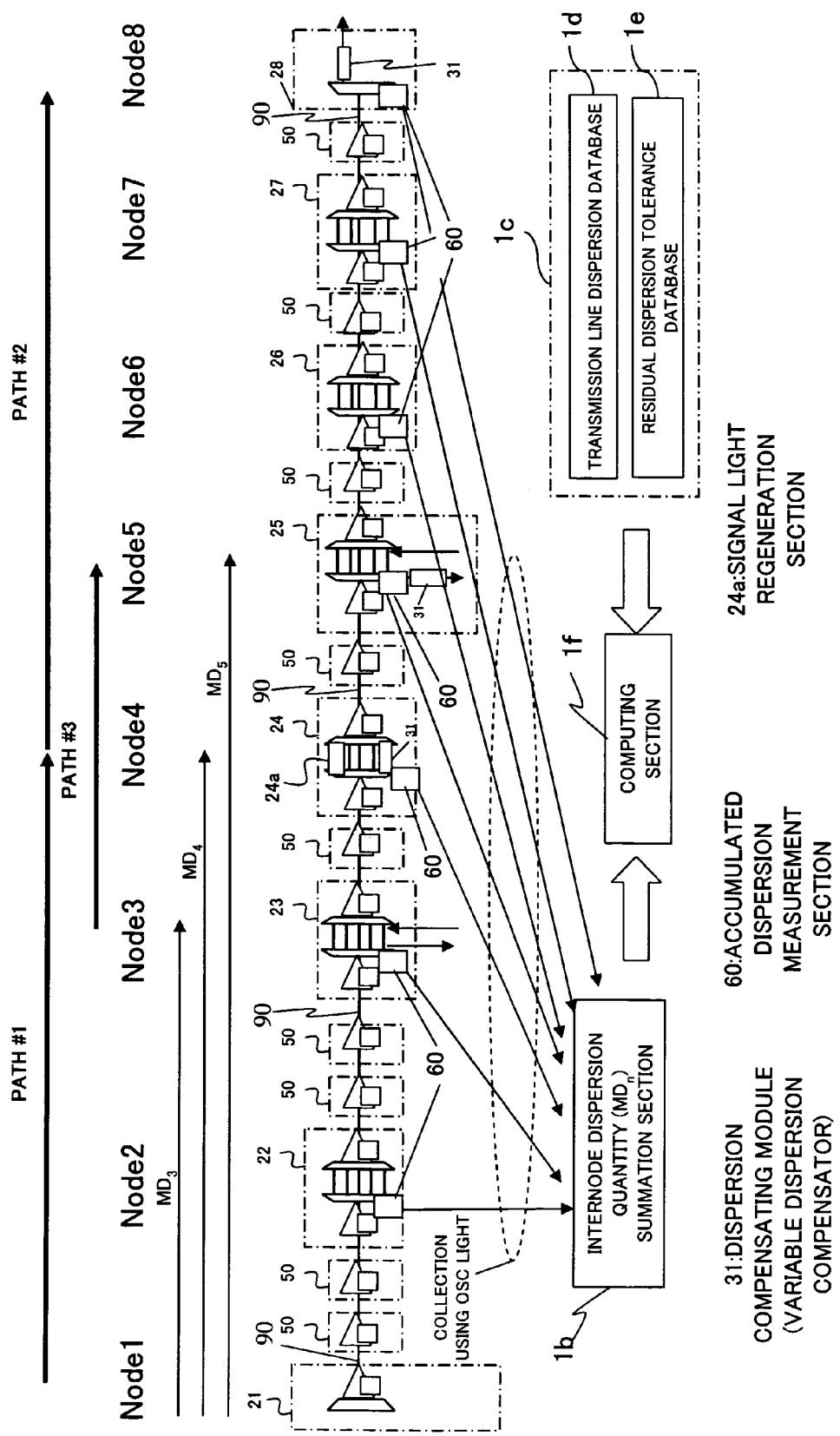
FIG. 9 is a view for describing a summation method of a summation section according to the first embodiment of the present invention.

(4-4) Inter-Node Dispersion Quantity Summation Section (Summation Section) 1b FIG. 9 is a view for describing a summation method of the summation section according to the first embodiment of the present invention. The inter-node dispersion quantity summation section 1b shown in FIG. 9 is for summating one or more real dispersion quantities. The inter-node dispersion quantity summation section 1b collects, by way of for example the OSC light, the accumulated dispersion quantities (accumulated residual dispersion quantities) $MD_3$ to $MD_5$ measured by the accumulated dispersion measurement sections 60 provided in the node 8 and the nodes 3 to 5. The inter-node dispersion quantity summation section 1b retains the thus-summated accumulated dispersion quantities in the memory (omitted from the drawings). The thus-retained accumulated dispersion quantities are used for preparing the real dispersion map.

The dispersion information can also be transmitted or received through use of, e.g., a status monitoring line or the like provided in the IP network.

(4-5) Dispersion Information

The accumulated dispersion quantities $MD_3$ to $MD_5$ will be described in more detail.

The dispersion information (dispersion information data) pertaining to the real dispersion quantities measured by the respective nodes 1 to 8 corresponds to five types of coefficients of the Sellmeier's polynomial which approximates the wavelength-dispersion characteristics. The dispersion information will be described by reference to FIGS. 10 and 11A.

Figure 10:
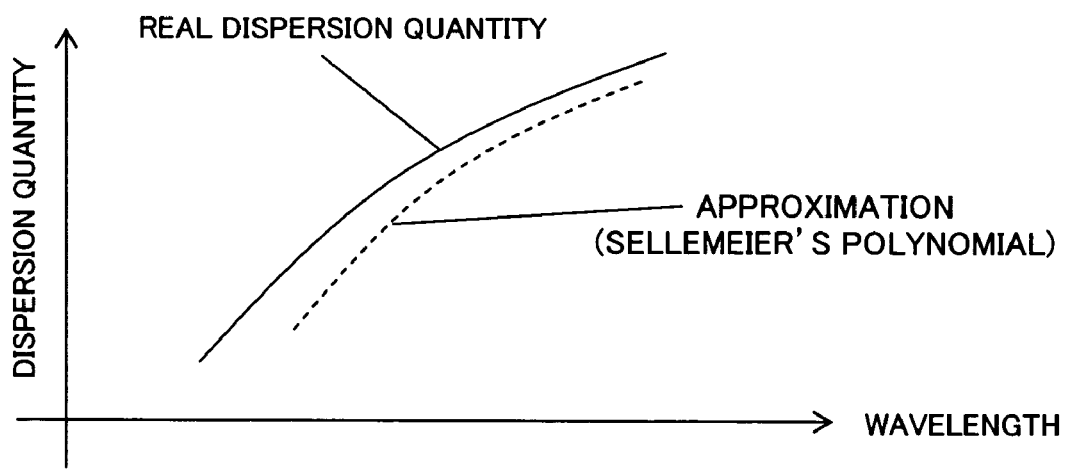
FIG. 10 is a view for describing dispersion compensating using a coefficient of Sellemeier's polynomial according to the first embodiment of the present invention.

FIG. 10 is a view for describing the dispersion information using the coefficients of the Sellmeier's polynomial according to the first embodiment of the present invention. The vertical axis of the wavelength-dispersion characteristic curve (solid line) shown in FIG. 10 represents a group delay (dispersion) per unit length of the optical fiber, and the curve represented by a dotted line represents the Sellemeier's polynomial, which is an approximation. The five types of coefficients of the Sellemeier's polynomial represent coefficients of the Sellemeier's polynomial represented by a coupling of terms of $-4^{th}$-order power operator to $+4^{th}$-order power operator of the wavelength λ (horizontal axis). The respective nodes 2 to 8 transmit the measured accumulated dispersion quantities (accumulated residual dispersion quantities) $MD_3$ to $MD_5$ to the management control section 1w by way of the OSC light.

Here, Table 1 shows examples of the accumulated dispersion quantities $MD_2$ to $MD_8$. The accumulated dispersion quantity $MD_2$ shown in Table 1 shows an accumulated dispersion quantity between the nodes 1 and 2. The accumulated dispersion quantities $MD_3$ to $MD_8$ are accumulated dispersion quantities between the node 1, and the nodes 3 to 8, respectively.

TABLE 1

EXAMPLE ACCUMULATED DISPERSION QUANTITY

| NODES 2 TO 8 | ACCUMULATED DISPERSION QUANTITY |
|---|---|
| $MD_2$ | −121 |
| $MD_3$ | −243 |
| $MD_4$ | −365 |
| $MD_5$ | −459 |
| $MD_6$ | −493 |
| $MD_7$ | −614 |
| $MD_8$ | −686 |

TABLE 2

REAL DISPERION MAP AND VIRTUAL DISPERSION MAP

| ACCUMULATED DISPERSION OF ADJACENT NODES | REAL DISPERSION QUANTITY | VIRTUAL DISPERSION QUANTITY |
|---|---|---|
| NODE 1 TO NODE 2 | −121 | −100 |
| NODE 2 TO NODE 3 | −122 | −140 |
| NODE 3 TO NODE 4 | −122 | −222 |
| NODE 4 TO NODE 5 | −94 | −417 |
| NODE 5 TO NODE 6 | −34 | −120 |
| NODE 6 TO NODE 7 | −121 | −145 |
| NODE 7 TO NODE 8 | −72 | −90 |

Differences between accumulated dispersion quantities adjacent to the dispersion quantities $MD_2$ to $MD_8$ provided in Table 1 are simply computed, whereby the real dispersion map provided in Table 2 is obtained. Moreover, the virtual dispersion map prepared beforehand in the database $1c$ is read, and a difference between the two types of dispersion maps are computed.

(4-6) Database $1c$

The database $1c$ retains the dispersion quantity pertaining to the transmission span and the dispersion compensation quantity pertaining to the transmission span, as dispersion management data. The database $1c$ is configured to comprise a transmission line dispersion database $1d$ for retaining transmission line dispersion data (transmission line dispersion quantity data) and a residual dispersion tolerance database $1e$ retaining the residual dispersion tolerance data holding the residual dispersion tolerance. A transmission line dispersion quantity and a residual dispersion tolerance, which arise every transmission distance acquired through simulation, are used.

(i) FIG. 11A is a view showing an example transmission line dispersion database $1d$ according to the first embodiment of the present invention. Coefficients A to E shown in FIG. 11A represent the coefficients A to E of the Sellemeier's polynomial represented by the following Equation (1). Here, symbols λ, *, and "e" represent a wavelength, a multiplication operation, and the base of a natural logarithm, respectively.

$$\text{Group delay} = A*\lambda^4 + B*\lambda^2 + C + D*\lambda^{-2} + E*\lambda^{-4} \quad (1)$$

The dispersion quantity is represented by Equation (2) obtained by differentiating Equation (1) with respect to λ.

$$\text{Dispersion quantity} = 4*A*\lambda^3 + 2*B*\lambda - 2*D*\lambda^{-9} - 4*E*\lambda^{-5} \quad (2)$$

(ii) FIG. 11B is a view showing an example of the residual dispersion tolerance database $1e$ according to the first embodiment of the present invention. The residual dispersion tolerance database $1e$ shown in FIG. 11B retains the number of spans, the upper limit value (RD tol max) of the residual dispersion tolerance, and a lower limit value (RD tol min) in an associated manner. For instance, in relation to the path #3, after having passed through one span, the signal light assumes an upper limit value of −779 and a lower limit value of 77. After having passed through ten spans, the signal light assumes an upper limit of −890 and a lower limit of 169. Computation using these residual dispersion tolerances is used for computing a pre-dispersion quantity or the like, which will be described later.

The residual dispersion tolerance database $1e$ shown in FIG. 11B retains the upper and lower limits of the residual dispersion tolerance as parameters pertaining to the number of spans. However, requirements other than the number of spans can also be retained. For instance, when control is performed through use of the pre-compensation quantity or the chirp, the residual dispersion tolerance database retains upper and lower limits of the residual dispersion tolerances pertaining to the respective parameters of the pre-compensation quantity or chirp.

(4-7) Computing Section $1f$

The computing section $1f$ prepares a virtual dispersion map of the path #3 on the basis of the database $1c$. On the basis of the accumulated dispersion quantities $MD_3$, $MD_5$ collected from the respective accumulated dispersion measurement sections 60, the computing section $1f$ prepares a real dispersion map of the path #3. At the outset, the computing section $1f$ prepares a virtual dispersion map of the path #3 on the basis of the transmission line dispersion database $1d$. The computing section $1f$ takes, as a value RD4v (RD4virtual), the accumulated dispersion quantity of the node 4 in the prepared virtual dispersion map of the path #3, and takes the accumulated dispersion quantity of the node 5 as a value RD5v. Next, on the basis of the accumulated dispersion quantities $MD_3$, $MD_5$ summated by the inter-node dispersion quantity summation section $1b$, the computing section $1f$ computes the accumulated dispersion quantity RD4r (RD4real) of the node 4 in the path #3 according to Equation (3).

$$RD4r = MD_4 - MD_3 \quad (3)$$

The computing section $1f$ determines the compensation quantity DCM1 set in the dispersion compensating module 31 of the node 4 according to Equation (4).

$$DCM1 = RD4v - RD4r \quad (4)$$

For instance, provided that RD4v is taken as −222 and RD4r is taken as −122, the DCM1 assumes a value of −100.

As mentioned above, the computing section $1f$ computes the compensation quantity of the path #3 by means of comparing the virtual dispersion map with the real dispersion map.

This computation is based on a condition that the compensation quantity of the in-line amplifier 50 is constant regardless of the path. For instance, the computation is based on the premise that the in-line amplifier 50 compensates for 100% of the transmission line 90.

Next, the computing section $1f$ computes the accumulated dispersion quantity RD5r of the node 5 on the basis of the accumulated dispersion quantities $MD_3$, $MD_5$ of the nodes 3, 5 and the compensation quantity DCM1 of the node 4, according to Equation (5).

$$RD5r = MD_5 - MD_3 + DCM1 \quad (5)$$

The management control section $1w$ computes coefficients of a reverse characteristic curve (a curve inverted with reference to the horizontal axis) of the wavelength-dispersion characteristic curve expressed by Equation (1). A result of computation is notified to the respective nodes 1 to 8, and the respective nodes 1 to 8 set the compensation quantities represented by the reverse characteristic curve in the dispersion compensators. Thus, appropriate dispersion compensation can be performed automatically and dynamically.

Moreover, according to Equation (6), the computation section $1f$ determines the compensation quantity DCM2 of the node 5 from the accumulated dispersion quantities RD5r and RD5v computed by Equation (1).

$$DCM2 = RD5v - RD5r \quad (6)$$

The compensation quantity DCM2 of the node 5 is notified to the node 6 by means of the variable DCM control section 1g, and the node 5 compensates for dispersion with the compensation quantity DCM2 in the dropped path #3.

When the residual dispersion quantity RD5r falls within the range of residual dispersion tolerance, compensation of the dispersion compensation quantity DCM2 can be omitted.

As mentioned above, the dispersion quantity between the nodes 3, 4 is acquired by means of subtracting the accumulated dispersion quantity $MD_3$ from the collected accumulated dispersion quantity $MD_4$. The dispersion quantity between the nodes 4 and 5 is acquired in the same manner. As a result, the dispersion quantity of the first half of the path #3 and that of the latter half of the same are acquired.

In the present system 100, each of the nodes 1 to 8 is provided with the accumulated dispersion measurement section 60 for measuring a real dispersion quantity. The system 100 comprises a plurality of dispersion compensators, such as a DCL and a DCT, for compensating for a dispersion quantity in the transmission span of the WDM light; the inter-node dispersion quantity summation section 1b for summating the plurality of real dispersion quantities measured by the respective nodes 1 to 8; the database 1c for retaining the dispersion quantities allocated to the transmission spans; and the computing section 1f for computing compensation quantities of the dispersion compensators for each of a plurality of paths having different transmission distances for a single transmission span, on the basis of the plurality of real dispersion quantities summated by the inter-node dispersion quantity summation section 1b and the dispersion quantity retained by the database 1c.

(4-8) Variable DCM Control Section 1g

Figure 12:
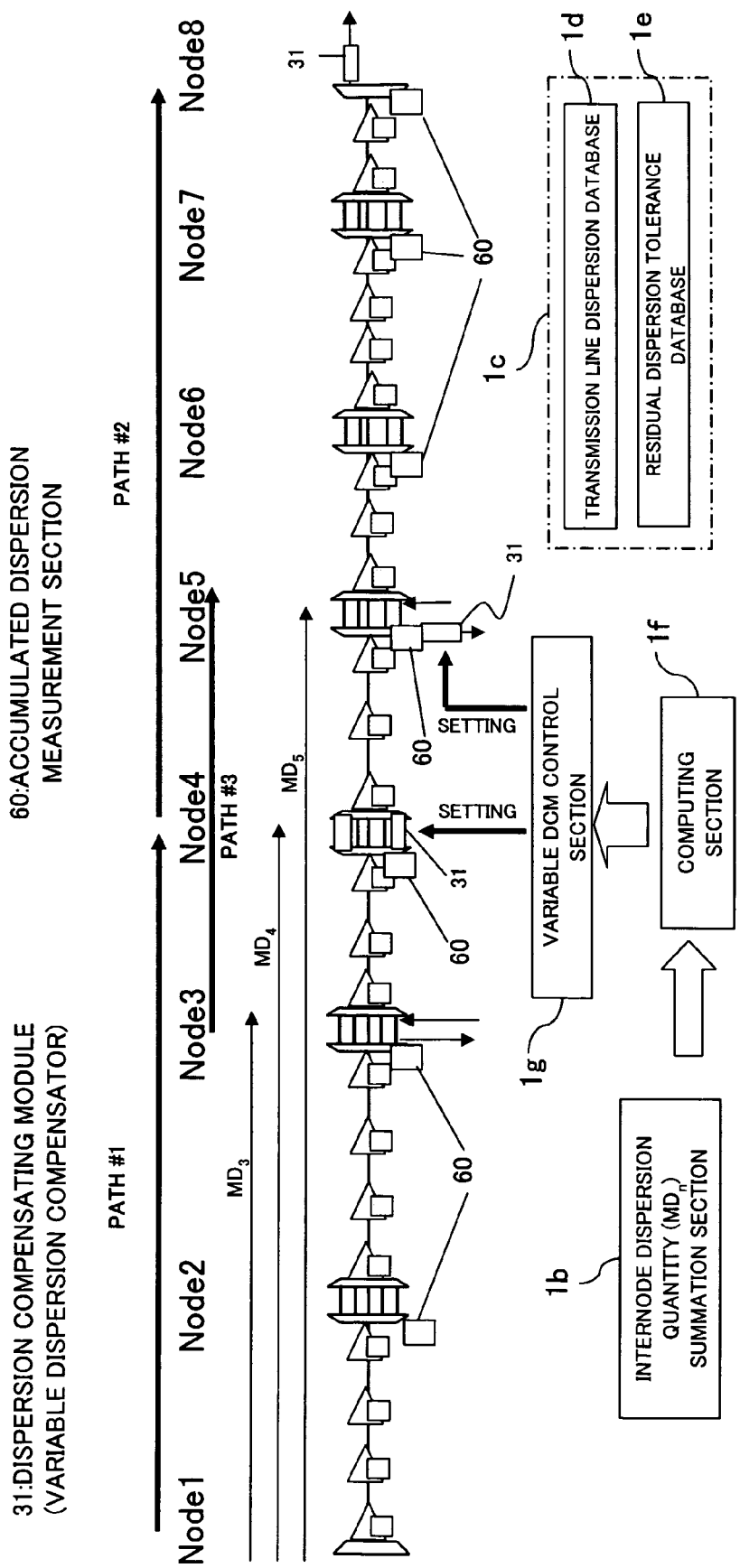
FIG. 12 is a view for describing a setting method of a variable DCM control section according to the first embodiment of the present invention.

FIG. 12 is a view for describing a method for setting a compensation quantity of the variable DCM control section 1g according to the first embodiment of the present invention. The variable DCM control section 1g shown in FIG. 12 acts as a setting section which sets compensation quantities of variable dispersion compensators, such as the dispersion compensating modules 31, with respect to the nodes 1 to 8 including the nodes 4, 5, which are provided in the system 100, or with respect to the in-line amplifier 50, on the basis of the real dispersion quantity summated by the inter-node dispersion quantity summation section 1b and the dispersion management data retained in the database 1c. The dispersion quantity data acquired by the computing section 1f are output, whereby appropriate compensation quantities are set in the respective nodes 1 to 8.

Accordingly, even when the system 100 is in an operating state, automatic, appropriate dispersion compensation can be performed automatically and dynamically. Thus, under the dispersion compensating method of the present invention, priorities are imparted to the respective paths #1 to #3, and appropriate compensation of the respective paths can be performed by means of adjusting the dispersion quantities of the nodes 2 to 8 at the downstream positions with reference to the direction of transmission.

(5) Example Control of the Respective Parameters Performed by the Management Control Section 1w.

The manner in which the management control section 1w sets a compensation quantity by reference to the transmission chirp level and the dispersion pre-compensation quantity at the transmitting end will now be described.

(5-1) Adjustment of the Transmission Chirp Level

The optical wavelength shifts (deviates) toward a longer wavelength at the leading edge and toward a shorter wavelength at a trailing edge, and the optical pulse whose wavelength has been shifted causes a waveform distortion in the optical fiber. The final waveform of the signal light transmitted over a long distance changes greatly in accordance with the chirp level. For this reason, the system 100 adjusts a chirp level through use of a chirp parameter (a value pertaining to a chirp) $\alpha$ representing a ratio of a change in refractive index to a change in the quantity of absorbed light, in order to evaluate the direction and amount of shift. The chirp parameter $\alpha$ is represented by Equation (7) in terms of the phase $\phi$ of light, a time "t" and an amplitude "s" of light.

$$\alpha=(d\phi/dt)/Q \qquad (7)$$

Here, $Q=(1/2)*(1/s)*(ds/dt)$ (* represents a multiplication operation). When no change arises in refractive index (when $\alpha=0$), no chirp arises. However, when a change arises in refractive index, the wavelength is changed by a change in the phase of light, thereby generating a chirp. The value pertaining to a chirp is not limited to the chirp parameter $\alpha$ represented by Equation (7). For instance, values derived as a result of any of coefficients included in Equation (7) having been changed or values derived from an equation analogous to Equation (7) can also be employed.

Figure 13A:
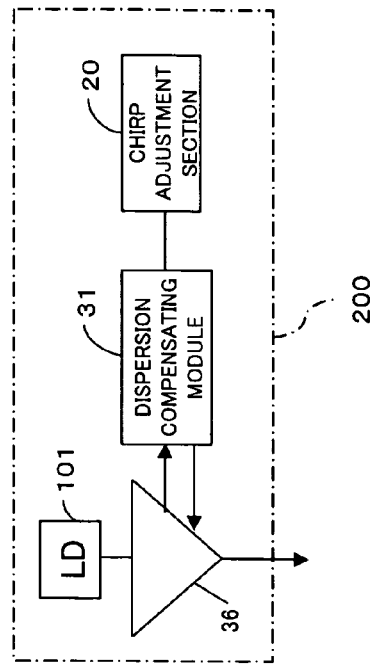
FIG. 13A is a view for describing a chirp parameter according to the first embodiment of the present invention.

FIG. 13A is a view for describing a chirp parameter $\alpha$ according to the first embodiment of the present invention. Each of penalty curves 1, 2 shown in FIG. 13A shows variations in the residual dispersion quantity of the penalty value. Further, the penalty curves are acquired when the chirp parameter $\alpha$ assumes 1 and −1. A negative portion of the penalty value represents the allowable range of the penalty of the WDM light. Moreover, residual dispersion quantities $RD_0$, $RD_1$ in the allowable range, where the penalty value becomes minimum, are optimum residual dispersion quantities.

Figure 13B:
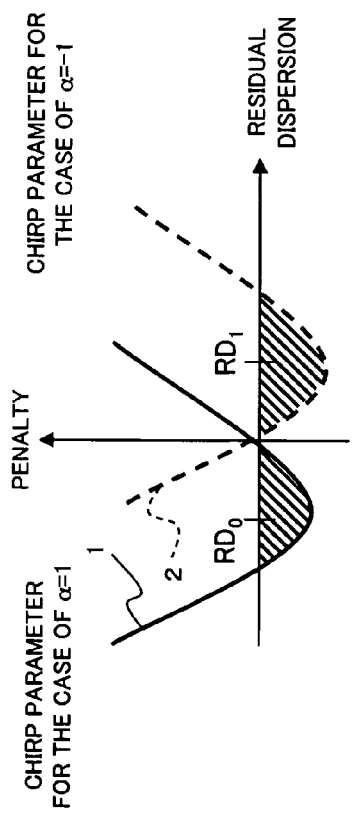
FIG. 13B is a schematic block diagram of a transmission section having a chirp adjustment function according to the first embodiment of the present invention.

FIG. 13B is a schematic block diagram of a transmission processing section having a chirp adjustment function according to the first embodiment of the present invention. By way of an example, the transmission processing section 200 shown in FIG. 13B is provided in the node 3 serving as the starting point node of the path #3. The transmission processing section 200 comprises a chirp adjustment section 20 which retains data pertaining to the penalty curve and outputs an appropriate chirp parameter $\alpha$; the dispersion compensating module 31; the laser diode 101 (for channel #3); and the amplifier 36. The dispersion compensation quantity of the dispersion compensating module 31 is set on the basis of the chirp parameter $\alpha$ output from the chirp adjustment section 20. Moreover, the pumping light output from the laser diode 101 is compensated for with the thus-set dispersion compensation quantity. Thereby, the signal light to be transmitted is pre-chirped.

Figure 13C:
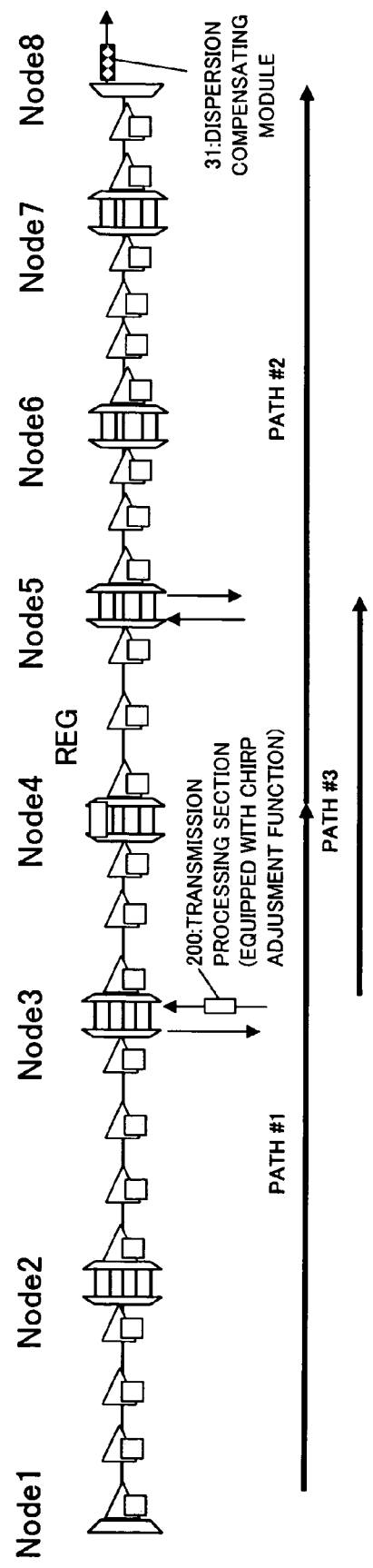
FIG. 13C is a view for describing setting of a transmission chirp level in relation to a path according to the first embodiment of the present invention.

FIG. 13C is a view for describing setting of a transmission chirp level of the path #3 according to the first embodiment of the present invention. When the wavelength of the signal light is shorter than a zero dispersion wavelength of the transmission line, the transmission processing section 200 imparts a positive chirp level ($\alpha>0$) to the signal light. Accordingly, the management control section 1w compensates for dispersion quantities of the dispersion compensators provided in the respective nodes 1 to 8 in connection with a path having a dispersion quantity-which falls outside the range of the target dispersion quantity-among the plurality of paths. As a result, the compensation quantity of bifurcated light or inserted light is compensated for.

As a result, a residual dispersion quantity is acquired at a position where the residual dispersion quantity of the virtual dispersion map (see, e.g., FIG. 17B) prepared in connection with the path #3 attains, e.g., $RD_1$, by means of a transmission chirp which the chirp adjustment section 20 uses to select a chirp value of chirp parameter $\alpha=-1$.

As mentioned above, the transmission requirements of the entire system 100 can be optimized by means of adjusting the value of the chirp parameter $\alpha$ in accordance with requirements of the transmission line 90.

As mentioned above, the residual dispersion tolerance (residual dispersion tolerance value) varies in accordance with the transmission chirp. Accordingly, the residual dispersion tolerance determines the chirp level as a parameter at the time of preparation of the dispersion map. The value of the parameter $\alpha$ is adjusted in accordance with the requirements of the transmission line 90, thereby optimizing the transmission requirements of the entire system 100.

(5-2) Dispersion Pre-Compensation Quantity at Transmitting End

Dispersion pre-compensation denotes dispersion compensation of single light before any of the nodes 1 to 7 subjects the single light to wavelength multiplexing. The reason why the dispersion pre-compensation is used is that the accumulated dispersion quantity of WDM light is increased, thereby preventing the accumulated dispersion quantity from exceeding a compensable quantity in a stage prior to the receiving terminal node 28.

The dispersion compensating module 31 performs pre-compensation, which will be described below, in connection with the signal light output from the EDFA. The reason for effecting dispersion pre-compensation is that the residual dispersion tolerance differs according to the dispersion compensation which has been performed beforehand. In this respect, more detailed descriptions will be provided by reference to FIGS. 14A and 14B.

Figure 14A:
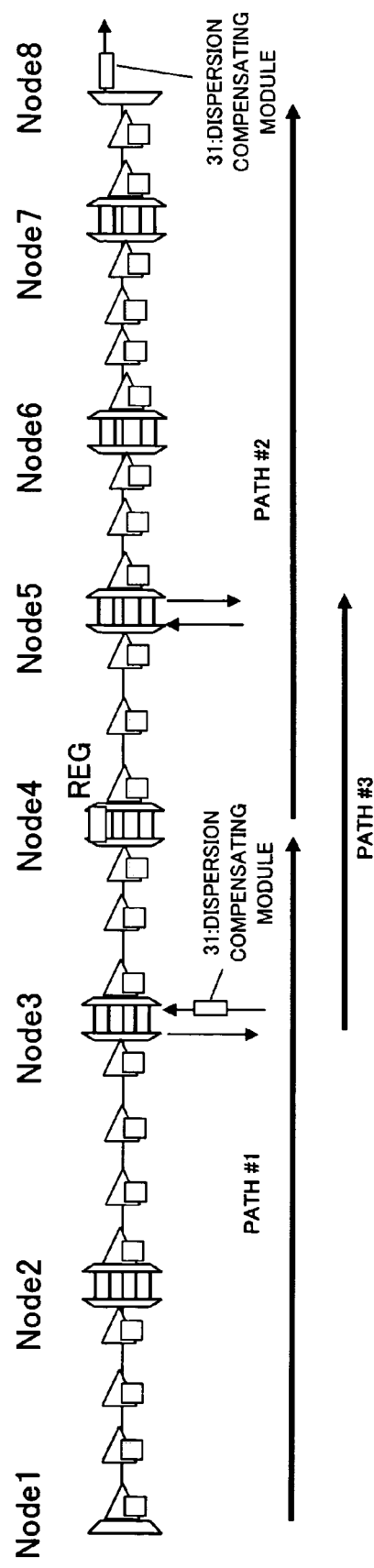
FIG. 14A is a view for describing a dispersion pre-compensating method according to the first embodiment of the present invention.

FIG. 14A is a view for describing the dispersion pre-compensating method according to the first embodiment of the present invention. The dispersion compensating module (DCT: Dispersion compensator for transmitting) 31 acting as a dispersion pre-compensator is provided on the transmission side of the node 3 shown in FIG. 14A. This dispersion compensating module compensates for the path #3 with the compensation quantity determined through use of the dispersion map.

The residual dispersion tolerance changes in accordance with the dispersion pre-compensation quantity.

Figure 14B:
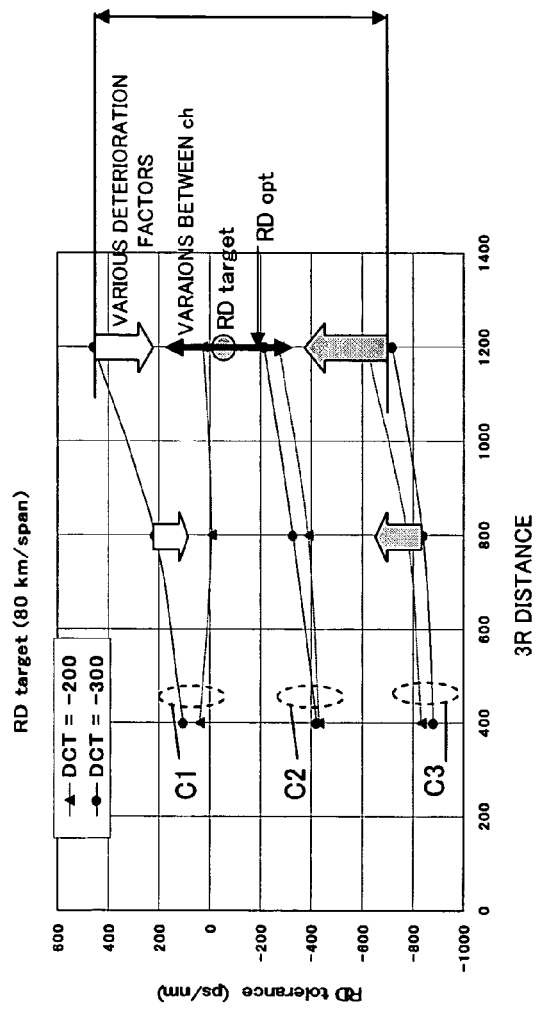
FIG. 14B is a view for describing an example relationship between a transmission distance and a dispersion pre-dispersion compensating quantity, both pertaining to the first embodiment of the present invention.

FIG. 14B is a view showing an example relationship between a transmission distance and the dispersion pre-compensation quantity according to the first embodiment of the present invention. The residual dispersion tolerance on the vertical axis increases with the transmission distance (e.g., a 3R distance), which is denoted by the horizontal axis. The curves C1 to C3 change according to various deterioration factors and the influence between channels. In relation to all of the curves C1 to C3, the residual dispersion tolerance values are understood to be small at respective points representing the transmission distance when the dispersion pre-compensation quantity is larger (e.g., DCT=−200; indicated by solid circles) as compared to the case where the dispersion pre-compensation quantity is small (e.g., DCT=−300: indicated by points of a triangle).

Therefore, the management control section 1$w$ of the present invention compensates for the compensation quantity of the bifurcated or inserted light, by means of changing the pre-dispersion compensation quantities of the nodes 1 to 7 at the starting point of a path having a dispersion quantity—which falls outside the range of the target dispersion quantity—among the plurality of paths.

Therefore, the transmission-side node performs dispersion pre-compensation in advance, whereby the real residual dispersion quantities can be made to fall within the range of a target value (RD target) of the residual dispersion tolerance in the vicinity of the optimum value (RD opt) of the residual dispersion tolerance. As a result, the path #3 which has undergone dispersion adjustment is added to the WDM light at the node 3, and the WDM light is transmitted from the transmission line 90. After addition of the path, the manner in which dispersion and a nonlinear optical effect arises in the optical fiber changes. Specifically, the residual dispersion tolerance varies in accordance with the magnitude of the dispersion pre-compensation quantity. The dispersion pre-compensation quantity determines the waveform of the signal light. Hence, superior transmission of the signal light through the path #3 becomes feasible.

As mentioned above, under the dispersion compensating method of the present invention, priorities are imparted to the respective paths #1 to #3, and the path #3 having a lower priority is compensated for by means of the nodes 4 and 5 located downstream of the node 3 adjusting respective dispersion quantities. Thereby, the paths #1 to #3 can be appropriately compensated for.

Under the dispersion compensating method of the present invention, the respective parameters are managed and controlled by means of managing and controlling the respective parameters. Processing pertaining to the compensation quantity setting step is performed as shown in (i) to (iii).

(i) The respective nodes 1 to 8 specify a path where the dispersion quantity deviates from the target dispersion quantity (a specifying step). The receiving nodes of the nodes 1 to 8 compensate for a dispersion quantity of the path specified in the specification step (a receiving side compensation step). Here, the receiving-side node is, e.g., the receiving terminal node 28 or a node disposed downstream (in the direction of transmission) when communication is established between different nodes.

(ii) The respective nodes 1 to 8 specify a path where the dispersion quantity deviates from the target dispersion quantity (a specification step). The transmission-side node of the nodes 1 to 8 changes the pre-dispersion compensation quantity of the path specified in the specification step. Of the nodes 1 to 8, the transmission-side node compensates for the dispersion quantity of the pre-dispersion compensation quantity changed in the specification step (a pre-dispersion compensation step) Here, the transmission-side node is, e.g., the transmission terminal node 21 or a node disposed upstream (at a position opposite the direction of transmission) when communication is established between different nodes.

(iii) The nodes 1 to 8 specify the path where the dispersion quantity deviates from the target dispersion quantity (a specification step). Of the nodes 1 to 8, the transmission terminal node 21 on the transmission side adjusts the chirp parameters $\alpha$ of the transmission sections (31, 101) of the transmission terminal node 21 shown in FIG. 1, in connection with the path specified in the specification step (a chirp processing step). The respective nodes 1 to 8 compensate for the dispersion quantity of the output light whose wavelength has fluctuated on the basis of the chirp parameter $\alpha$ adjusted in the chirp processing step (a compensation step).

Thereby, for instance, the nodes 1 to 8 such as the signal light regeneration nodes do not need to regenerate the signal light, and costs associated with system development and operation can be curtailed, by means of a reduction in the number of signal light regeneration nodes.

Moreover, the management control section 1$w$ has functions corresponding to (i) to (iii).

(i) A function for compensating for the dispersion quantity of the bifurcated or inserted light by means of the dispersion compensating modules 31, or the like, provided in the respective nodes 1 to 8, compensating for the path which has a dispersion quantity falling outside the range of the target dispersion quantity, among the three paths.

(ii) A function for compensating for a dispersion quantity of the bifurcated or inserted light by means of the node at the starting point of the path changing the pre-dispersion compensation quantity, in connection with the path, among the three paths, that has a dispersion quantity falling outside the range of the target dispersion quantity.

(iii) A function for compensating for a dispersion quantity of the bifurcated or inserted light by means of the node at the starting point of the path changing the pre-dispersion compensation quantity, in connection with the path, among the three paths, that has a dispersion quantity falling outside the range of the target dispersion quantity.

In addition, the management control section 1$w$ also has a function of imparting priorities on the basis of transmission distances to the respective three paths #1 to #3 in the transmission span where the three paths are superimposed on each other.

According to the dispersion compensating method of the present invention, for example, a link-based dispersion compensating method and a path-based dispersion compensating method can be used in combination in response to the request for installing an optical transmission device (e.g., an add-and-drop node). As a result, flexible design becomes feasible, along with more efficient network design.

According to the dispersion compensation method of the present invention, deterioration of a signal due to a difference in paths rather than deterioration of a signal due to high-order dispersion is inhibited.

As mentioned above, the system 100 can dynamically change the compensation quantity by means of one or more dispersion compensators controlling the dispersion quantity on per-path basis through use of an individual channel DCM, a band DCM, or a variable DCM.

(6) Details of the Dispersion Compensating Method of the Present Invention

An example—in which a path-based dispersion compensating method of the present invention is effective—will be described hereinbelow. Specifically, steps S1 to S8 described by reference to FIG. 6 will be described in detail. In the drawings, those elements having the same reference numerals as those described previously denote the same elements.

(S1) Determination of a Priority Span

FIG. 15A is a view for describing a priority span according to the first embodiment of the present invention. In the path #1 of the system 100 shown in FIG. 15A, the signal light output from the node 1 is regenerated by the node 4, and the signal light is subjected to 3R processing before deterioration of an SN (Signal-to-Noise Ratio) reaches a threshold value. In the path #3, the signal light is added by the node 3, and the signal light is dropped at the node 5. Therefore, the SN ratio achieved at the node 4 has not yet reached a threshold value. Accordingly, the signal light regeneration section 24$a$ of the node 4 deletes processing pertaining to the path #3. In other words, under the dispersion compensation method of the present invention, only a path which has not yet been deteriorated is eliminated from the plurality of paths #1 to #$n$ (e.g., three paths), and so-called vermiculated paths #1 to #$n$ are processed.

The system 100 determines priority spans such that dispersion maps of, e.g., the paths #1 to #$m$, are prepared in descending sequence of distance and sets the paths #1, #2 as priority spans. The first half span of the path #3 shares the dispersion map of the path #1, and the latter half span of the path #3 shares the dispersion map of the path #2.

The signal light regeneration section 24$a$ of the node 4 is held in a non-operating state before operation of the system 100 until the priority span is determined. Hence, before operation of the system 100, the signal light regeneration section 24$a$ is not provided. After operation of the system 100, the system may stop for reasons of occurrence of a failure or maintenance inspection. In this case, the signal light regeneration section 24$a$ is deleted or removed from the transceiving section of the REG node 24 or the optical packet processing section, or the like, and hence remains unconnected. Thus, the 3R processing function is prevented from acting on the received WDM light.

In step S1 or in a period up to steps S2 to S5 which will be described later, the REG node 24 is left unconnected, and in step S6 the transceiving section or the optical packet processing section is mounted on the REG node 24.

(S2) Preparation of a Dispersion Map (i) System Installation

Installation of the compensation quantity in step S2 shown in FIG. 2 will now be described.

In relation to the designing of the system 100, the positions of the dispersion compensator and compensation quantities are first determined on the basis of a linkage showing connections among the transmission terminal node 21, the relay nodes 22, 26, and 27, the OADM nodes 23, 25, and the nodes 1 to 8 of the receiving terminal node 28. The determination is generally referred to as designing of a link-based design. In addition to having the link-based design, the dispersion compensation method of the present invention is additionally provided with a path-based design technique.

In relation to the link-based design, the wavelength of another single light which differs in wavelength from the signal light which causes the transmission line 90 to effect zero dispersion, even in the case where any single light beam included in the WDM light is subjected to compensation such that the dispersion quantity of the single light becomes zero dispersion, and hence a positive dispersion quantity is accumulated. Accordingly, the designer examines beforehand the positions of the dispersion compensators, intervals between the dispersion compensators, a dispersion quantity, a residual dispersion quantity, and a compensation quantity by means of measurement or transmission simulation. Thus, a dispersion map is prepared.

The designer sets the transmission line 90 having the dispersion quantity, or the like, determined through transmission simulation. The WDM light is input to the transmission line 90, thereby measuring the dispersion quantities of the respective transmission spans, the total dispersion quantity of the entire system 100, deterioration of a waveform, or the like, and then evaluating the characteristics of the real transmission line 90. On the basis of details of evaluation, the designer distributes the total compensation quantity corresponding to the total dispersion quantity to the respective nodes 1 to 8, the devices, and the relay nodes, thereby installing the system 100.

(ii) Band Collective Dispersion Compensator 30

Dispersion of the respective wavelengths included in the WDM light are equally compensated for.

FIG. 15B is a view showing an example dispersion map using the band collective dispersion compensator 30 according to the first embodiment of the present invention. The horizontal axis shown in FIG. 15B represents a distance from the transmission terminal node 21. The same applies to other corresponding drawings to be described later. For instance, P1 shown in FIG. 15B denotes a dispersion quantity of the signal light which has not yet been input to the band collective dispersion compensator 30, and P2 denotes a dispersion quantity of the signal light. The dispersion quantity of the WDM light is collectively improved by the band collective dispersion compensator 30. A dispersion quantity V acquired at points P4, P5 represents the residual dispersion target acquired at the time of designing of the system 100. When the dispersion quantity of the WDM light is in the vicinity of the residual dispersion target, high-quality transmission becomes feasible.

The ideal dispersion quantity variation waveform assumes a constant value which connects points P4, P5. The dispersion variation waveform increases for reasons of dispersion of the transmission line (see P3). An increase and a decrease in the dispersion quantity are repeated.

As mentioned above, on the basis of the dispersion information about the transmission line 90, the system 100 determines the compensation quantity of the band collective dispersion compensator 30. As a result, the dispersion maps of the paths #1, #2, which are priority spans, are determined.

As mentioned above, in relation to establishment of the system 100 which effects long-distance optical communication requiring elaborate dispersion compensation, efficient management of dispersion compensation becomes possible in the respective operations for facilitating a dispersion compensation design in a circuit design; procuring the dispersion compensator and reducing inventories, simplifying introductory operations at the time of establishment of the system 100, and simplifying setting operation at the time of changing of a line route.

Deterioration of a signal attributable to high-order dispersion and deterioration of a signal attributable to a difference in paths can be prevented, thereby enabling an attempt to increase a distance. Accurate wavelength dispersion compensation of all wavelength bands utilized for long-distance optical communication can be realized without depending on the types of optical fibers of lines and a line distance, by means of designing the dispersion compensation function of the optical fibers of respective types for each wavelength dispersion and arbitrarily setting dispersion compensation according to a line distance.

(S3) Preparation of a Virtual Dispersion Map of a Path in Non-Priority Span

Figure 16A:
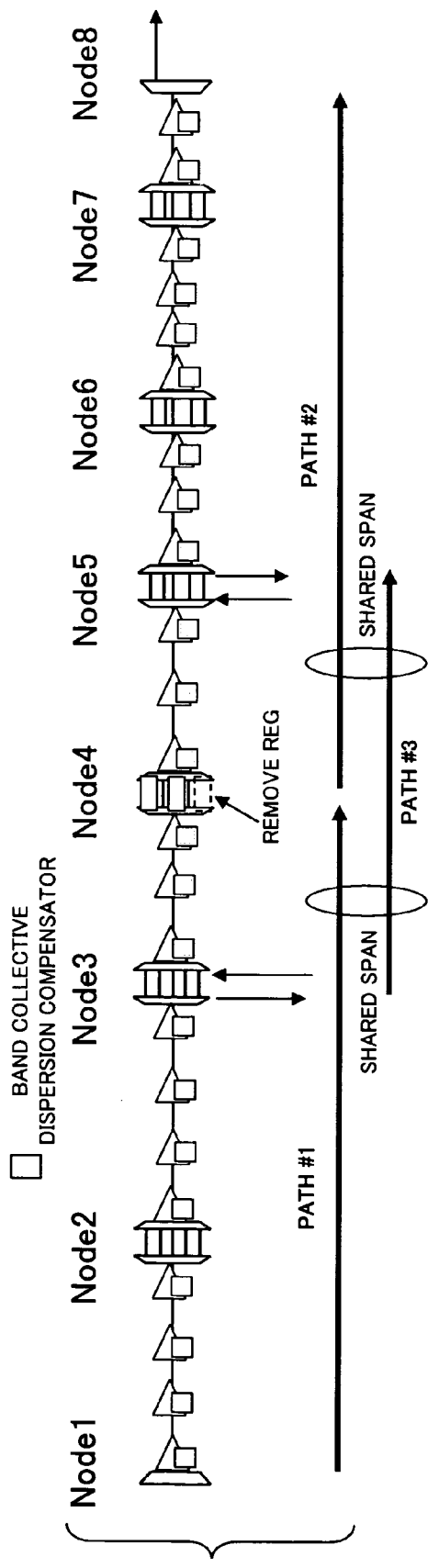
FIG. 16A is a view for describing a transmission span for preparing a virtual dispersion map according to the first embodiment of the present invention.

FIG. 16A is a view for describing a transmission span for which a virtual dispersion map according to the first embodiment of the present invention is prepared. An interval between the nodes 3 and 4 where the paths #3 and #1 shown in FIG. 16A are superimposed on each other and an interval between the nodes 4 and 5 where the paths #1 and #2 are superimposed on each other, the paths #3, #2, and #1 being shown in FIG. 16A, are subjected to the same dispersion compensation quantity, and details thereof will be described later. Here, the "virtual" dispersion map is for assisting preparation of the dispersion maps of the paths #1, #2 of the priority spans. The dispersion map of the path #3 in the non-priority segment is prepared in advance of those for the paths #1, #2 of the priority spans.

Figure 16B:
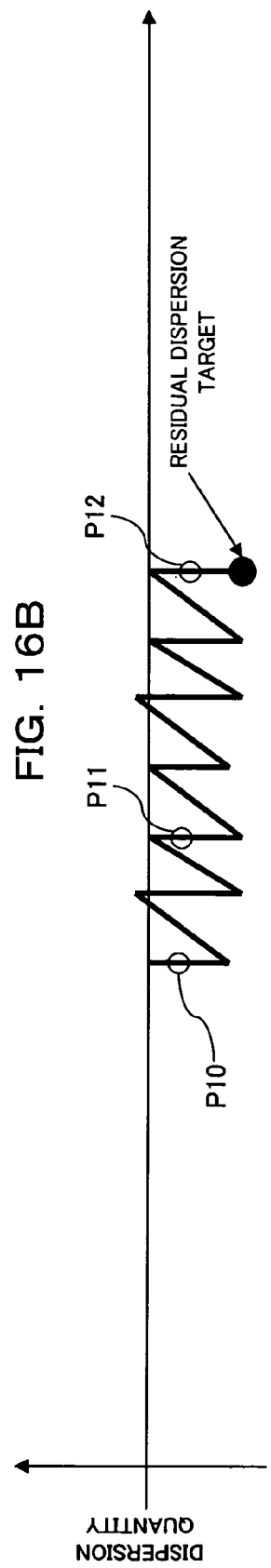
FIG. 16B is a view showing an example of virtual dispersion map of a path in a non-priority span according to the first embodiment of the present invention.

FIG. 16B is a view showing an example of the virtual dispersion map of the path #3 in the non-priority span according to the first embodiment of the present invention. P10 to P12 of the dispersion quantity variation waveform shown in FIG. 16B denote improvements in dispersion quantity acquired after the nodes 3 to 5 have been virtually compensated for. Although not having reached a threshold value, the SN ratio of the path #3 is compensated by the compensation quantities of the paths #1, #2.

By means of such a configuration, the virtual compensation quantity of the path #3 in the band collective dispersion compensator 30 is determined on the basis of the dispersion information about the transmission line 90. Thereby, the dispersion maps of the respective paths #1, #2 in the priority spans are determined.

Figure 17A:
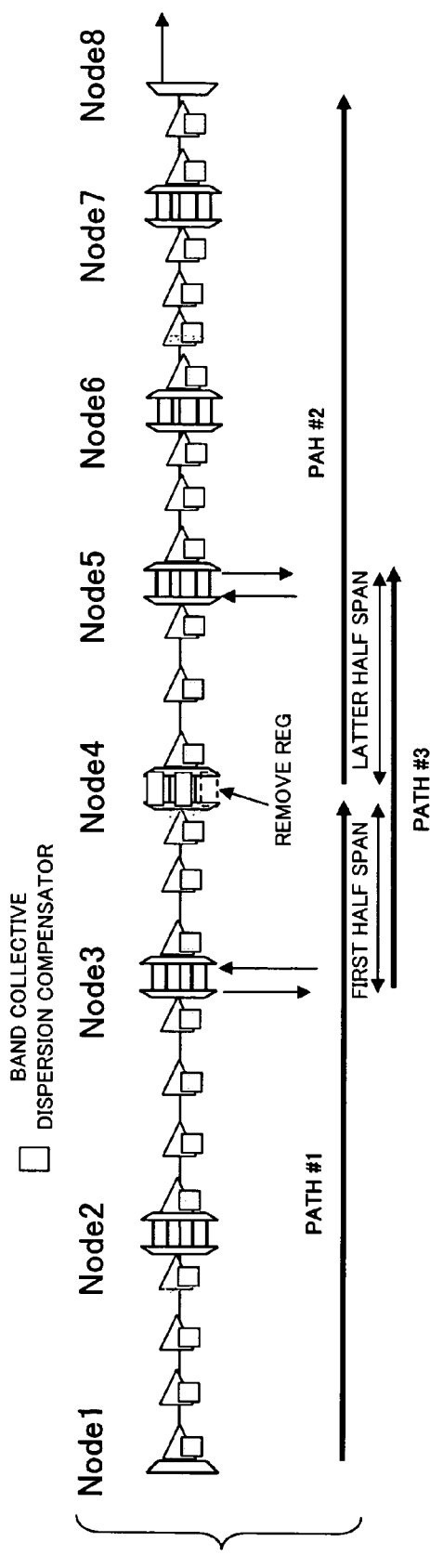
FIG. 17A is a view for describing a difference computation span to be used for computing a difference between dispersion maps according to the first embodiment of the present invention.
Figure 17B:
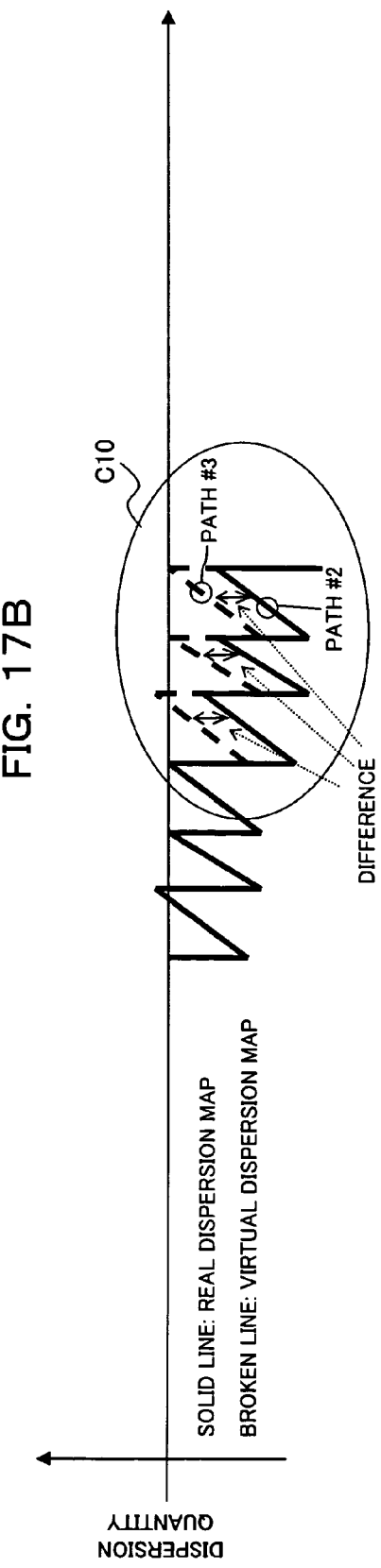
FIG. 17B is a view showing an example real dispersion map and an example virtual dispersion map pertaining to the difference computation span according to the first embodiment of the present invention.

(S4) Computation of a Difference Between a Real Dispersion Map and a Virtual Dispersion Map FIG. 17A is a view for describing a difference computation span for computing a difference in the dispersion maps according to the first embodiment of the present invention. FIG. 17B is a view showing an example real dispersion map and a virtual dispersion map pertaining to a difference computation span according to the first embodiment of the present invention. In an area enclosed by an oval C10 shown in FIG. 17B, the dispersion variation waveform indicated by a solid line is a virtual dispersion map. The dispersion quantity variation waveform indicated by a dashed line is a virtual dispersion map. A check is made as to whether or not the real dispersion maps of the paths #1 and #2 and the virtual dispersion map are identical with each other. In the latter half span shown in FIG. 17A, the transmission distance of the path #3 is longer than the transmission distance of the path #2, and hence the path #3 is deteriorated by dispersion as compared with the path #2.

Accordingly, the dispersion quantity of the path #3 is larger than those of the paths #1 and #2. As a result, a difference between the solid line and the dashed line is computed as a difference quantity in connection with the transmission distance.

(S5) Computation of the Residual Dispersion Tolerance

Figure 18A:
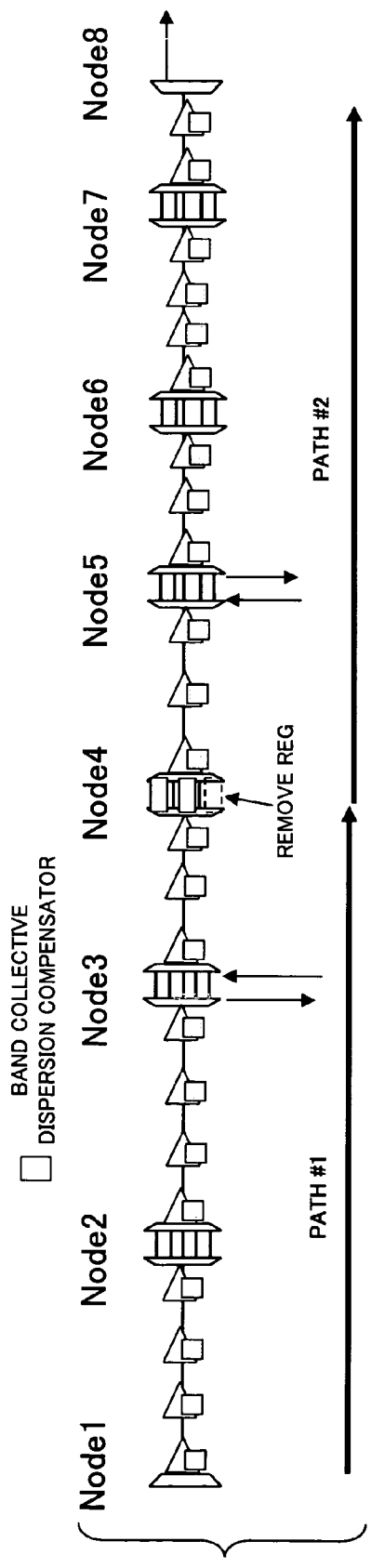
FIG. 18A is a view for referring to the position of a residual dispersion tolerance according to the first embodiment of the present invention.
Figure 18B:
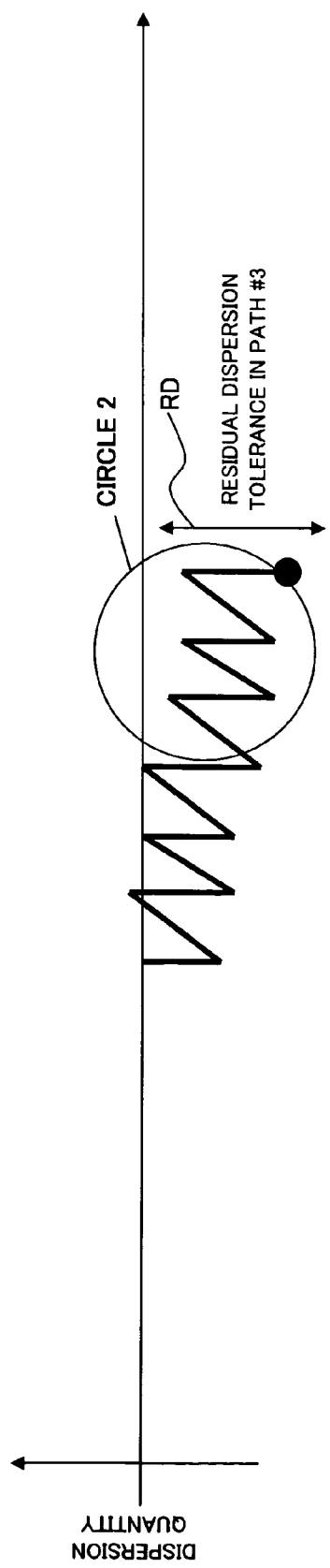
FIG. 18B is a view showing an example residual dispersion tolerance according to the first embodiment of the present invention.

FIG. 18A is a view for referring to the position of the residual dispersion tolerance according to the first embodiment of the present invention. FIG. 18b is a view showing example residual dispersion tolerance according to the first embodiment of the present invention. The dispersion quantity variation waveform of the path #3 shown in FIG. 18B gradually decreases (deteriorates) while varying in the direction of dispersion quantity (the direction of the longitudinal axis). Further, the variation width (RD: residual dispersion tolerance) of a portion of the dispersion quantity variation waveform corresponding to the position of the node 5 represents the residual dispersion tolerance of the path #3. Thereby, a determination is made as to whether or not the residual dispersion quantity using the real dispersion map falls within the allowable range of the residual dispersion tolerance value.

During a period in which the system 100 is operating, the residual dispersion quantity is required to assume a target value. However, at the time of the path-based design, the residual dispersion quantity does not need to assume the target value.

(S6) Adjustment Performed by the Dispersion Compensation Modules

FIG. 19A is a view showing an example position where the dispersion compensation modules 31 according to the first embodiment of the present invention are disposed. The drawing shows a state in which the node 4, 5 shown in FIG. 19A are provided with the dispersion compensation modules 31, respectively. Here, on the basis of the difference between the dispersion maps acquired in steps S4, S5 and the residual dispersion tolerance, the compensation quantities of the respective dispersion compensation modules 31 are computed, and the dispersion map of the path #3 is compensated for with the computed compensation quantity. By means of the compensation, the difference and the residual dispersion tolerance are compensated for. If compensation cannot be performed, the path-based designing of the path #3 is not performed and completed.

FIG. 19B is a view showing an example dispersion quantity variation waveform which has been subjected to dispersion adjustment through use of the dispersion compensation modules 31 of the first embodiment of the present invention. In spite of an increase in distance, the dispersion quantity variation waveform of the area enclosed by the circle 3 shown in FIG. 19B is improved as compared with the area enclosed by a circle 2 shown in FIG. 18B in terms of a dispersion quantity.

The signal light having the waveform $\lambda 3$ is subjected to dispersion compensation in the dispersion compensation module 31, and the thus-compensated signal light having a wavelength $\lambda 3$ is again merged with other signal light and subjected to wavelength multiplexing. In the meantime, the signal light—which is dropped at the node 3 and has a wavelength $\lambda k$ other than the signal light having a wavelength $\lambda 3$—is input to the (n−1) REG nodes 24, and the thus-input signal light is subjected to 3R processing in the respective REG nodes 24. The signal light beams having wavelengths $\lambda 1$ to $\lambda n$ of "n" waves stemming from the dispersion-adjusted signal light having a wavelength $\lambda 3$ are again wavelength-multiplexed with the (n−1) signal light beams having a wavelength $\lambda$, having undergone 3R processing, and the resultant signal light is transmitted to the node 5.

Thereby, the path #3 (signal light) having been dropped at the node 5 is subjected to dispersion adjustment by the dispersion compensating module 31, and the signal light having undergone dispersion adjustment is output.

The number of paths can be increased to four or more, and the path-based design becomes possible by means of performing the processing in the same manner as mentioned previously.

Accordingly, the dispersion compensation method is for use with the system 100 which compensates for a real dispersion quantity attributable to the WDM light and transmits the WDM light.

At the outset, the system 100 of, e.g., the management control section 1, determines two priority spans for the two paths (paths #1, #2) among the three paths #1 to #3, on the basis of the transmission distances of the three paths #1 to #3 of the transmission spans of the nodes 3, 4 and the nodes 4, 5, where, e.g., three paths #1 to #3 are superimposed on each other, the transmission spans including the nodes 1 to 8 by way of which the WDM light is transmitted (a priority span determination step).

Next, the system 100 prepares a real dispersion map showing variation characteristics of the dispersion quantity of the light input to and those of the dispersion quantity of the light output from the eight nodes 1 to 8 in connection with the priority span paths (#1, #2) determined in the priority span determination step. In connection with the non-priority span (the path #3) determined in the priority span determination step, there is prepared a virtual dispersion map showing variation characteristics of the dispersion quantity of the input light and those of the dispersion quantity of the output light (a virtual dispersion map preparation step).

On the basis of information about a difference between the real dispersion map prepared in the real dispersion map preparation step and a virtual preparation map prepared in the virtual dispersion map preparation step and the respective residual dispersion tolerance values, the system 100 determines the compensation quantities of the nodes 3 to 5 of the eight nodes 1 to 8 (a compensation quantity determination step). The dispersion quantity in the non-priority span is compensated with the compensation quantity determined in the compensation quantity determination step (a non-priority span compensation step).

In the compensation quantity determination step, a determination is made as to whether or not the residual dispersion quantity based on the real dispersion map prepared in the real dispersion map preparation step falls within the allowable range of the residual dispersion tolerance value, thereby determining compensation.

As mentioned above, according to this system 100, accurate wavelength dispersion compensation of all wavelength bands utilized for long-distance optical communication can be realized without depending on the types of optical fibers of lines and a line distance, by means of designing the dispersion compensation function of the optical fibers of respective types for each wavelength dispersion slope and arbitrarily setting dispersion compensation according to a line distance. In relation to establishment of a long-distance optical communications system requiring elaborate dispersion compensation, efficient management of dispersion compensation becomes possible, such as operations for facilitating a dispersion compensation design in a circuit design; procurement of the dispersion compensator and reducing inventories, simplifying installation at the time of establishment of the system 100, and simplifying setting operation at the time of changing of a line route.

As mentioned above, under the dispersion compensation method according to the first embodiment of the present invention, a desired single light beam of the single light beams of "n" waves included in the WDM light can be compensated for.

(B) Description of a Second Embodiment of the Present Invention

The dispersion compensation method of the present invention can be applied to a network without regard to the configuration thereof.

Figure 20:
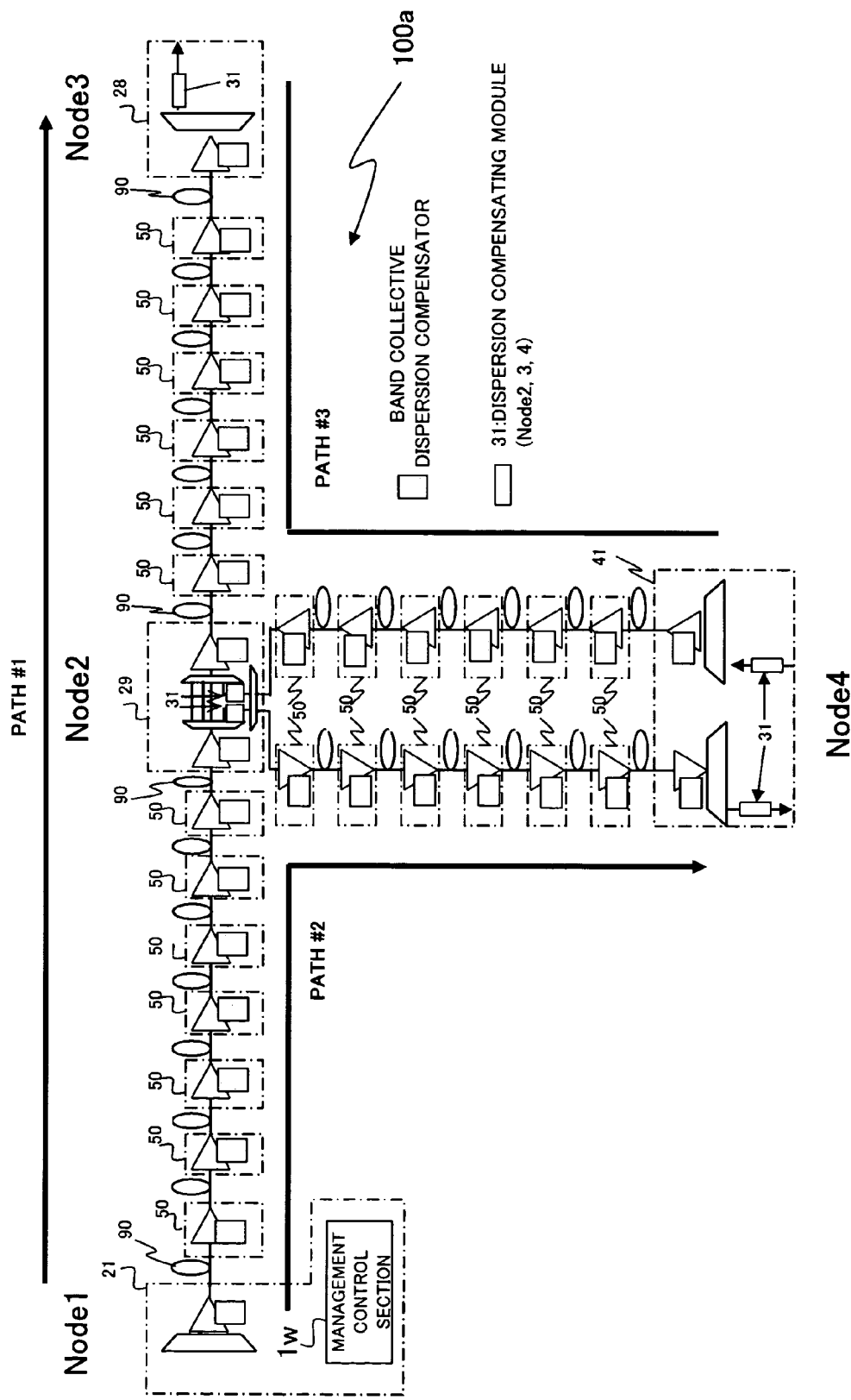
FIG. 20 is a block diagram of a WDM transmission system according to a second embodiment of the present invention.

FIG. 20 is a block diagram of a WDM transmission system according to a second embodiment of the present invention. A system 100a shown in FIG. 20 is for transmitting the WDM light. This system is a hub (HUB) network equipped with a hub node 29 having the function of dividing channels included in the WDM light according to the control information about the signal light or destinations included in the channels. The system 100a comprises a first transmission line 90 for transmitting the WDM light from the transmission terminal node 21 to the receiving terminal node 28 by way of the hub node 29; a second transmission line 90 for transmitting the WDM light from the hub node 29 to the transceiving node 41; and a third transmission line 90 for transmitting the WDM light from the transceiving terminal node 41 to the hub node 29. Specifically, the four nodes 21, 28, 29, and 41 are provided in a hub-type network. An example of the system 100a is configured, by means of adding another main trunk WDM transmission system or an optical access transmission system to the fundamental trunk WDM transmission system disposed between the transmission terminal 21 and the receiving terminal 28 (an interval between Term and Term).

The hub node 29 receives the WDM light from the transmission terminal node 21 and transmits the thus-received WDM light to the receiving terminal node 28 or the transceiving terminal node 41. The WDM light output from the transceiving terminal node 41 is transmitted to the receiving terminal node 28, and the WDM light is subjected, in its present form, to directional switching. Thus, the hub node 29 is acting as a hub. Specifically, the WDM light is subjected to various operations performed by the hub node 29; that is, OEO conversion, addition of the signal light having a specific wavelength to the WDM light, dropping of signal light having a specific wavelength from the WDM light, and switching of the direction of the WDM light in its present form without involvement of optical switching operation to be performed by an optical device.

The second embodiment is described by means of taking, as the nodes 1 to 4, the transmission terminal node 21, the hub node 29, the receiving terminal node 29, and the transceiving terminal node 41. The paths #1, #2 and #3 represent the nodes 1 to 2 to 3, the nodes 1 to 4, and the nodes 4 to 2. The inline amplifier 50 is identical with that described in connection with the first embodiment. Those elements having the reference numerals which are the same as those previously described have the same or corresponding functions, and hence further detailed explanations thereof are omitted.

(i) About the Longest Paths (e.g., the Paths #1, #3)

In relation to the longest paths, the system 100a selects the original band collective dispersion compensator 30 according to a desired rule.

(ii) About the Second Longest Path (e.g., the Path #2)

The system 100a selects a collective dispersion compensation quantity about an interval between the nodes 1 and 3 according to the rule. This is an original selecting method. There is described an allocating method, wherein, in relation to an interval between the node 1 and the hub node 29, the system 100a allocates the collective dispersion compensating quantity selected in (i) to the priority spans of the paths consisting of the paths #1 to #6.

In relation to an interval between the hub node 29 and the node 3, the system 100a temporarily determines the collective dispersion compensation quantity selected in (ii).

In relation to an interval between the node 1 and the node 3, the system 100a checks whether or not the dispersion map of the band collective dispersion compensator 30 to be originally selected and the dispersion map of the really-selected band collective dispersion compensator 30 are identical with each other. Subsequently, the residual dispersion tolerances are checked. When the result of check of the dispersion maps show that the maps are not identical with each other, the system 100a arranges a dispersion compensating module for an individual channel in connection with the node 1, the dispersion compensation node CN, and the hub node 29, thereby causing the dispersion maps to fall within the allowable range of the dispersion map.

In relation to an interval between the nodes 1 and 3, the system 100a checks the residual dispersion tolerance including the residual dispersion tolerance of the dispersion compensating module for an individual channel (simply called an "individual-channel dispersion compensating module") placed between the node 1 and the hub node 29. Specifically, the system 100a adjusts the receiving dispersion compensating module of the node 3 such that the residual dispersion tolerance falls within the allowable range of the residual dispersion tolerance, and the individual-channel dispersion compensating module is applied to an excess or deficiency in the dispersion compensation quantities acquired after adjustment.

(iii) About the Third Longest Path (e.g., the Path #5)

According to the rule, the system 100a selects the band collective dispersion compensator 30 interposed between the nodes 3 and 1 (selects the original band collective dispersion compensator 30). In relation to an interval between the node 3 and the hub node 29, the system 100a temporarily determines the selected band collective dispersion-compensator 30. In relation to an interval between the hub node 29 and the node 3, the system 10a temporarily determines the individual-channel dispersion compensating module selected in (ii).

In relation to the interval between the nodes 3 and 1, the system 100a checks the dispersion maps and the residual dispersion tolerances. Here, when the result of checking shows that the dispersion maps are nonidentical with each other, the system 100a provides the individual-channel dispersion compensating module for the node 3, the hub node 29, the dispersion compensation node CN, and the node 1, respectively, thereby causing a total of the dispersion compensation quantities of the dispersion compensation quantities to fall within the allowable range of the dispersion maps.

The system 100a checks the residual dispersion tolerances, including the residual dispersion tolerance of the individual band collective dispersion compensator 30, thereby adjusting the receiving dispersion compensation module of the node 3 such that the real residual dispersion quantities fall within the allowable range of the residual dispersion tolerance. With regard to an excess or deficiency in the dispersion compensation quantities, the individual-channel dispersion compensating module is applied.

(iv) About remaining paths (e.g., the paths #4, #6)

According to the rule, the system 100a selects the band collective dispersion compensator 30 interposed between the nodes 3 and 2 (selects the original band collective dispersion compensator 30). Since the band collective dispersion compensator 30 has already been selected, the system 100a checks the dispersion map and the residual dispersion tolerance of the original band collective dispersion compensator 30 which has been acquired according to the rule.

The system 100a selects the individual band collective dispersion compensator 30, as required and if possible, so as to satisfy the dispersion map and the residual dispersion tolerance.

The system 10a again checks the dispersion map and the residual dispersion tolerance, thereby ascertaining whether or not the dispersion map and the residual dispersion tolerance are satisfied.

(v) When the dispersion map and the residual dispersion tolerance are not satisfied in view of the given requirements (a result of a determination as to whether or not the individual band collective dispersion compensator 30 is allowable), the system 100a disables transmission of the channel to be transmitted by the path.

As mentioned above, even when the network assumes a hub-type configuration, the WDM transmission system 100a of the present invention enables realization of accurate wavelength dispersion compensation of all wavelength bands utilized for long-distance optical communication without depending on the types of optical fibers of lines and a line distance.

Further, efficient management of dispersion compensation becomes feasible.

Next will be described in detail the dispersion compensating method according to the second embodiment of the present invention.

The first half portions of the paths #1, #2 shown in FIG. 20 are superimposed on each other (a first superimposing span), and the latter half portions of the paths #1, #3 are superimposed on each other (a second superimposing span).

When the priority span is the path #1 in the first superimposing span, the first half portion of the path #2 is a span—which shares the first half portion of the path #1—and subjected to the same dispersion compensating.

Hence, a deviation arises between the virtual dispersion map and the real dispersion map, both pertaining to the path #2. The hub node 29 (node 2) adjusts the deviation through use of the dispersion compensating module provided at the hub node 29. When the deviation of the hub node 29 is not large, final adjustment can be carried out through use of the dispersion compensating module of the node 4.

Moreover, in relation to the second superimposing span, when the priority span is the path #1, the latter half portion of the path #3 shares the latter half portion of the path #1. Again, the latter half portion of the path #3 is subjected to the same compensation quantity. Hence, a deviation arises between the virtual dispersion map and the real dispersion map, both maps belonging to the path #3. The hub node 29 adjusts the deviation through use of the dispersion compensating module provided at the hub node 29. When the deviation of the hub node 29 is not large, final adjustment can be carried out through use of the dispersion compensating module of the node 4.

The management control section 1w (not shown) is provided at the node 1.

The system 100a according to the second embodiment of the present invention can also use a transmission chirp. The node 4 shown in FIG. 20 converts, through EO conversion, the information data into signal light having any wavelength λ among the wavelengths λ1 to λn. Further, the node 4 adds a desired chirp level to the thus-converted signal light, thereby adjusting the chirp level of the signal light. Thereby, the chirp level of the path #3 is adjusted, and transmission of light through the path #3 becomes possible.

Figure 21A:
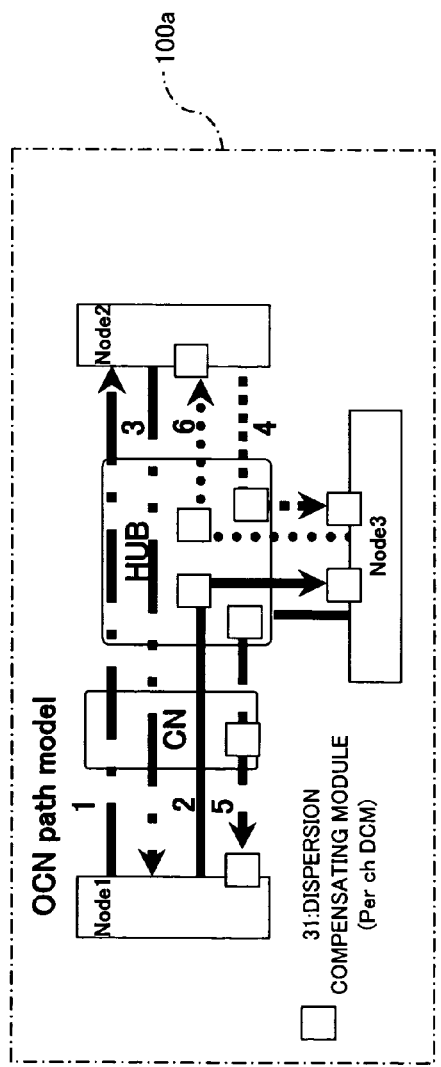
FIG. 21A is a view for describing a path-based design according to a second embodiment of the present invention.

FIG. 21A is a view for describing a path-based design according to the second embodiment of the present invention. The system 100a shown in FIG. 21A is configured to have the nodes 1 to 3; the dispersion compensating node CN (Compensating Node); and a hub node HUB. The nodes 1 to 3, the dispersion compensating node CN, and the hub node HUB each are provided with one or a plurality of dispersion compensating modules (Per Channel DCM) which subject any single light beam included in the WDM light to dispersion compensation. Moreover, the paths #4, #5 other than the path #3 correspond to spans between the nodes 2 and 3 and between the nodes 1 and 3. Even in relation to the paths #4, #5, the dispersion compensating module DCM is set for the starting point and end point of the inter-node dispersion quantity $MD_j$ using the inter-node dispersion quantity summation section 1b shown in FIG. 11 and a desired value of the database 1c.

Therefore, the dispersion compensating method of the present invention is for use with the WDM transmission system 100a which compensates for the real dispersion quantity attributable to the WDM light and transmits the thus-compensated WDM light.

For instance, the nodes 2 to 4 which are provided in the WDM transmission system 100a and transmit the WDM light measure a real dispersion quantity (a measurement step). The management control section 1w provided at the node 1 of the WDM transmission system 100a computes dispersion quantities of respective transmission spans on the basis of the real dispersion quantity measured in the measurement step and the designed dispersion quantities of the respective transmission spans (a computation step). The management control section 1w notifies the compensation quantities computed in the computation step to the nodes 2 to 4 (a compensation quantity notification step). Further, the thus-notified nodes 2 to 4 set the compensation quantities of the nodes 2 to 4 on the basis of the thus-notified compensation quantities (a compensation quantity setting step).

Thus, the measured data are subjected to feedback control, thereby automatically, dynamically effecting dispersion compensation.

Figure 21B:
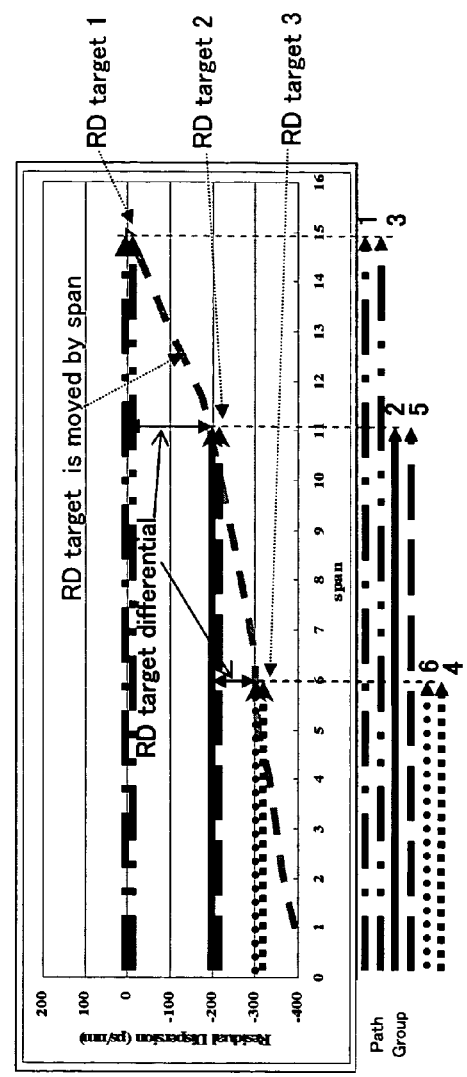
FIG. 21B is a view showing an example dispersion map according to the second embodiment of the present invention.

FIG. 21B is a view showing an example dispersion map according to the second embodiment of the present invention. The horizontal axis shown in FIG. 21B represents a transmission span. Distances of six types of paths #1 to #6 (15 spans) shown in FIG. 21A are represented while the transmission span is taken as a guideline. For example, the paths #1, #3 are the longest (15 spans); the paths #2, #5 correspond to 11 spans; and the paths #4, #6 are the shortest (six spans).

Under the dispersion compensation method according to the second embodiment of the present invention, the residual dispersion target values are separately allocated to, e.g., three types of path groups, respectively. For instance, the path #1, #3 assume a value of 0; the paths #2, #5 assume a value of −200; and the path #4, #6 assume a value of −300. The residual dispersion target value is interpolated in the three spans; that is, a span 0 to 6, a span 6 to 11, and a span 11 to 15. The residual dispersion target value is designed to vary from one span to another within the range of the span 0 to 15.

FIG. 22 is a view showing example attributes of the paths #1 to #6 according to the second embodiment of the present invention. The six types of paths #1 to #6 are set between the nodes 1 to 4, the dispersion compensation node CN, and the dispersion compensation modules.

The path-based dispersion compensation method according to the second embodiment of the present invention will be described in detail hereunder. Here, the priority spans are assumed to correspond to the paths #1, #3.

(i) About the Longest Path (e.g., the Paths #1, #3)

In relation to the longest paths, the system 100a selects the original band collective dispersion compensator 30 according to a desired rule.

(ii) About the Second Longest Path (e.g., the Path #2)

The system 100a selects a collective dispersion compensation quantity about an interval between the nodes 1 and 3 according to the rule. This is an original selecting method. There is described an allocating method, wherein, in relation to an interval between the node 1 and the hub node 29, the system 100a allocates the collective dispersion compensating quantity selected in (i) to the priority spans of the paths consisting of the paths #1 to #6.

In relation to an interval between the hub node 29 and the node 3, the system 100a temporarily determines the collective dispersion compensation quantity selected in. (ii).

In relation to an interval between the node 1 and the node 3, the system 100a checks whether or not the dispersion map of the band collective dispersion compensator 30 to be originally selected and the dispersion map of the really-selected band collective dispersion compensator 30 are identical with each other. Subsequently, the residual dispersion tolerances are checked. When the result of check of the dispersion maps show that the maps are not identical with each other, the system 100a arranges a dispersion compensating module for an individual channel with regard to the node 1, the dispersion compensation node CN, and the hub node 29, thereby causing the dispersion quantities to fall within the allowable range of the dispersion map.

In relation to an interval between the nodes 1 and 3, the system 100a checks the residual dispersion tolerance including the residual dispersion tolerance of the individual-channel dispersion compensating module for an individual channel placed between the node 1 and the hub node 29. Specifically, the system 100a adjusts the receiving dispersion compensating module of the node 3 such that the residual dispersion tolerance falls within the allowable range of the residual dispersion tolerance, and the individual-channel dispersion compensating module is applied to an excess or deficiency in the dispersion compensation quantities acquired after adjustment.

(iii) About the Third Longest Path (e.g., the Path #5)

According to the rule, the system 100*a* selects the band collective dispersion compensator 30 interposed between the nodes 3 and 1 (selects the original band collective dispersion compensator 30). In relation to an interval between the node 3 and the hub node 29, the system 100*a* temporarily determines the selected band collective dispersion compensator 30. In relation to an interval between the hub node 29 and the node 3, the system 100*a* temporarily determines the individual-channel dispersion compensating module selected in (ii).

In relation to the interval between the nodes 3 and 1, the system 100*a* checks the dispersion maps and the residual dispersion tolerances. Here, when the result of checking shows that the dispersion maps are nonidentical with each other, the system 100*a* provides the individual-channel dispersion compensating module for the node 3, the hub node 29, the dispersion compensation node CN, and the node 1, respectively, thereby causing a total of the dispersion compensation quantities of the dispersion compensating modules to fall within the allowable range of the dispersion maps.

The system 100*a* checks the residual dispersion tolerances, including the residual dispersion tolerance of the individual band collective dispersion compensator 30, thereby adjusting the receiving dispersion compensation module of the node 3 such that the real dispersion quantities to fall within the allowable range of the residual dispersion tolerance. With regard to an excess or deficiency of the dispersion compensation quantities, the individual-channel dispersion compensating module is applied.

(iv) About Remaining Paths (e.g., the Paths #4, #6)

According to the rule, the system 100*a* selects the band collective dispersion compensator 30 interposed between the nodes 3 and 2 (selects the original band collective dispersion compensator 30). Since the band collective dispersion compensator 30 has already been selected, the system 100*a* checks the dispersion map and the residual dispersion tolerance of the original band collective dispersion compensator 30 which has been acquired according to the rule.

The system 100*a* selects the individual band collective dispersion compensator 30, as required and if possible, so as to satisfy the dispersion map and the residual dispersion tolerance.

The system 100*a* again checks the dispersion map and the residual dispersion tolerance, thereby ascertaining whether or not the dispersion map and the residual dispersion tolerance are satisfied.

(v) When the dispersion map and the residual dispersion tolerance are not satisfied in view of the given requirements (a result of a determination as to whether or not the individual band collective dispersion compensator 30 is allowable), the system 100*a* disables transmission of the channel to be transmitted by the path.

As mentioned above, the positions of the dispersion compensators, the compensation quantities, or the like are determined on the basis of the link showing the interconnection among the nodes, and the path-based designing is carried out. Therefore, more adequate dispersion compensation becomes feasible. Moreover, dispersion compensation can be carried out in accordance with the types of optical fibers used in respective lines and the distances of the lines, and hence a design efficiency is enhanced significantly.

(C) Descriptions of a Third Embodiment of the Present Invention

The configuration of the network of the WDM transmission system can also assume a ring shape. The third embodiment is identical with the first and second embodiments in terms of the basic idea of the dispersion compensation method. Dispersion adjustment is performed by the respective nodes 1 to 8, thereby transmitting the signal light while making the dispersion maps close to a virtual dispersion map.

Figure 23:
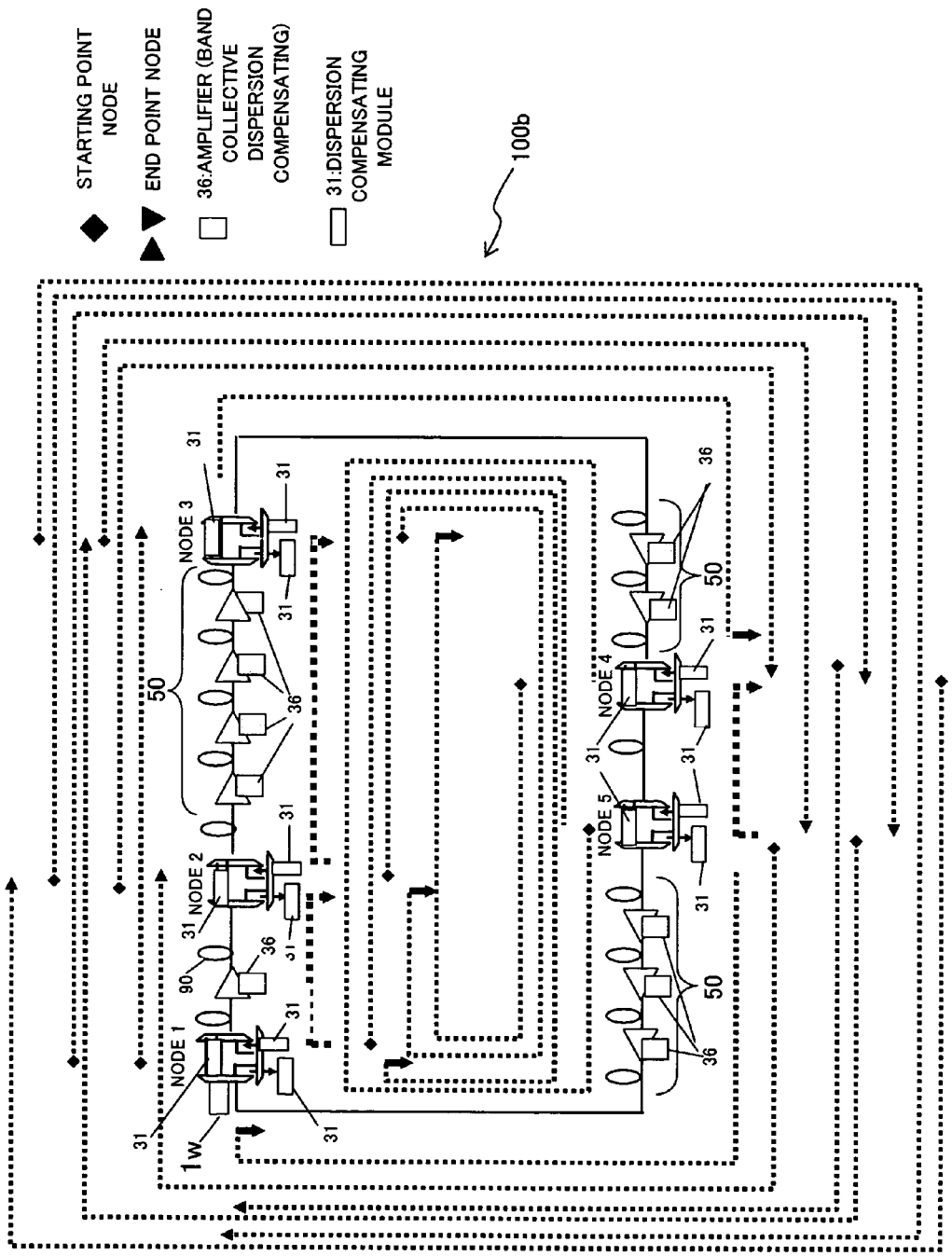
FIG. 23 is a block diagram of a WDM transmission system according to a third embodiment of the present invention.

FIG. 23 is a block diagram of a WDM transmission system 100*b* according to the third embodiment of the present invention. In the system 100*b* shown in FIG. 23, five nodes (ring nodes: optical transmission devices) 1 to 5, for example, constitute a ring-type network by way of the inline amplifier 50, and a plurality of paths are set. Here, a diamond shape depicts a starting point, and the extremity of the arrow indicates the end point. Specifically, the node 1 has four paths to a node 2, a node 3, a node 4, and a node 5. The node 2 also has four paths to the other nodes. Thus, a total of 20 paths are set.

Any one of the nodes 1 to 5 (e.g., the node 1) is provided with the monitoring light output section 59, and the other nodes, e.g., 2 to 5, are provided with the accumulated dispersion measurement sections 60, respectively. By means of them, the respective nodes 1 to 5 can determine an appropriate compensation quantity and enable feedback control.

Those elements assigned the reference numerals which are the same as those shown in FIG. 23 denote the same elements.

By means of such a configuration, the system 100*b* shown in FIG. 23 will be described in association with the steps S1 to S8 shown in FIG. 6. For instance, under the method for compensating for the dispersion accumulated between the nodes 1 and 3, the management control section 1*w* (not shown) determines one or more priority path and a non-priority path on the basis of the respective transmission distances of the plurality of paths (step S1). The compensation quantities of the respective paths are installed (step S2). The accumulated dispersion quantities (MD) in the respective nodes 2 to 5 are measured (step S3). The management control section 1*w* collects the accumulated dispersion quantities MD1 to MD5 by way of the OSC light, and the virtual dispersion maps of the priority paths are prepared, thereby computing an ideal accumulated dispersion quantity (RDvirutal) (step S4).

On the accumulated dispersion quantity (MD) acquired in step S3, the management control section 1*w* computes a real accumulated dispersion quantity (RDreal) in the real transmission line (step S5). A difference between the ideal accumulated dispersion quantity (RDvirtual) and the real accumulated dispersion quantity (RDreal) is computed. A value derived from the difference is set in the respective dispersion compensators of the network (step S6). Subsequently, the management control section 1*w* computes the residual dispersion quantities by means of adjusting the dispersion quantities of the respective nodes 1 to 5 (step S7). The residual dispersion tolerance value of the residual dispersion tolerance database 1*e* is compared with the real dispersion quantities. On the basis of a result of comparison, a determination is made as to whether or not the real residual dispersion quantities fall within the allowable range of the residual dispersion tolerance value. When the real residual dispersion quantities do not fall within the allowable range, the dispersion quantities of the respective dispersion compensators are set such that the real residual dispersion quantities fall within the allowable range of the residual dispersion tolerance (step S8).

Accordingly, under the dispersion compensation method of the present invention, the node 1 provided in the WDM transmission system 100b measures the real dispersion quantities (a measurement step). The management control section 1w provided at the node 1 computes the compensation quantities of the respective transmission spans on the basis of the real dispersion quantity measured in the measurement step and the designed dispersion quantities of the respective transmission spans (a computation step). The management control section 1w notifies the compensation quantity computed in the computation to the nodes 2 to 5 (a compensation quantity notification step). On the basis of the notified compensation quantity, the thus-notified nodes 2 to 5 set the compensation quantities of the nodes 2 to 5 (a compensation quantity setting step). Thereby, measurement data are subjected to feedback control, and hence the dispersion compensation can be effected dynamically, automatically.

As mentioned above, the system 100b can set dispersion compensation quantities, on per-path basis, of post-dispersion compensators for compensating for dispersion of a single light beam separated by the pre-dispersion compensator and the node provided at the end point.

The third embodiment can also yield an advantage which is substantially the same as those described in connection with the first and second embodiments.

(D) Others

The present invention is not limited to the embodiments provided above and modifications thereof. The present invention can be practiced while being variously modified without departing from the gist of the present invention.

According to the dispersion compensation method of the present invention, path-based designing of a WDM transmission system becomes possible. Appropriate dispersion compensation can be realized in both a path having a short transmission distance and a path having a long transmission distance. Thus, the method contributes to an increase in transmission distance, thereby enabling an attempt to curtail costs incurred by system development and operation. Moreover, the system can be designed by combination of a link-based design and the path-based design. Thus, a flexible design becomes feasible, and designing of a more efficient network can be designed.

Further, there can be realized facilitation of a dispersion compensation design in line design, procurement of dispersion compensators, reduction of inventories, facilitation of installation at the time of establishment of a system, simplification of setting operations at the time of changing of a line route, and making of the processing operations efficient.

The invention claimed is:

1. A dispersion compensating method for use in an optical transmission system which compensates for a real dispersion quantity attributable to wavelength-multiplexed light and transmits the wavelength-multiplexed light, the method comprising:

measuring, in a plurality of optical transmission devices which are provided in said optical transmission system and transmit said wavelength-multiplexed light, for measuring said real dispersion quantity;

computing, in a control section provided in said optical transmission system, for computing compensation quantities of respective transmission spans on the basis of said real dispersion quantities measured in said measuring and design dispersion quantities of said respective dispersion spans;

compensation quantity notifying, in said control section, for notifying said compensation quantities computed, in said computing to said plurality of optical transmission devices; and compensation quantity setting compensating, in said plurality of optical transmission devices, for compensating for said dispersion quantity on the basis of the compensation quantities notified in said compensation quantity notifying.

2. A dispersion compensating method for use in an optical transmission system which compensates for a real dispersion quantity attributable to wavelength-multiplexed light and transmits the wavelength-multiplexed light, the method comprising:

measuring, in one or a plurality of optical transmission devices which are provided in said optical transmission system and transmit said wavelength-multiplexed light, for measuring said real dispersion quantity;

computing, in a control section provided in said optical transmission system, for computing compensation quantities of respective transmission spans on the basis of said real dispersion quantities measured in said measuring and design dispersion quantities of said respective dispersion spans;

compensation quantity notifying, in said control section, for notifying said compensation quantities computed, in said computing to said one or plurality of optical transmission devices; and compensation quantity setting compensating, in said one or plurality of optical transmission devices, for compensating for said dispersion quantity on the basis of the compensation quantities notified in said compensation quantity notifying, wherein said compensation quantity setting further comprises:

specifying, in said one or plurality of optical transmission devices, for specifying an optical path in which a deviation from a target dispersion quantity arises, and receiving-side compensating, in a receiving-side optical transmission device of said one or plurality of optical transmission devices, for compensating for said dispersion quantity of said optical path specified by said specifying.

3. A dispersion compensating method for use in an optical transmission system which compensates for a real dispersion quantity attributable to wavelength-multiplexed light and transmits the wavelength-multiplexed light, the method comprising:

measuring, in one or a plurality of optical transmission devices which are provided in said optical transmission system and transmit said wavelength-multiplexed light, for measuring said real dispersion quantity;

computing, in a control section provided in said optical transmission system, for computing compensation quantities of respective transmission spans on the basis of said real dispersion quantities measured in said measuring and design dispersion quantities of said respective dispersion spans;

compensation quantity notifying, in said control section, for notifying said compensation quantities computed, in said computing to said one or plurality of optical transmission devices; and compensation quantity setting compensating, in said one or plurality of optical transmission devices, for compensating for said dispersion quantity on the basis of the compensation quantities notified in said compensation quantity notifying, wherein said compensation quantity setting further comprises:
specifying, in said one or plurality of optical transmission devices, for specifying an optical path in which a deviation from a target dispersion quantity arises,
changing, in a transmission-side optical transmission device of said one or plurality of optical transmission devices, for changing a pre-dispersion compensating quantity of said optical path specified in said specifying, and
pre-dispersion compensating, in a transmission-side optical transmission device of said one or plurality of optical transmission devices, for compensating for a dispersion quantity on the basis of said pre-dispersion compensating quantity changed in said changing.

4. A dispersion compensating method for use in an optical transmission system which compensates for a real dispersion quantity attributable to wavelength-multiplexed light and transmits the wavelength-multiplexed light, the method comprising:
measuring, in one or a plurality of optical transmission devices which are provided in said optical transmission system and transmit said wavelength-multiplexed light, for measuring said real dispersion quantity;
computing, in a control section provided in said optical transmission system, for computing compensation quantities of respective transmission spans on the basis of said real dispersion quantities measured in said measuring and design dispersion quantities of said respective dispersion spans;
compensation quantity notifying, in said control section, for notifying said compensation quantities computed, in said computing to said one or plurality of optical transmission devices; and
compensation quantity setting compensating, in said one or plurality of optical transmission devices, for compensating for said dispersion quantity on the basis of the compensation quantities notified in said compensation quantity notifying, wherein said compensation quantity setting further comprises:
specifying, in said one or plurality of optical transmission devices, for specifying an optical path in which a deviation from a target dispersion quantity arises,
chirp processing, in a transmission-side optical transmission device of said one or plurality of optical transmission devices, for adjusting a value pertaining to a chirp of a transmission section of said optical transmission device, and
compensation, in said one or plurality of optical transmission devices, compensating for a dispersion quantity of output light with a wavelength which is caused to fluctuate on the basis of a value pertaining to said chirp adjusted in said chirp processing.

5. A dispersion compensating method for use with an optical transmission system which transmits wavelength-multiplexed light by compensating for a real dispersion quantity attributable to said wavelength-multiplexed light, the method comprising:
priority span determining for determining one or more priority spans for a plurality of optical paths on the basis of transmission distances of said plurality of optical paths in a transmission span where said plurality of optical paths are superimposed on each other, said transmission span including an optical transmission device for transmitting said wavelength-multiplexed light;
real dispersion map preparing for preparing a real dispersion map showing variation characteristics of a dispersion quantity of input light and variation characteristics of a dispersion quantity of output light of a plurality of optical transmission devices for said one or more priority spans determined in said priority span determining;
virtual dispersion map preparing for preparing a virtual dispersion map showing variation characteristics of a dispersion quantity and variation characteristics of a dispersion quantity of output light for said non-priority span determined in said priority span determining;
compensation quantity determining for determining a compensation quantity of a desired optical transmission device of said plurality of optical transmission devices on the basis of information about a difference between said real dispersion map prepared in said real dispersion map preparing and said virtual dispersion map prepared in said virtual dispersion map preparing, as well as on the basis of respective residual dispersion tolerance values; and
non-priority span compensating for compensating for a dispersion quantity of said non-priority span with a compensation quantity determined in said compensation quantity determining.

6. The dispersion compensating method according to claim 5, wherein, in said compensation quantity determining, said compensation is determined by means determining whether or not said residual dispersion quantity based on said real dispersion map prepared in said real dispersion map preparing falls within an allowable range of a residual dispersion tolerance value.

7. An optical transmission system which compensates for a real dispersion quantity attributable to wavelength-multiplexed light and transmits the wavelength-multiplexed light, the system comprising:
a plurality of optical transmission devices, each device having at least one of a separation function for separating one or a plurality of first single-wavelength light beams from said wavelength-multiplexed light and a multiplexing function for multiplexing one or a plurality of second single-wavelength light beams into said wavelength-multiplexed light;
one or a plurality of dispersion compensators for compensating for at least one dispersion quantity among a first dispersion quantity of said first single-wavelength light separated by said respective optical transmission devices and a second dispersion quantity of said second single-wavelength light multiplexed by said respective optical transmission devices; and
a management control section for setting dispersion quantities of respective dispersion compensators on the basis of a real dispersion quantity of a transmission span where a plurality of optical paths having different transmission distances are superimposed on each other from among said transmission spans among said plurality of optical transmission devices and dispersion management data pertaining to said transmission spans.

8. The optical transmission system according to claim 7, wherein each of said plurality of optical transmission devices is provided with a measurement section for measuring said real dispersion quantities, the system further comprising:

a summation section for summating a plurality of real dispersion quantities measured by a plurality of the measurement sections;

a database for retaining said dispersion quantity allocated to said transmission span; and a computing section for computing compensation quantities of said plurality of dispersion compensators for said respective optical paths having different transmission distances, in connection with a single transmission span, on the basis of said plurality of real dispersion quantities summated by said summation section and said dispersion quantities retained by said database.

9. The optical transmission system according to claim 7, wherein said management control section is configured to compensate for a dispersion quantity of bifurcated light or inserted light, as a result of dispersion compensators provided in said respective optical transmission devices compensating for dispersion in connection with an optical path having a dispersion quantity falling outside the range of target dispersion quantity among a plurality of optical paths.

10. The optical transmission system according to claim 7, wherein said management control section is configured to compensate for a dispersion quantity of bifurcated light or inserted light by means of an optical transmission device provided at a starting point of said optical path changing a pre-dispersion compensating quantity in connection with an optical path having a dispersion quantity falling outside the range of target dispersion quantity among a plurality of optical paths.

11. The optical transmission system according to claim 7, wherein said management control section is configured to compensate for a dispersion quantity of bifurcated light or inserted light by means of an optical transmission device provided at a starting point of said optical path changing a chirping quantity in connection with an optical path having a dispersion quantity falling outside the range of target dispersion quantity among a plurality of optical paths.

12. The optical transmission system according to claim 7, wherein said management control section is configured to determine priorities of a plurality of optical paths in connection with a transmission span where a plurality of optical paths are superimposed on each other.

13. The optical transmission system according to claim 7, wherein said one or plurality of dispersion compensators are configured to control a dispersion quantity on a per optical path basis by use of an individual channel dispersion compensator, a band dispersion compensator, or a variable dispersion compensator.

14. The optical transmission system according to claim 7, wherein said plurality of optical transmission devices are configured to assume a hub-type network configuration, a ring-type network configuration, or an add-and-drop-type network configuration.

15. An optical transmission device in an optical transmission system which compensates for a real dispersion quantity attributable to wavelength-multiplexed light and transmits the wavelength-multiplexed light, the system comprising:

a separation section for separating one or a plurality of first single-wavelength light beams from said wavelength-multiplexed light;

a dispersion compensator for compensating for a dispersion quantity of said first single wavelength light beam separated by said separation section; and a management control section for setting compensation quantities of respective dispersion compensators on the basis of a real dispersion quantity, which is measured at a plurality of optical transmission devices, of a transmission span where a plurality of optical paths having different transmission distances are superimposed on each other among transmission spans between the plurality of optical transmission devices, and dispersion management data pertaining to transmission spans.

16. An optical transmission device in an optical transmission system which compensates for a real dispersion quantity attributable to wavelength-multiplexed light and transmits the wavelength-multiplexed light, the system comprising:

a multiplexing section for multiplexing one or a plurality of single-wavelength light beams into said wavelength-multiplexed light;

a dispersion compensator for compensating for a dispersion quantity in connection with said single-wavelength light multiplexed by said multiplexing section; and a management control section for setting compensation quantities of respective dispersion compensators on the basis of a real dispersion quantity, which is measured at a plurality of optical transmission devices, of a transmission span where a plurality of optical paths having different transmission distances are superimposed on each other among transmission spans between the plurality of optical transmission devices, and dispersion management data pertaining to said transmission spans.

* * * * *